Nov. 15, 1938.　　　　J. M. LAIHO　　　　2,136,694
CALCULATING MACHINE
Filed Sept. 27, 1933　　　15 Sheets-Sheet 1

INVENTOR.
Jalmer M Laiho
BY
ATTORNEY.

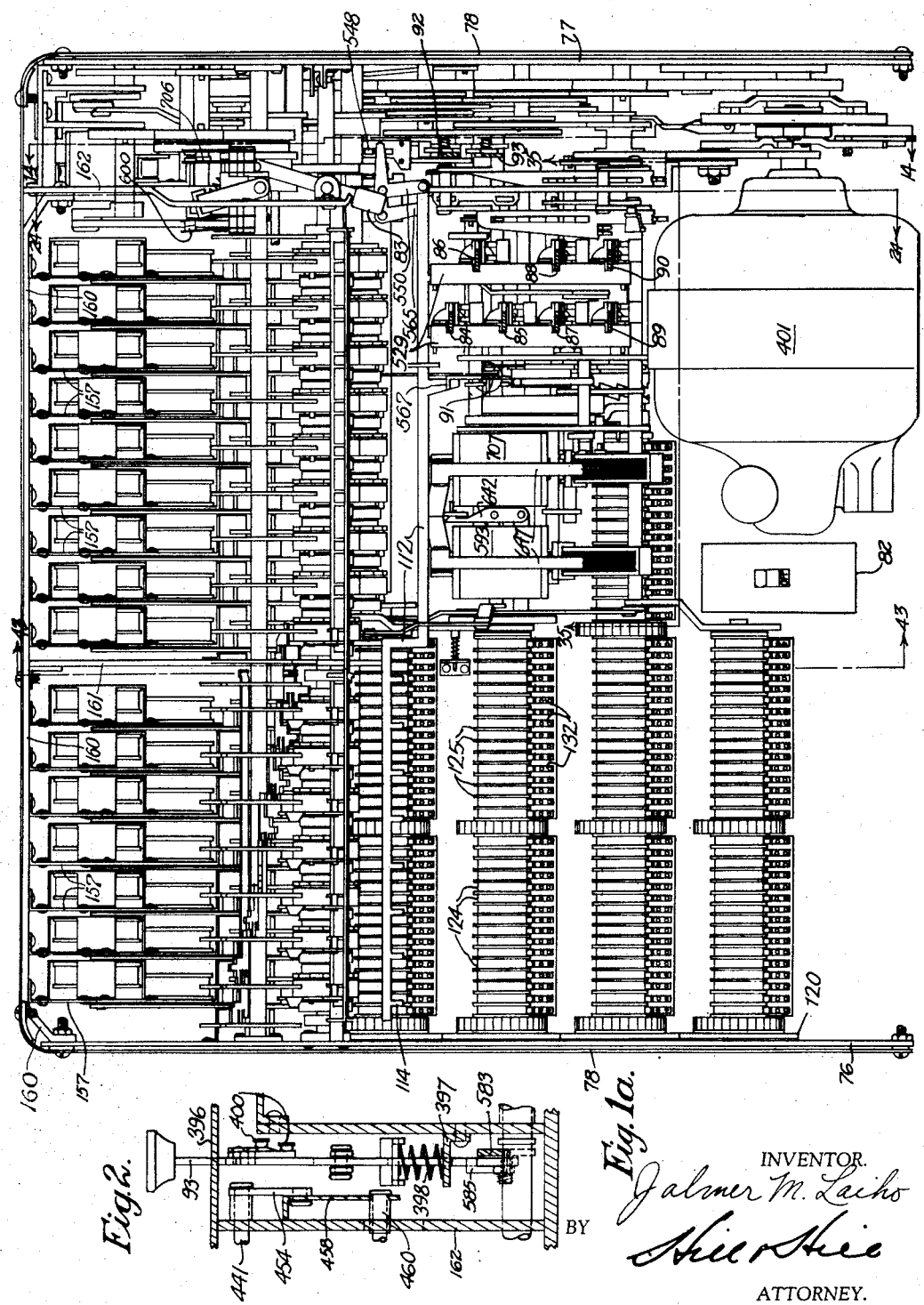

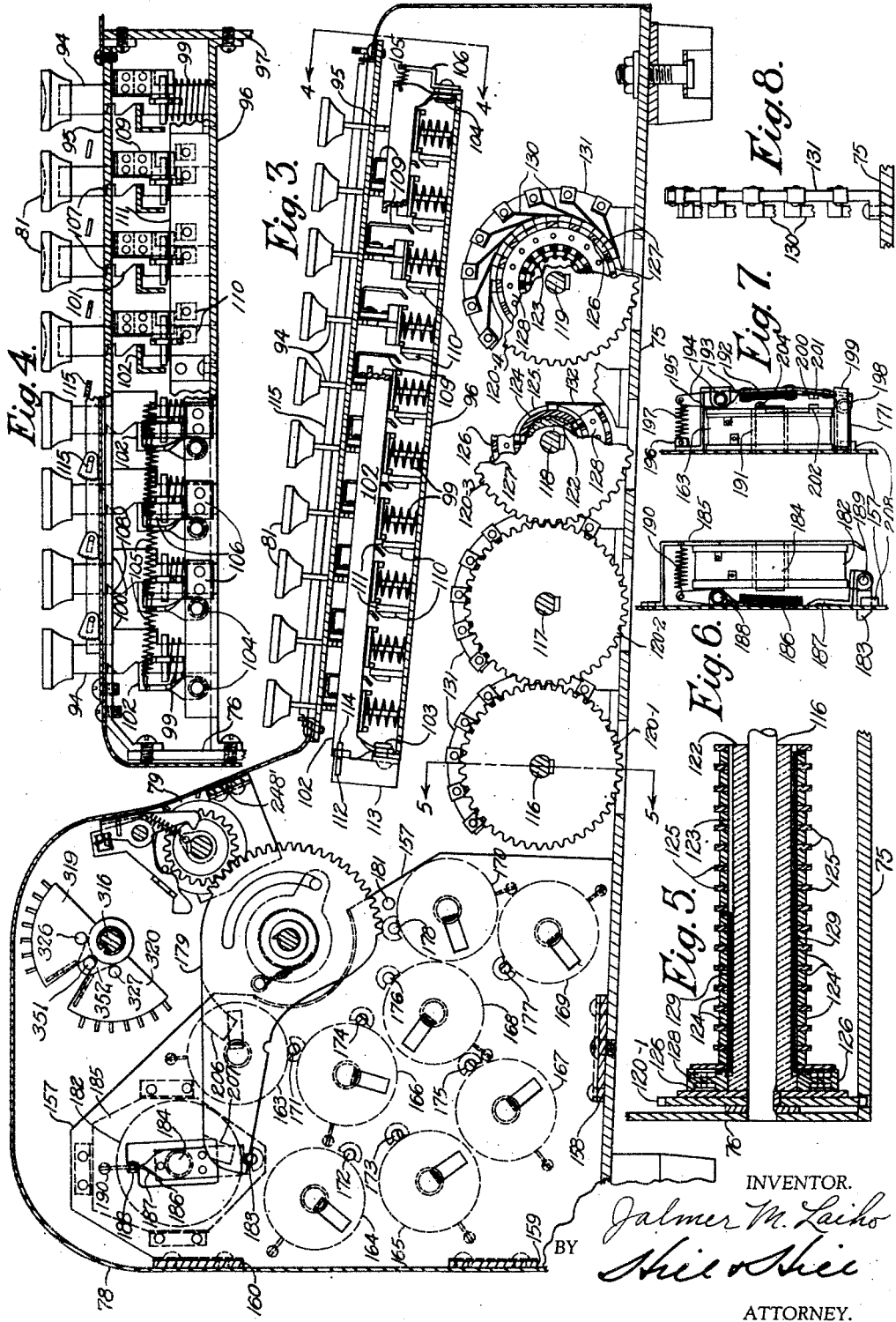

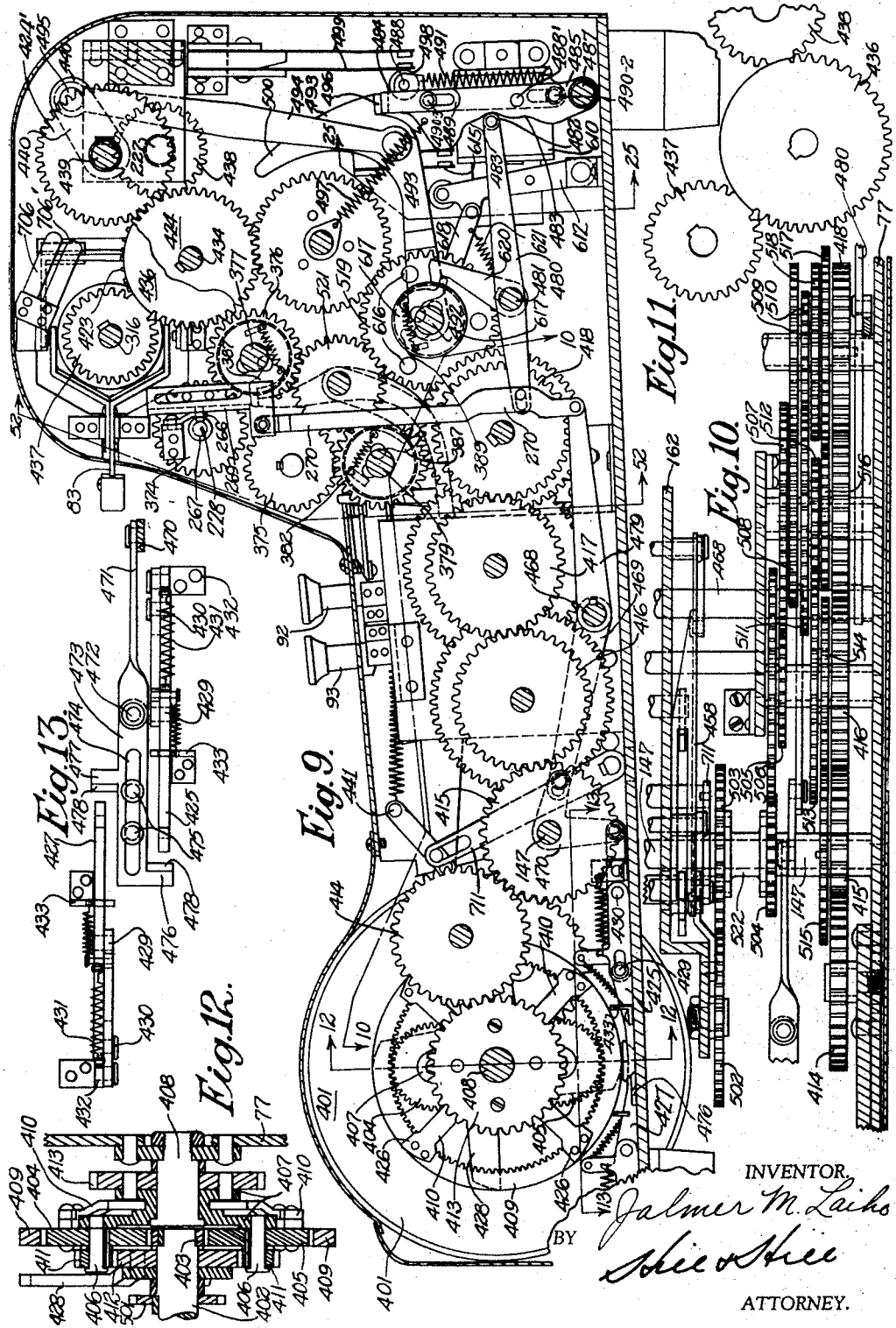

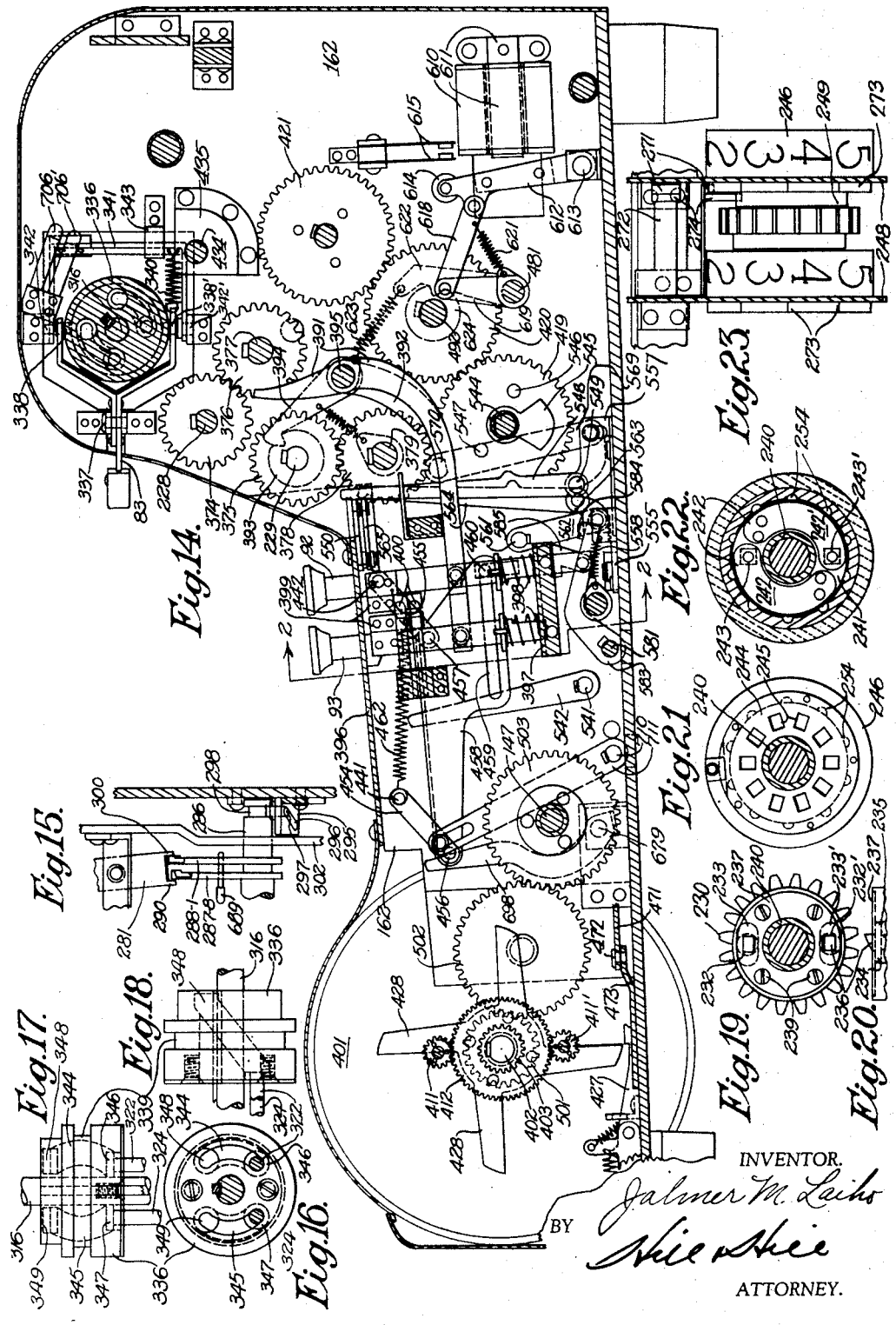

Nov. 15, 1938.  J. M. LAIHO  2,136,694
CALCULATING MACHINE
Filed Sept. 27, 1933    15 Sheets-Sheet 6
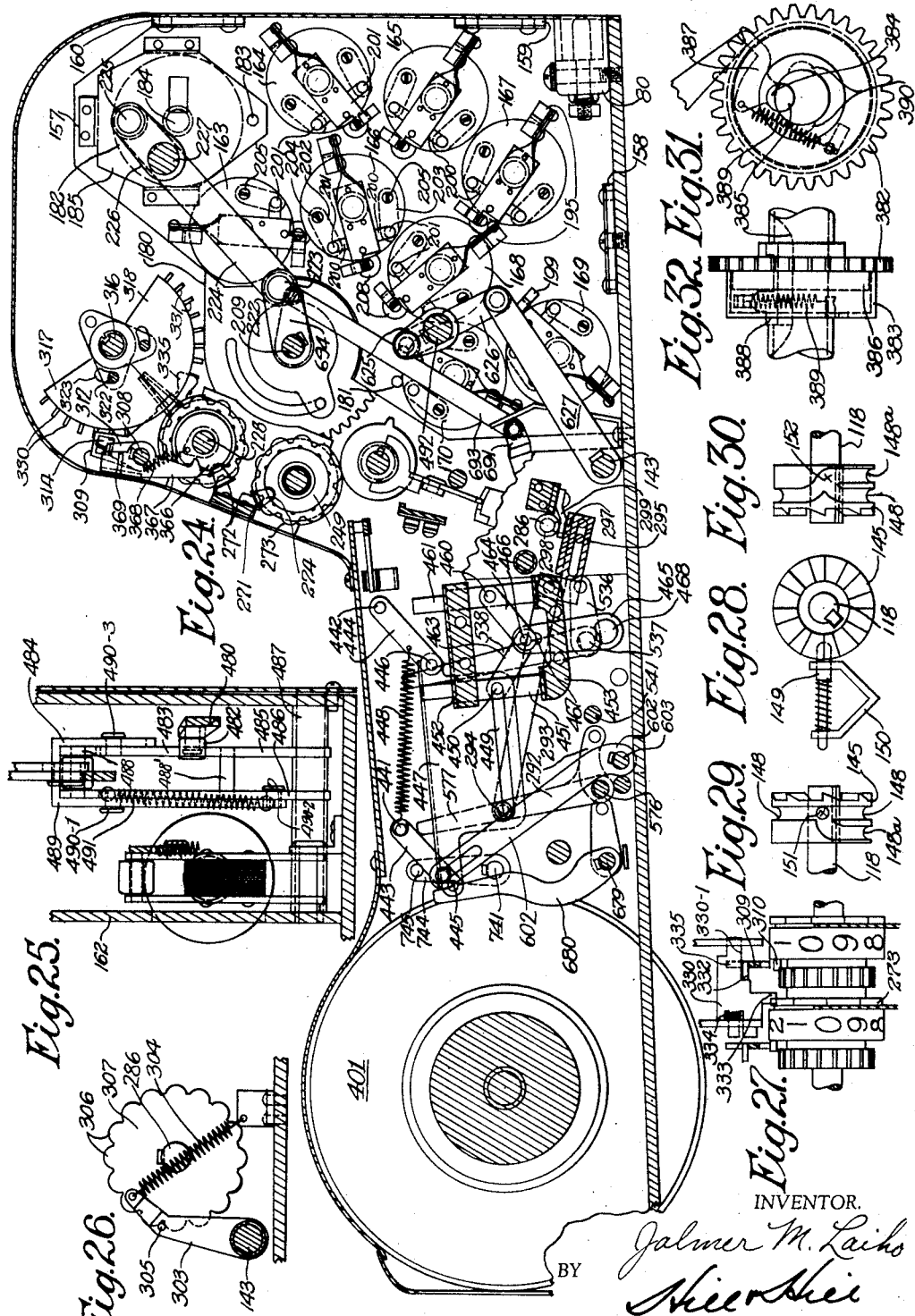
INVENTOR.
Jalmer M. Laiho
BY
ATTORNEY.

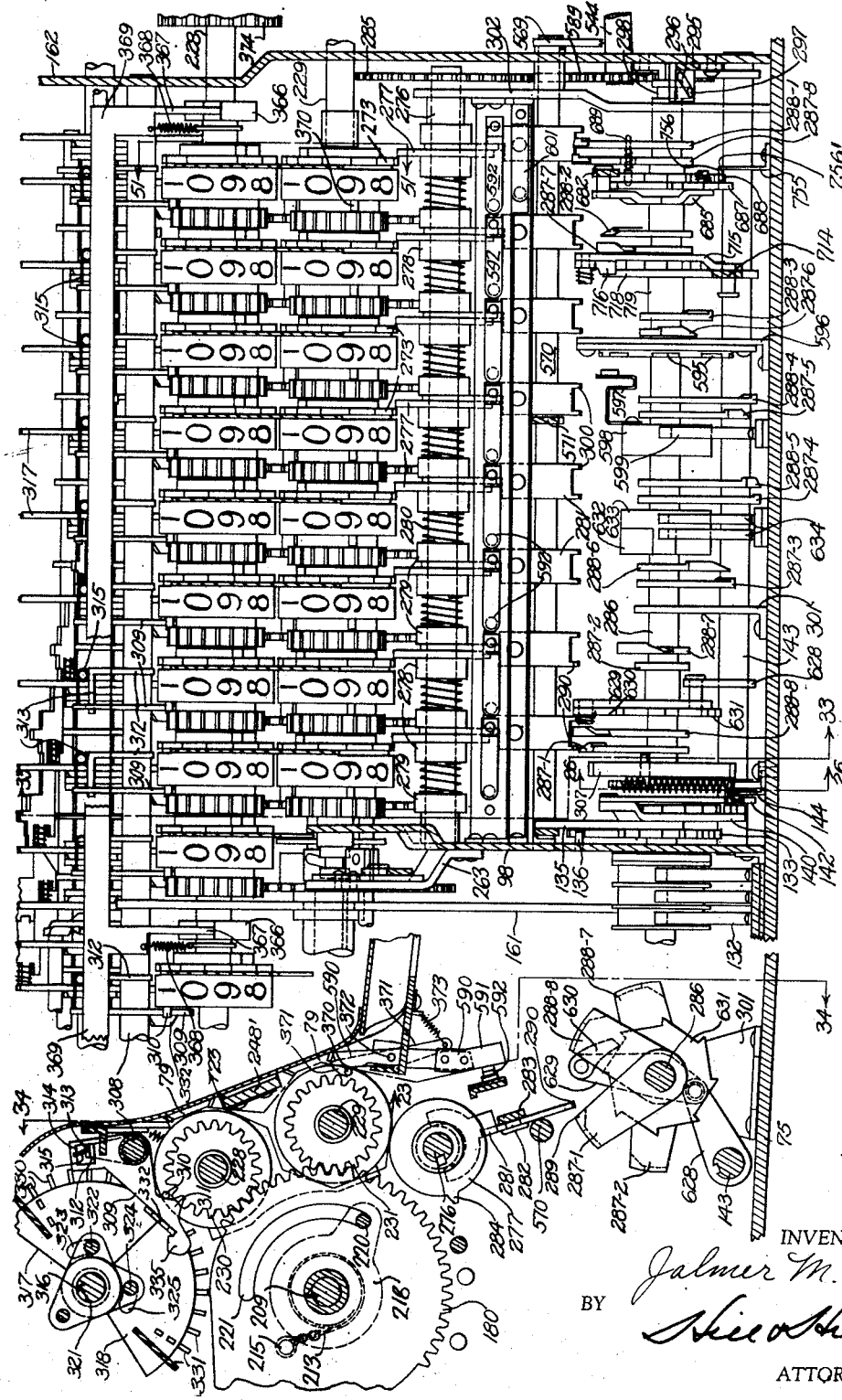

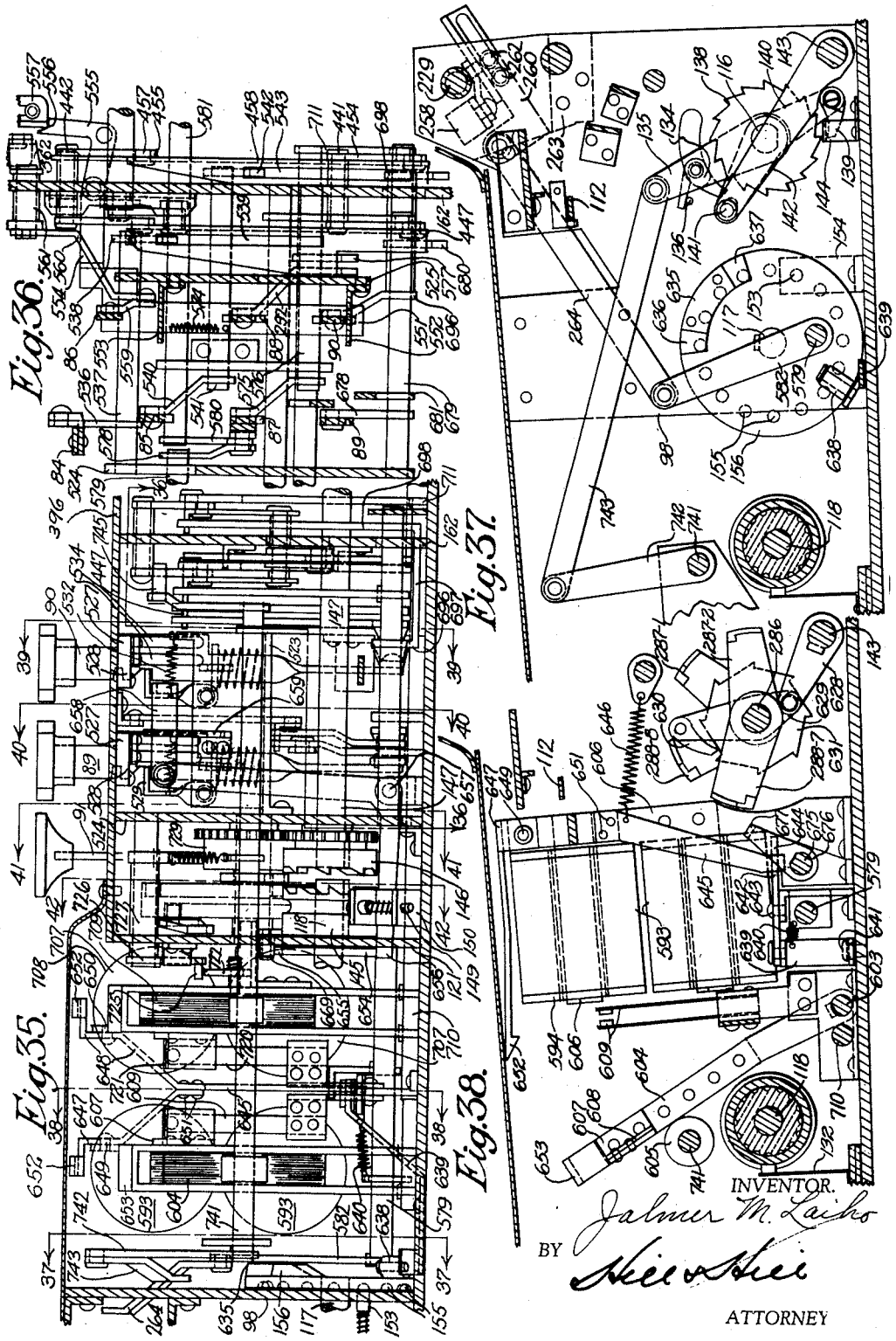

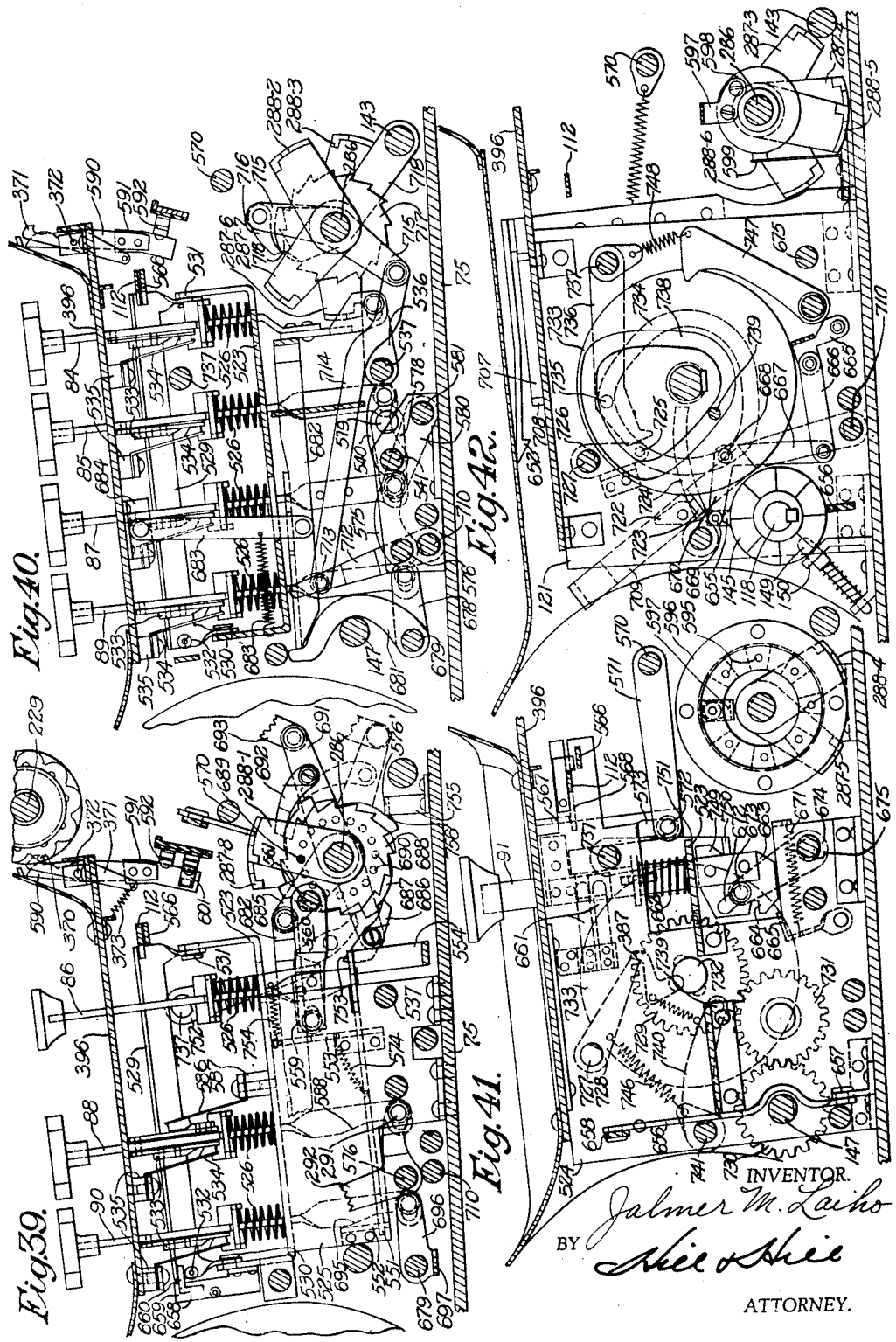

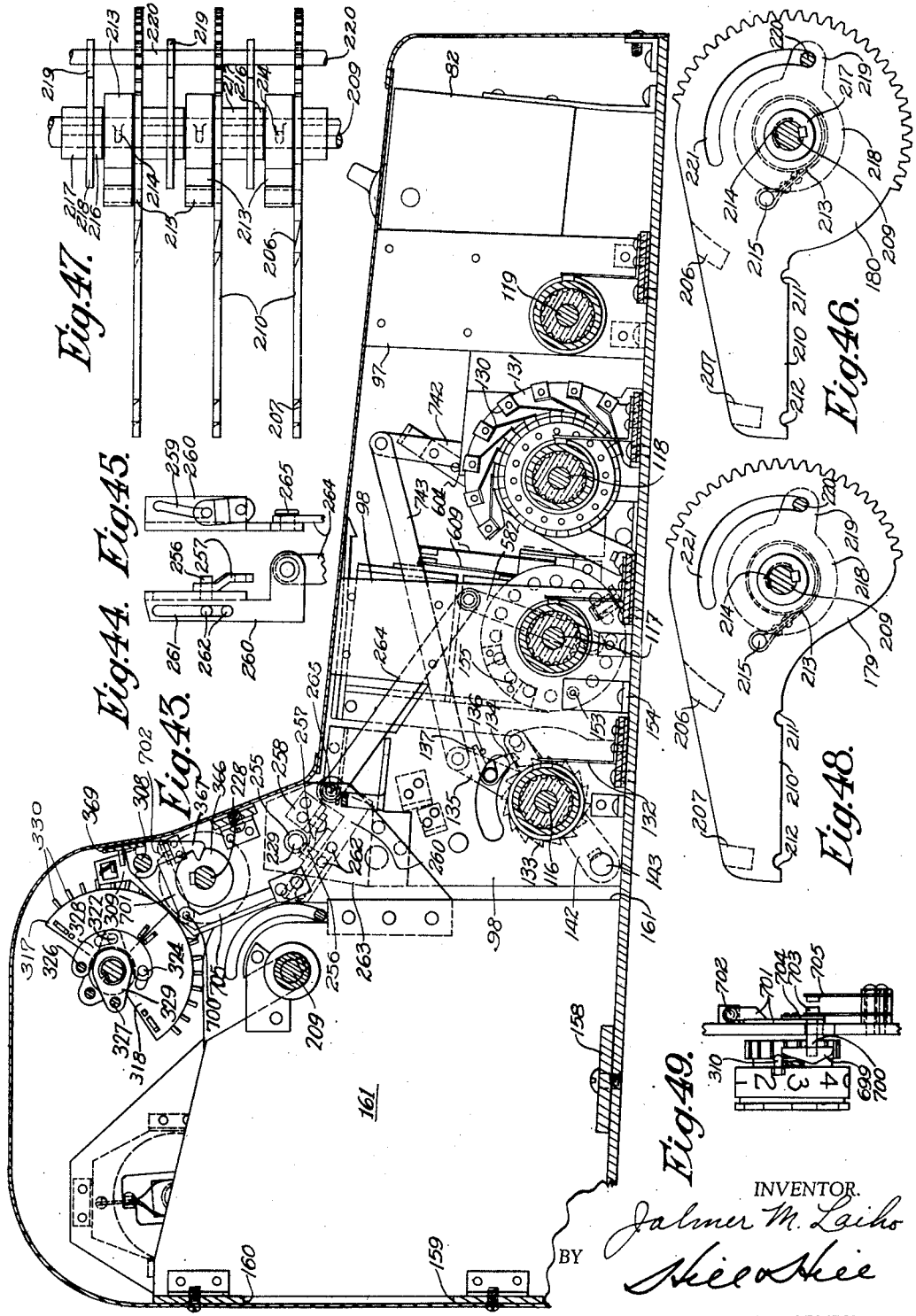

Nov. 15, 1938. J. M. LAIHO 2,136,694
CALCULATING MACHINE
Filed Sept. 27, 1933 15 Sheets-Sheet 11
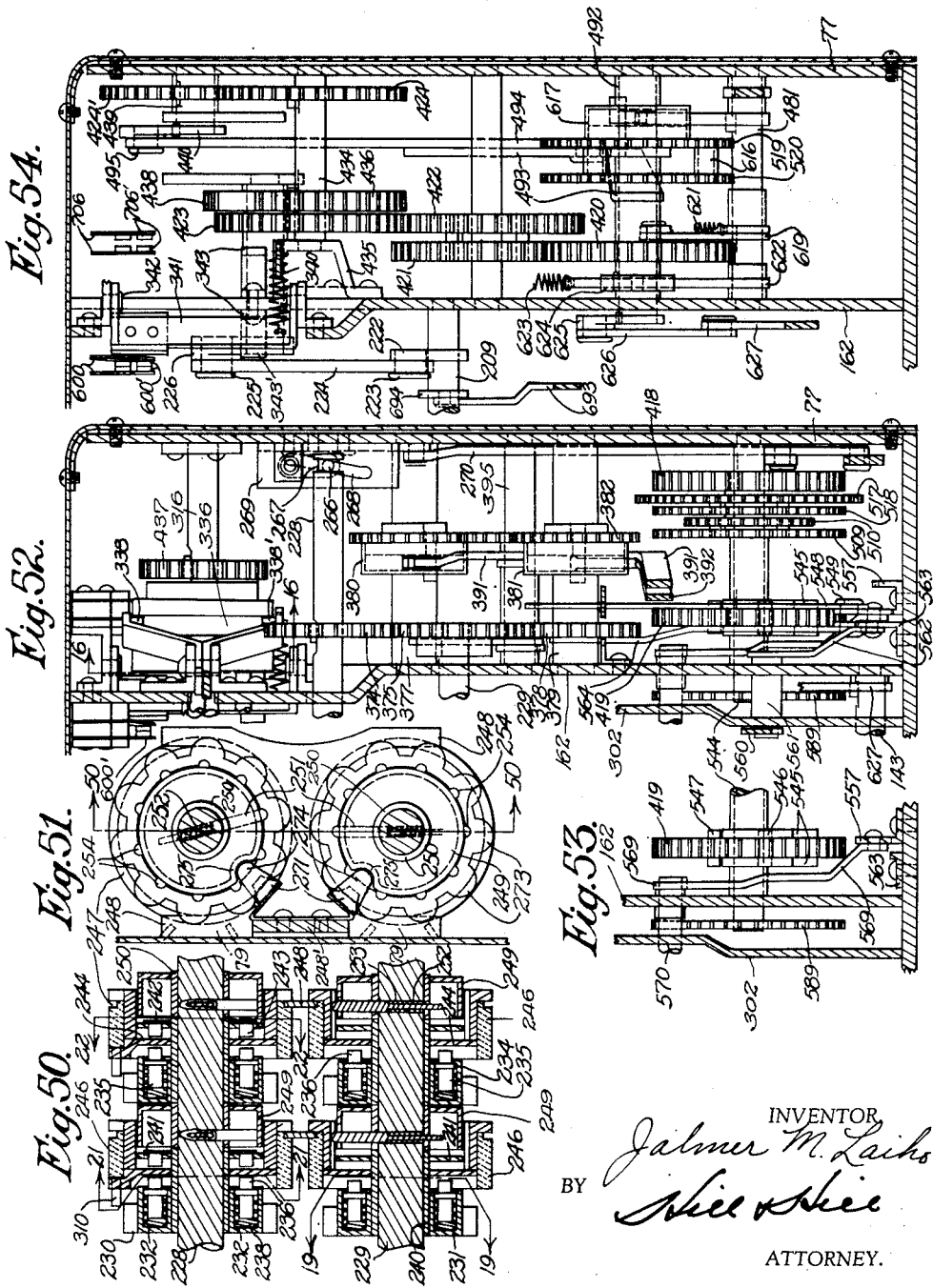
INVENTOR
Jalmer M. Laiho
BY
ATTORNEY.

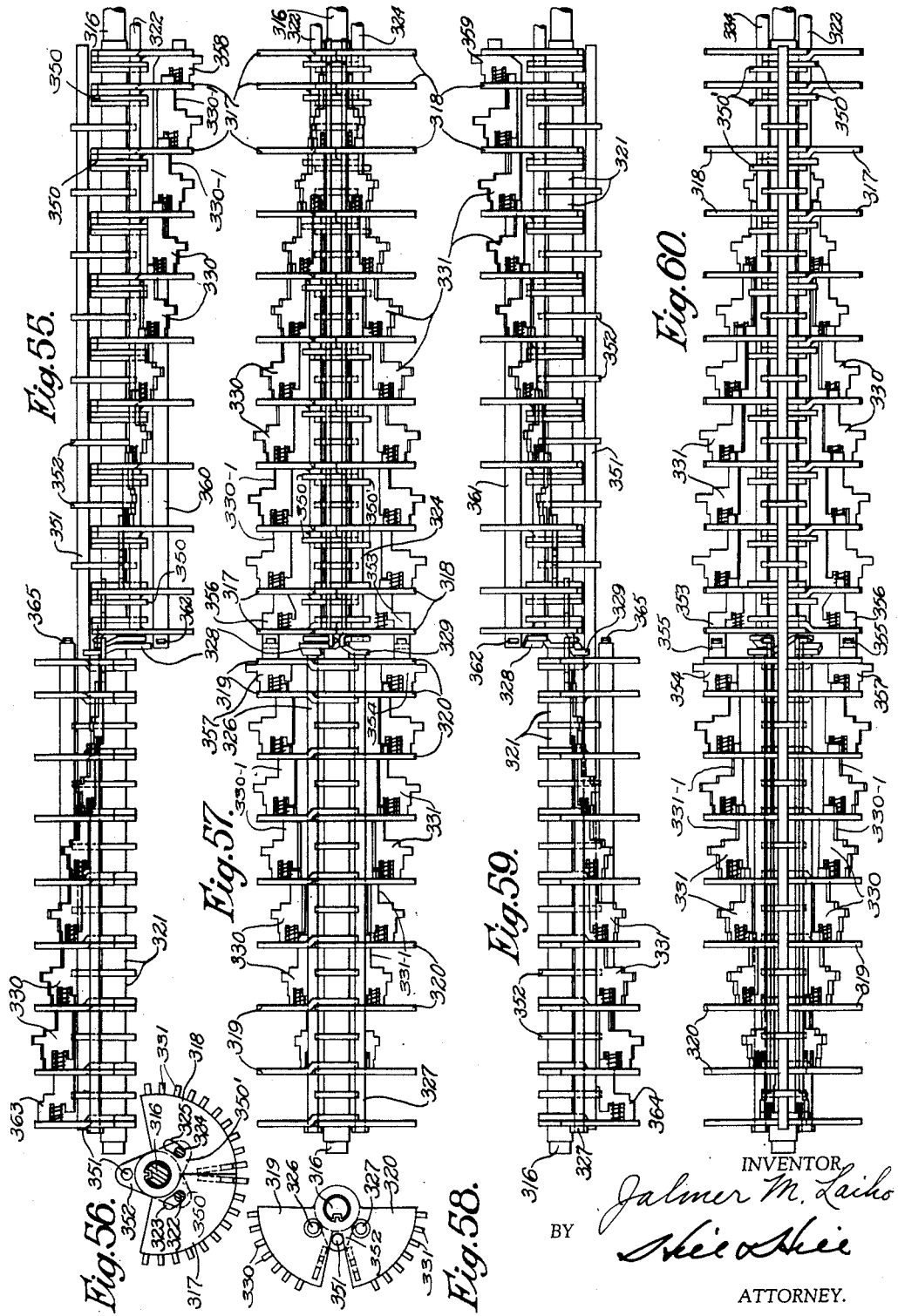

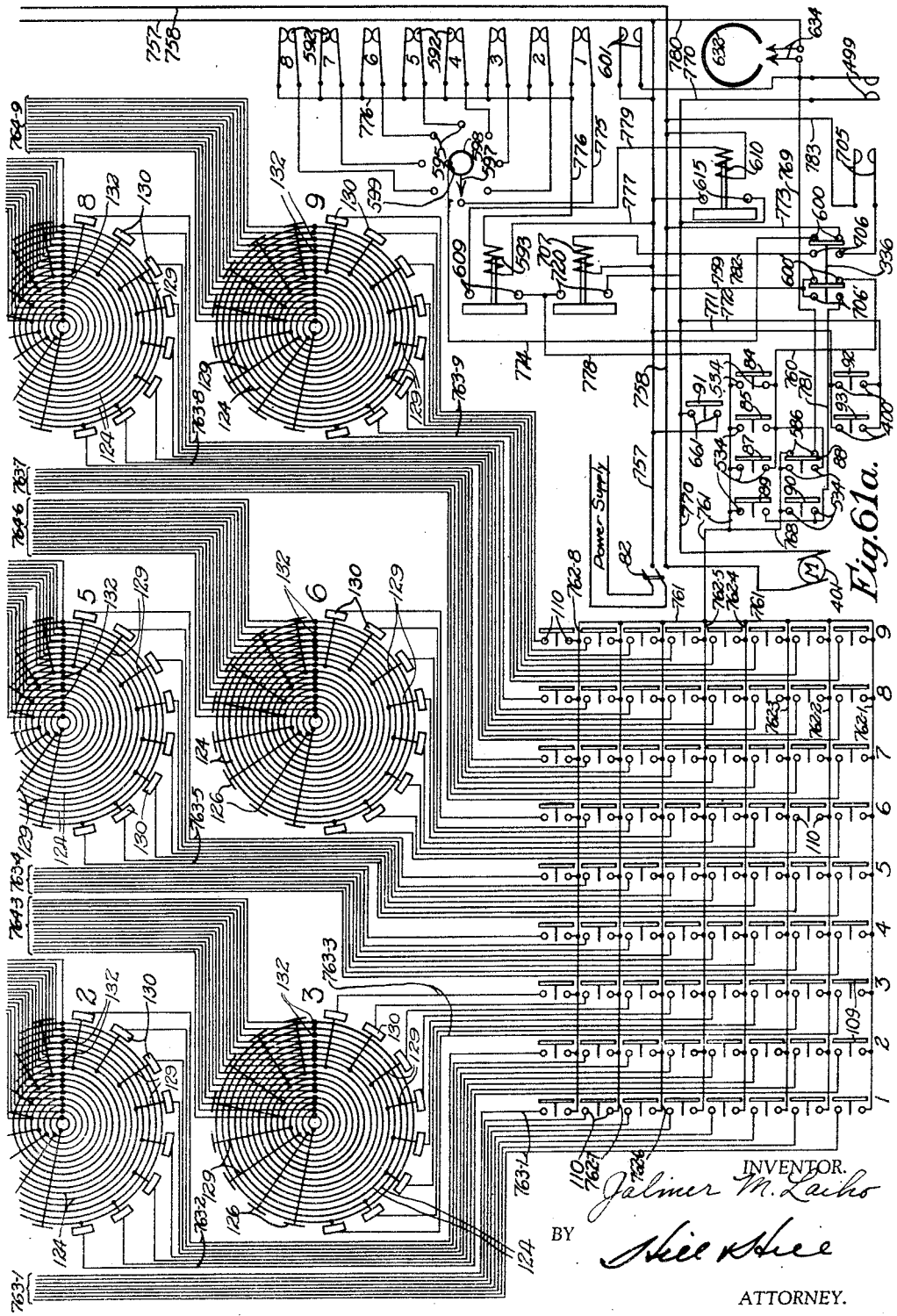

Nov. 15, 1938.  J. M. LAIHO  2,136,694
CALCULATING MACHINE
Filed Sept. 27, 1933   15 Sheets-Sheet 14

INVENTOR.
Palmer M. Laiho
BY
ATTORNEY.

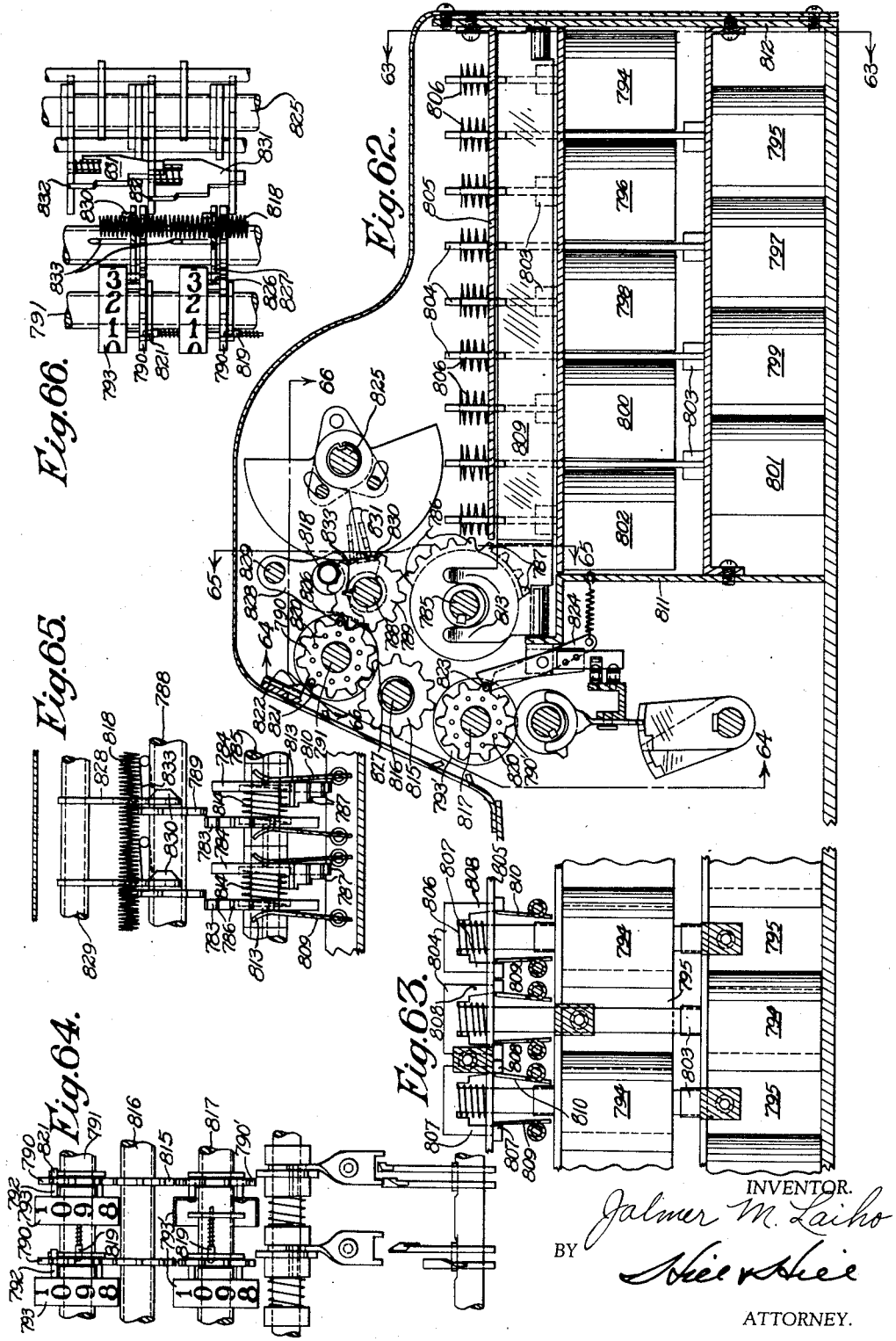

Patented Nov. 15, 1938

2,136,694

UNITED STATES PATENT OFFICE 2,136,694

CALCULATING MACHINE

Jalmer M. Laiho, Chicago, Ill.

Application September 27, 1933, Serial No. 691,136

15 Claims. (Cl. 235—61)

This invention relates to calculating machines and particularly to calculating machines which perform problems in addition, subtraction, multiplication by repeated addition, and division by repeated subtraction.

The so-called key-set or crank type calculating machines require a prolonged manipulation of keys, levers, setting knobs or other mechanical parts in the process of solving an arithmetical problem. The key-drive type of machine requires repeated key depressions in the various decimal positions of the keyboard to perform problems in multiplication and division, and furthermore, a certain rule of operation must be followed if subtraction or division are to be performed on such a machine. For speedy and efficient results both of these types of machines require a trained and experienced operator. The possibility of error due to the human factor is also present to a greater degree than in a machine where the operation is entirely automatic once the numbers or quantities are set up on the keyboard and a control key is depressed. To another distinct type belong the electrical calculating machines which have more recently been invented. Theoretically such machines are almost ideal due to the high speed with which results can be obtained and due to their automaticity. Practically, however, such machines are too large and bulky to offer very much competition to the compact machines which are now on the market. Furthermore, their construction is very complicated so that their manufacturing cost would be prohibitive.

In the present invention it has been the principal object to combine the maximum of the advantages of the aforementioned types of machines and so create a machine which will be entirely automatic, very simple and easy to operate, very compact, comparatively simple in construction and of such design that the manufacturing cost will be low.

The particular form of calculating machine in which this invention is embodied is characterized by the fact that part of the mechanism which comprises the machine is electrical and the rest is mechanical. The electrical devices are employed to perform functions which cannot be accomplished as well with mechanical parts, but only to such an extent as it simplifies the construction of the machine or provides automatic control of its operation. Similarly, the mechanical parts are used for such functions as cannot be as practically accomplished with electrical devices. At one time calculating machines were entirely mechanical, and later an electric motor was used to drive the mechanical parts so as to relieve the operator of much strain and fatigue. More recently inventors have been developing the all-electric type of calculating machine, possibly overlooking the fact that a far more practical machine can be made by further electrifying the mechanical machines.

The machine illustrated in the accompanying drawings is provided with two registers or accumulating mechanisms for displaying two of the factors produced by the operation of the machine. One of these registers consists of eight numeral dials, eight denominational orders in this case being the capacity of the keyboard and therefore of the machine. In performing problems in multiplication this register is used to display the multiplier and then to reduce it to zero as the repeated additions in accordance with the figures of the multiplier are performed. In performing problems in division this register counts the number of repeated subtractions of the divisor from the dividend in order to display the quotient when the problem is solved. In addition and subtraction this register is not used.

The other register consists of sixteen numeral dials on a shaft so located that the eight dials at the right end are above and directly in line with the eight dials of the afore-mentioned register. This register serves to display the totals in addition and the remainder in subtraction. In performing problems in multiplication this register accumulates the repeated additions of the multiplicand and displays the product when the problem is solved. In performing problems in division the dividend is entered in this register and is then reduced by repeated subtractions of the divisor until the problem is solved and the remainder is displayed.

The keyboard consists of eight ordinal columns of keys, there being nine digit keys in each column or denominational order. A "zero" key is also provided for each denominational order for the purpose of releasing any key in that order which may be depressed. The nine digit keys in the eight ordinal columns each serve to close a set of electrical contacts when in the depressed position.

The register dials are actuated by means of sector gears mounted on a shaft and flexibly connected thereto so that they can be rocked through varying angles when the shaft is being rocked through a fixed angle. The angle through which any sector gear is rocked and therefore the number which is added to or subtracted from its associated register dial is determined by electromagnetically actuated stops which limit the travel of the sector gear. For each sector gear there are eight contact-closing electromagnets, or relays, which upon being energized set a steel pin in the path of an extension of the sector gear. The operation of any one of these relays, by means of closing its associated contacts, energizes the coil of an electromagnet to remove another obstructing pin from the path of the sector gear and so allow it to leave its initial or zero position when the shaft is rocked. In each group there is one relay for each digit from 1 to 8 inclusive and a fixed stop determines the maximum angle through which the sector gear can travel. When the number 2 is being added to or subtracted from a dial the number 2 relay is energized from the keyboard and therefore the sector gear is allowed to rock through two-ninths of its maximum travel. Similarly for all other members from 1 to 8 inclusive, but when the number 9 is concerned then the electromagnet which releases the obstructing pin is energized directly from the keyboard and the sector gear can swing through its full arc.

A selector switch is provided to connect the wires leading from the keyboard to the sixteen groups of eight relays and one electromagnet. This selector switch is divided into nine similar parts or sections, one for each of the digits from 1 to 9 inclusive. The wires from the eight keys of the same digit value lead to the corresponding part of the selector switch, which then provides selective means for connecting these eight wires to eight of the sixteen relays or electromagnets corresponding to that digit value. In its normal or initial position the selector switch connects the wires from the nine digit keys of each denominational order of the keyboard from right to left successively to the corresponding relays or electromagnets which determine the actuation of the register dials of the same denominational order from the right end of the registers to the left. For performing addition or subtraction this selector switch remains in its normal position. When a problem in multiplication is to be solved the selector switch remains in this initial position until the requisite number of repeated additions of the multiplicand which is set up on the keyboard have been performed as determined by the value of the lowest denominational figure of the multiplier. Thereupon the selector switch is turned one-sixteenth of a revolution to its next operating position where the repeated additions of the multiplicand are performed according to the value of the next higher denominational figure of the multiplier. The repeated additions for each remaining figure of the multiplier take place similarly until the multiplication problem is completed. When a problem in division is to be solved the selector switch remains in its initial position while the divisor is repeatedly subtracted from the dividend in its highest denominational order. The selector switch is then turned one-sixteenth of a revolution in a direction opposite to that in multiplication and the divisor is again repeatedly subtracted from the remainder of the dividend in this position. These repeated subtractions continue until the division problem is completed. The direction in which the selector switch turns for a division problem causes the seven dials and their associated mechanism, which are located at the left end of the sixteen dial register, to function as if they were actually located at the right of the other nine dials.

Just below and parallel to the register which consists of eight numeral dials is a shaft carrying eight single toothed gears which are equally spaced and almost opposite the dials. These gears are splined to the shaft and movable laterally so that when the shaft is turned the tooth of the gear can be brought in mesh with a sprocket gear attached to the side of a numeral dial. The one-toothed gear can thus be made to turn the numeral dial one-tenth of a revolution each time, thereby either adding or subtracting one number from the dial, depending upon its direction of rotation. Cams mounted on a shaft and cooperating with suitable levers are provided to shift these single toothed gears into operating position at the proper time when multiplication or division is performed on the machine. By means of this mechanism the number of repeated subtractions in division are counted with the result that the quotient is displayed in the eight dial register. The multiplier, which is entered in the same register directly from the keyboard, is in the same manner reduced to zero while the multiplicand is being repeatedly added to give the product.

A carrying mechanism is provided to perform the carry-over of tens from one denominational order of the sixteen dial register to the next higher order after the dial corresponding to the said denominational order has passed from 9 to 0 in addition or from 0 to 9 in subtraction. The action of that part of the mechanism which performs the individual carry-overs is well known. Since the carry-over always must proceed from the lowest denominational order to the highest, then the carrying mechanism must be so adjustable that in performing division the carry-over will first take place between the sixth and seventh dials from the left end of the sixteen-dial register and proceed to the left end, then from the right end to the eighth dial from the left end. This is essential since in division the seven register dials to the left behave as though they were actually located to the right of the other nine register dials. When addition, subtraction or mutliplication problems are performed the carryover proceeds in the regular manner from the right end of the register to the left end. The details of the mechanism will be explained later in the specification.

Besides the multiple-order keyboard which has been mentioned, several control keys are provided. An addition key marked with a plus sign causes any factor which has been set up on the keyboard to be added to the sixteen dial register. A subtraction key marked with a minus sign causes any factor which has been set up on the keyboard to be subtracted from the same register. When either of these keys have performed their function the main keyboard is automatically cleared. However when the operator wishes to add or subtract the same value more than once the keyboard must not be allowed to clear automatically. For this purpose a repeat key marked "R" is provided adjacent to the plus and minus keys. A multiplication key marked "X" is provided to be depressed after the first factor in multiplication (the multiplier) has been set up on the keyboard. It causes this multiplier to be entered into the eight-dial register and then automatically clears the keyboard. Adjacent to this key is a result key marked with an equals sign which is to be depressed after the second factor in multiplication (the multiplicand) has been set up on the keyboard. This key starts the process of repeatedly adding the multiplicand according to the figures of the multiplier, which automatically proceeds until the product is displayed in the sixteen dial register. A division key marked with a division sign is provided to be depressed after the first factor in division (the dividend) has been set up on the keyboard. It causes the dividend to be entered into the sixteen-dial register and the keyboard to be automatically cleared. Another result key marked with an equals sign is provided adjacent to the division key and is to be depressed after the divisor has been set up on the keyboard. It starts the process of repeatedly subtracting the divisor from the dividend which automatically proceeds until the quotient appears in the eight-dial register. A "clear" key is provided to release the repeat key and clear the keyboard. After a problem in multiplication or division is completed this "clear" key must be depressed to clear the keyboard and set the internal mechanism in readiness for the next problem. The various devices, including the driving motor, which operate in conjunction with these control keys are explained later. Two keys are also provided to enable the two registers to be electrically cleared or reset to zero.

Electric wiring connections between the keyboard, selector switch, electromagnets, control keys, driving motor and the various control devices are provided.

An object of the present invention is to provide a calculating machine of the type specified with which it is possible to multiply or divide by depressing the keys corresponding to the two factors or quantities and the signs of the function, in the same order as they would be found in a multiplication or division table. This is as follows:

| 16 | × | 64 | = | 1024 |
|---|---|---|---|---|
| multiplier | times | multiplicand | equals | product |
| 1024 | ÷ | 16 | = | 64 |
| dividend | divided | by divisor | equals | quotient |

Obviously this reduces the work of the operator to the absolute minimum and permits of the machine being operated by one hand.

Another object of the present invention is to provide a calculating machine of the type specified which does not have a carriage or displaceable register, as is necessary in the mechanical key-set machines. This is obviated by the nature of the selector switch and the tens-carrying mechanism.

Another object of the present invention is to provide a calculating machine of the type specified, having electrical means for interlocking the various control keys so as to insure against erroneous operation.

Other objects and advantageous features were apparent from the foregoing description and they will be set forth in greater detail in the following specification, in which is given one complete embodiment of the present invention. However, the invention is not limited to this one embodiment and may take any of the plurality of forms as set forth in the claims. Furthermore, a part of another embodiment or alternative form of the invention is given so that it may be more clearly understood how the claims will apply to that and other types of construction. In this other form the electromagnets are of the solenoid type rather than of the clapper type. In the illustrations nine of these solenoids are shown in each denominational group, the armatures of which cooperate with stampings of a special shape to cause the motion of two bails. These bails serve to displace two spring-separated gears, one of which has five teeth of equal width and the other four teeth of varying width, in such a way that any number of teeth from one to nine can be brought in mesh with the teeth of a sprocket gear on another shaft. This sprocket gear actuates the register dials, the construction of which will later be explained in detail. The nine solenoid-type electromagnets are shown but it is possible to accomplish the same result with only the five solenoids corresponding to the first five digits, in which case only five parts of the selector switch need be used.

Referring to the drawings:

Fig. 1a is a plan view of the machine with the case removed. The keyboard is also removed to show the mechanism below it;

Fig. 2 is a vertical section on the line 2—2 of Fig. 14 and shows the construction of the keys which must be depressed to reset the register dials to zero;

Fig. 3 is the left side elevation of the machine with the case and side plate removed;

Fig. 4 is a section on the line 4—4 of Fig. 3 and shows the construction of the main keyboard. Four of the zero keys are removed to show the construction of the other keys;

Fig. 5 is a cross section taken through the selector switch, for example on the line 5—5 of Fig. 3;

Fig. 6 is a view of the electromagnet which, when energized, removes the obstructing pin from the path of the sector gear arm;

Fig. 7 is a view of one of the electromagnetic relays which, when energized, set a stop pin in the path of the sector gear arm and also closes a circuit to energize the electromagnet of Fig. 6;

Fig. 8 is a view of the brush holder at the end of each part of the selector switch;

Fig. 9 is the right side elevation of the machine with the case and side plate removed;

Fig. 10 is a horizontal section taken on the line 10—10 of Fig. 9 to show the gear trains;

Fig. 11 shows the construction of the three intermittent gears of Fig. 9;

Fig. 12 is a cross section through the epicyclic gear train, taken on the line 12—12 of Fig. 9;

Fig. 13 is a plan view of the catch mechanism, taken on the line 13—13 of Fig. 9. It operates to cause the epicyclic gear train to drive the machine and determines its direction of rotation;

Fig. 14 is a vertical longitudinal section through the machine taken on the line 14—14 of Fig. 1;

Fig. 15 shows the right end of the cam shaft of Fig. 34 with two cams, showing how they function when the cam shaft is shifted longitudinally to the right when a problem in multiplication is being performed;

Fig. 16 is a view of the cam, mounted on the same shaft as the carrying mechanism, which serves to rearrange the carrying mechanism for the division problem so that the individual carry-overs will take place in the proper sequence;

Figs. 17 and 18 are two side views of Fig. 16 and reveal the detailed construction of the cam;

Fig. 19 is a view of the accumulator gear taken on the line 19—19 of Fig. 50 to show the construction of the ratchet teeth and of the gear;

Fig. 20 is a side view of part of Fig. 19 and more clearly shows the construction of the ratchet teeth;

Fig. 21 is a view showing the construction of the accumulator dial, taken on the line 21—21 of Fig. 50;

Fig. 22 is a cross section through the accumulator dial and shaft on line 22—22 of Fig. 50;

Fig. 23 is a rear view of two of the lower dials on the line 23—23 of Fig. 33 and shows the arrangement of the spring-pawls which prevent over-rotation of the numeral dials;

Fig. 24 is a vertical longitudinal section taken through the machine on the line 24—24 of Fig. 1;

Fig. 25 is a view on the line 25—25 of Fig. 9 and shows the construction of a control electromagnet and the device which stops the machine in the proper cyclical position;

Fig. 26 is a view on the line 26—26 of Fig. 34 to show the mechanism which serves to prevent over-rotation of the cam shaft when it is actuated by ratchet gearing;

Fig. 27 shows two dials and part of the carrying mechanism just as a carry-over is taking place;

Fig. 28 is a view of the cam mechanism which serves to return the selector switch to its initial position after a multiplication or division problem;

Figs. 29 and 30 are side views of Fig. 28 and show the groove which determines the motion of the cam;

Fig. 31 is a view of the clutch mechanism of Fig. 41 which is similar to the two clutches used for the zero-resetting of the registers;

Fig. 32 is a side view of Fig. 31;

Fig. 33 is a vertical section on the line 33—33 of Fig. 34 and shows the relation of the main actuators, the accumulators, the carrying mechanism, the cam shaft and its associated levers and one-toothed gears;

Fig. 34 is a view on the line 34—34 of Fig. 33;

Fig. 35 is a view in transverse vertical section as seen approximately on the line 35—35 of Fig. 1;

Fig. 36 is a plan view of part of the control mechanism as seen on the line 36—36 of Fig. 35;

Fig. 37 is a vertical section showing some of the control mechanism as seen on the line 37—37 of Fig. 35;

Fig. 38 is a vertical section showing some of the control mechanism as seen on the line 38—38 of Fig. 35;

Fig. 39 is a vertical section showing some of the control mechanism as seen on the line 39—39 of Fig. 35;

Fig. 40 is a vertical section showing some of the control mechanism as seen on the line 40—40 of Fig. 35;

Fig. 41 is a vertical section showing some of the control mechanism as seen on the line 41—41 of Fig. 35;

Fig. 42 is a vertical section showing some of the control mechanism as seen on the line 42—42 of Fig. 35;

Fig. 43 is a vertical longitudinal section taken through the machine on the line 43—43 of Fig. 1;

Figs. 44 and 45 are two views of the type of device employed to shift the register dial shafts and cam shaft axially;

Fig. 46 is a view of one of the sector gears which actuate the eight accumulators of both registers at the right side of the machine;

Fig. 47 is a plan view of the sector gears showing how they are mounted on the shaft;

Fig. 48 is a view of one of the sector gears which actuate the eight accumulators of the upper register at the left side of the machine;

Fig. 49 is a view of the electrical contact cooperating with the ninth register dial from the right to stop the repeated subtractions of divisor from dividend while performing a division problem;

Fig. 50 is a cross section taken through the accumulators on the line 50—50 of Fig. 51;

Fig. 51 is a side view of the accumulators of both registers;

Fig. 52 is a vertical transverse section as seen on the line 52—52 of Fig. 9 showing the location of various gears and control devices;

Fig. 53 is a part of Fig. 52 set out to more clearly show the construction;

Fig. 54 is a vertical transverse section slightly to the rear of the section shown in Fig. 52;

Figs. 55, 57, 59 and 60 show four views of the carrying mechanism so as to clearly illustrate the arrangement of the parts;

Fig. 56 is a view of the carrying mechanism as seen from the right end of Fig. 55;

Fig. 58 is a view of the carrying mechanism as seen from the left end of Fig. 57;

Figs. 61a and 61b show the complete wiring diagram of the machine;

Fig. 62 shows an alternative way in which the present invention can be applied;

Fig. 63 is a view as seen on the line 63—63 of Fig. 62;

Fig. 64 is a view as seen on the line 64—64 of Fig. 62;

Fig. 65 is a view as seen on the line 65—65 of Fig. 62;

Fig. 66 is a view as seen on the line 66—66 of Fig. 62.

Figure 1:
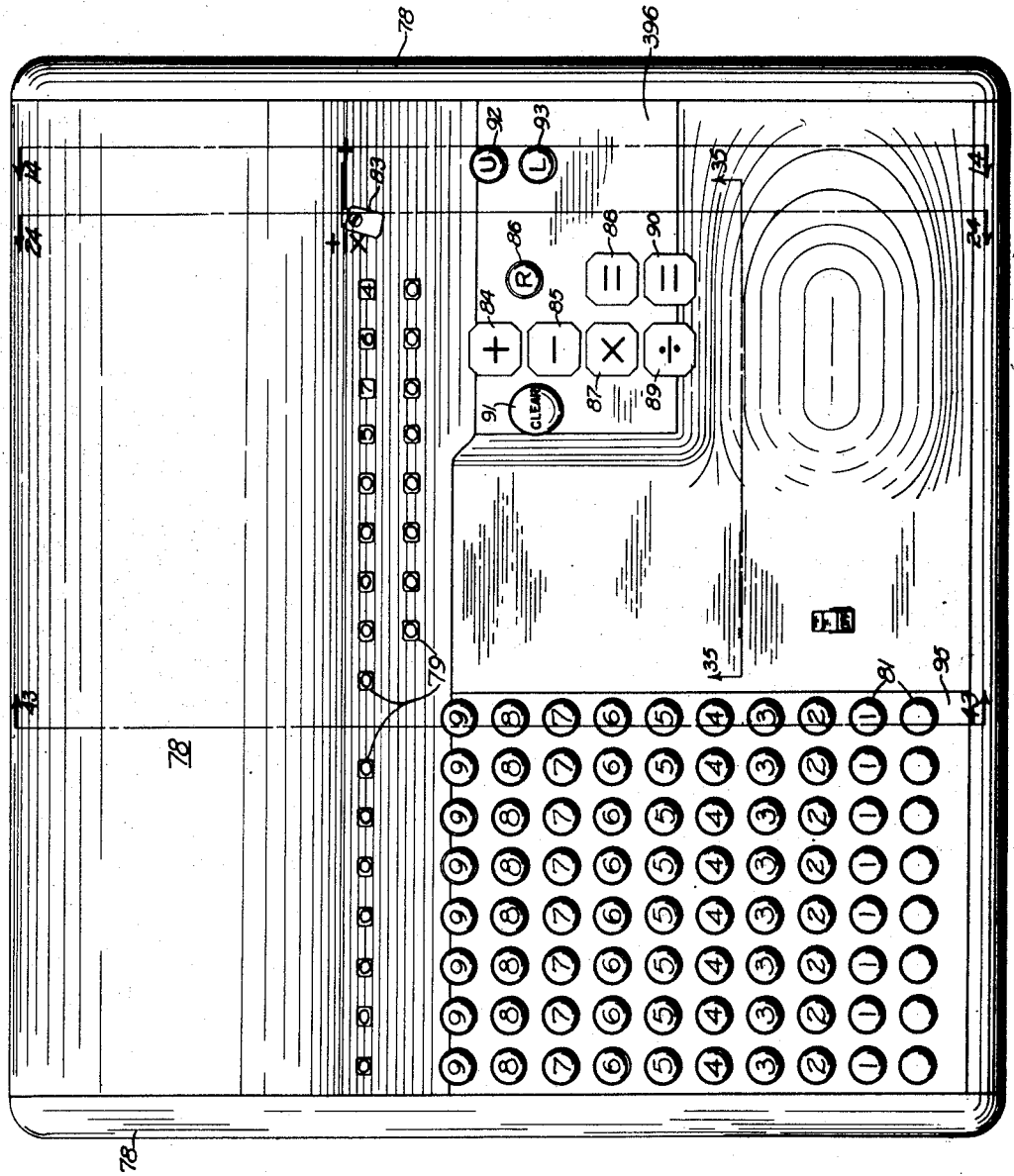
Fig. 1 is a plan view of the machine.

On a suitable base 75 are mounted side frame plates 76 and 77 between which the various devices and mechanism which comprise the calculating machine are located. The machine is enclosed in a casing 78, the top of which is provided with apertures 79, 79 through which the numbers registered on the dials may be viewed. At the rear of the machine (Fig. 24) an electric socket 80 is provided through which the machine is connected to an electric supply.

External to the casing are the key tops 81 of the keyboard which is located at the left side of the machine, the lever of a snap switch 82 through which the electric supply may be connected to the circuits and electrical devices, the lever 83 which is associated with the carrying mechanism, and the following control keys; an addition key 84, a subtraction key 85, a repeat key 86, a multiplication key 87, a result key 88, a division key 89, another result key 90, a clear key 91, a key 92 for resetting the upper register dials to zero, and a key 93 for resetting the lower register dials to zero.

*Keyboard mechanism*

Referring to Figures 3 and 4 it is seen that the machine being illustrated has a keyboard capacity of eight denominational orders, there being eight parallel columns of keys, each of which columns comprises nine keys for the digits from 1 to 9 inclusive and a key in the zero position which will release any key in the same column which has been inadvertently depressed. Obviously, of course, the machine according to the present invention can be built with a less or greater capacity than that illustrated.

The keytops 81 are mounted on the key-stems 94 which slidably extend through suitable openings in the top plate 95 and the guide plate 96. The guide plate lies in a plane parallel to the plane of the top plate, and both plates are securely fastened to side frame plate 76 on one side and to frame plates 97 and 98 on the other side.

An expansion spring 99 is provided for each key, which tends to hold that key in its non-depressed position. The expansion springs bear against the guide plate 96 at their lower ends, and against the key stems 94 at their upper ends through the medium of a suitable construction. Abutments 100 are provided on the key-stems 94 to stop them in their proper positions when the keys are released from their depressed positions. In the operation of the machine the keys which are depressed must be temporarily retained in their depressed positions until released either automatically or manually. To accomplish this, a lug 101 is cut in the edge of all keys corresponding to the digits from 1 to 9 inclusive. To cooperate with these lugs, each column of keys is provided with a locking rail 102 fastened at both ends to the bent-over edges of guide plate 96 by pins 103 and 104 in such a way that it can be pivoted about an axis through the centers of these pins. Tension springs 105 anchored at one end to spring holders 106 serve to hold the locking rails against the key stems. When any digit key in a column is depressed, the lug 101 will cause the locking rail to swing outwardly until the lug will have passed the edge of the locking rail, after which the locking rail is pulled into slot 107, thereby preventing further depression of the key and locking the key in its depressed position. Depressing any other key in the same column will release the key which was depressed, when the locking rail swings outwardly. The "zero" key is provided with a slot 108 so shaped that the locking rail will enter it to provide a stop for the key but will not retain it in the depressed position.

Each key corresponding to the digits from 1 to 9 inclusive in the eight columns of the keyboard is provided with a spring contact member 109 fastened to the key-stem but insulated therefrom with dielectric material. Electrical contact studs 110 are mounted on supporting members 111, made of dielectric material, in such positions that the gap between two studs is closed by a spring contact member 109 when the corresponding key is depressed. The electrical circuits which are to be closed by these contacts are connected to these studs. A keyboard release bar 112, slidably extending through an opening in bracket 113 at the rear of the keyboard is provided with fingers 114 (see Fig. 1a) so situated at the end of each locking rail that when the release bar is shifted to the left these fingers 114 cause all of the locking rails to simultaneously swing outwardly from the key stems thereby releasing all keys which may be depressed. The release bar can be operated manually from a "clear" key or automatically by a cam mechanism, both of which will be explained under the heading "General control devices and mechanism." Decimal markers 115 are located between the columns of the keyboard as an aid in setting the position of the decimal point. They consist of sheet metal strips painted the color of the top plate on one side and the other side being of some contrasting color (usually white) and means for turning them over so that the marker in the desired decimal position can be easily seen by its color contrast with the top plate.

Selector switch

The circuits which can be closed by the keys of the keyboard lead therefrom to the selector switch the general purpose of which has been briefly outlined. The nine similar sections of the selector switch corresponding to the nine digit values from 1 to 9 inclusive are mounted on shafts 116, 117, 118 and 119, Figure 3. three of the sections being on shaft 118 and two sections on each of the other shafts. These shafts are connected at their left ends by gears 120 so that they can all be turned in unison.

The shafts which carry the selector switch are all journalled in the side frame plate 76 at their left ends. The other ends of shafts 116 and 117 are supported by plate 98 (see Fig. 43), whereas shaft 119 is supported by plate 97 and shaft 118 is supported at its other end by plate 121 (Fig. 35). For each section of the selector switch a cylinder 122 (see Figure 5) of dielectric material is fixed to the shaft and is provided with sixteen grooves 123 equally spaced on its peripheral surface. Around this grooved cylinder are sixteen rings 124 of electrical conducting material, preferably copper, which are separated from each other by insulating washers 125. At one end of this assembly of rings and washers, and insulated from the endmost ring, are sixteen segments 126 of electrical conducting material which are equally spaced radially and separated from each other by insulating segments 127. These conducting and insulating segments are held in fixed position by two rings 128 of dielectric material which fit into slots formed in the sides of the segments. One of the segments 126 is electrically connected by insulated copper wire 129 which runs through one of the grooves 123 to the first adjacent ring 124. An adjacent segment is similarly connected to the second ring 124 away from the group of segments. The third segment (turning in the same direction about the shaft) is connected to the third ring, and similarly for all other segments in order until the sixteenth and only remaining segment is connected to the last ring 124 farthest from the segments.

Making contact with eight adjacent segments 126 are brushes 130 mounted on a brush holder 131 which is made of insulating material and is rigidly fastened to base plate 75. These eight brushes are directly connected by electric wires to the electrical contacts associated with eight keys of like digit value of the keyboard. Making contact with each of the rings 124 is a brush 132 rigidly fixed to the base but insulated therefrom by dielectric material. These brushes 132 are connected by electric wires to the sixteen electromagnets which set the actuator stops of like digit value in the sixteen ordinal positions of the accumulating mechanism. These electromagnets correspond to the same digit value as the key-contacts which are connected to the same part of the selector switch. By turning the selector switch exactly one-sixteenth of a revolution in the proper direction each of the circuits which are connected to the eight brushes 130 is thereby connected to eight other rings adjacent to the ones to which they were just connected. The functioning of this mechanism will be more clearly understood when the "wiring diagram" is described. The eight other sections of the selector switch are similar to the one just described, but the order in which the circuits are connected to the brushes 130 are reversed on alternate shafts so as to conform with the direction of rotation.

The means for turning the selector switch in one direction to its successive operating positions consists of a sixteen toothed ratchet gear 133, (Fig. 43) which is keyed to the shaft 116. Spring pressed pawl 134 mounted on lever 135 which is fulcrumed on the shaft 116 is normally held out of engagement with the teeth of the ratchet gear by stop pin 136 which engages a projection 137 of the pawl and lifts it out of engagement with the ratchet gear at the end of each operating stroke of lever 135. The mechanism which transmits motion to lever 135 at the proper time will be described under the heading "General control devices and mechanism." To turn the selector switch in the opposite direction to successive operating positions a sixteen toothed ratchet gear 138 also keyed to shaft 116 (Fig. 37) is actuated by spring pressed pawl 139 mounted on lever 140 which is fulcrumed on the shaft 116. The lever 140 receives motion through pin 141 and a suitable sliding connection from lever 142 which is fixed to shaft 143. The means for rocking the shaft 143 will be explained under "General control devices and mechanism." For each operating stroke of the lever 140 the pawl 139 moves the gear 138 by one tooth and at the end of its return motion the point of the pawl rides under the horizontal end of shield 144, (Figures 34 and 37) which is fixed to the base plate just below the gear 138. The pawl 139 is no longer in engagement with ratchet gear 138 being separated therefrom by shield 144. The means for returning the selector switch to its initial postion after a problem in multiplication or division has been performed consists of a tooth clutch member 145 (Figures 29, 35 and 42) splined to the shaft 118 and shiftable thereon so that it can be brought into engagement with the teeth of a somewhat similar clutch member 146 (Fig. 35) which is fixed to and slowly revolves with shaft 147 while the motor is turning. To bring the clutch member 145 in and out of engagement with the clutch member 146 at the proper time, the cam slots 148 and 148a are cut into the peripheral surface of member 145. A spring pressed pin 149 held by bracket 150 engages the slot 148, the shape of which then determines the lateral motion of member 145 as it is turned with shaft 118. The shape of the slot is clearly illustrated in Figs. 28 to 30, and it is cut deepest at points 151 and 152 to further facilitate the action. In the normal or initial position of the selector switch the end of pin 149 is in engagement with cam slot 148 at point 151. If now the switch is turned in either direction to successive operating positions for multiplication or division, then member 145 is turned with shaft 118. Since slot 148 is straight on either side of point 151 then member 145 is not moved laterally on shaft 118 in consequence of the engagement of pin 149 with cam slot 148. During movement of the selector switch from the first to the eighth operating position in either direction, pin 149 follows the cam slot 148. However, upon further rotation of the switch after operation in the last position, the pin 149 meets a turn in cam slot 148 and being that said pin is held by bracket 150 it causes member 145 to move laterally on shaft 118 so that its teeth come into engagement with the teeth of member 146 when the head of pin 149 is at point 152. Since clutch member 146 slowly revolves when the motor is turning, it then turns shaft 118 and the selector switch while pin 149 contacts slot 148a. Just before the selector switch has rearrived at initial position after being turned one-half revolution, pin 149 meets a turn in slot 148a (Figure 29) which causes clutch member 145 to move laterally on shaft 118 so that it is out of engagement with member 146 when pin 149 contacts with point 151 of cam slot 148. The selector switch now stops at its initial or reset position.

A spring pressed pin 153, Figs. 35 and 37, supported by bracket 154 and plate 98 is provided with a round end which cooperates with sixteen equally spaced impressions 155 on a disc 156 which is fixed to shaft 117 and serves to locate the selector switch in proper position with respect to the brushes 130. This mechanism locates all of the units of the selector switch on shafts 116, 117, 118 and 119 since these shafts are caused to work in synchronism by the gears 120—1, 120—2, 120—3 and 120—4 which join them on their left ends.

Electromagnetic stop mechanism

Since the keyboard has a capacity of eight figures, and if an eight figured number be multiplied by another eight figured number, the product will be a number having either fifteen or sixteen figures, therefore the register dials must be sixteen in number. The actuating mechanism must correspondingly consist of sixteen similar parts, each of which parts is provided with a stop mechanism which limits the motion of the actuator and thereby determines the figure to be added to or subtracted from the dials. This stop mechanism is illustrated in Figs. 3, 6, 7, and 24.

At the rear of the machine, sixteen electromagnet support plates 157 are properly spaced and rigidly fixed to strip 158 which in turn is fixed to the base plate. The electromagnet support plates are also fastened to strips 159 and 160 both of which are fixed to side plate 76 and to plates 161 and 162 (see Figs. 1a, 3 and 24). Mounted on each electromagnet support plate 157 are eight similar electromagnets, the positions of which are indicated by their coils 163, 164, 165, 166, 167, 168, 169 and 170. These eight electromagnets in the order in which their coils were numbered serve to set stop pins 171, 172, 173, 174, 175, 176, 177 and 178 respectively in the path of the actuator when their coils are energized. The positions of these pins are such that in their respective order they indicate the position at which the sector gears 179 and 180 must be stopped when the digits from 1 to 8 respectively are to be added to or substracted from the register dails. When the digit 9 is to be added or subtracted the sector gear makes its full swing, not being stopped until it strikes rod 181 which extends through each plate 157.

Also mounted on each electromagnet support plate is one larger electromagnet whose coil is numbered 182. This electromagnet serves to remove its pin 183 from the path of the sector gear, thereby allowing the sector gear to leave its initial position and to swing until it strikes one of the stop pins. This electromagnet consists of its coil 182 mounted on a laminated core 184, of a grade sheet iron or steel suitable for electrical purposes, which is fixed to sheet 185 which in turn is fastened to plate 157. The laminations 186 fastened to armature strip 187 which is pivotally supported by pin 188 fixed to the support plate 157, comprises the armature of the electromagnet. The actuator release pin 183 which slidably extends through a hole in plate 157 is pivotally attached to the bent-over end of strip 187 of the armature by pin 189. Tension spring 190 serves to hold the armature away from the core of the electromagnet so that pin 183 protrudes through the support plate when the coil 182 of the electromagnet is not energized. When the coil is energized the armature is attracted by the core, thereby withdrawing pin 183 so that it does not protrude through plate 157. A side view of one of the smaller electromagnets is shown in Fig. 7 where the coil 163 is mounted on the laminated core 191 which is fixed to plate 157. The laminations 192 fastened to armature strip 193 which is pivotally supported by pin 194 comprises the armature of the electromagnet. The pin 194 is fastened to armature support piece 195, which is fixed to plate 157 and is provided with a pierced lug 196 to which the spring 197 is anchored. The actuator stop pin 171 which may be extended through a hole in plate 157 is pivotally attached to the bent over end of armature strip 193 by pin 198. The tension spring 197 serves to hold the armature away from the core so that pin 171 remains in its retracted position when the coil of the electromagnet is not energized, while armature backstop piece 199 which is fastened to plate 157 determines the idle position of the armature and of the actuator stop pin 171. Fastened to the armature but electrically insulated therefrom is a spring contact member 200 (see Fig. 24) which is fitted at both ends with contact studs 201 and serves to complete a circuit from contact 202 to contact 203 when the armature is attracted by the magnetization of the core. The contacts 202, 203 are mounted on the face of the coil spool and provided with terminals 204, 205 to which circuits are connected, one leading from the power supply and the other to the coil of the large electromagnet.

Any of the eight actuator stop-setting electromagnets of each group of mechanism can be energized by circuits leading from the keyboard and through the selector switch, and by closing their associated contacts they energize the larger electromagnet which operates the release pin. This release pin electromagnet can also be energized by circuits leading from the contacts of the 9 key and through the selector switch. The coil of the release-pin electromagnet must be larger than the others in order to prevent overheating from the more frequent operation to which it is subjected. The end of each stop pin and the release pin is beveled on the side farthest from the zero position of the actuator arm, and the sector gears 179 and 180 (the actuator) are provided with corresponding bevels 206 and 207 so that the sector gear arm upon returning to zero position can push aside any pin which may be in its path. Since the pin ends are beveled, it is necessary to provide supporting lugs 208 to keep the pins in proper position.

*Actuating mechanism*

The actuating mechanism consists of sector gears 179 and 180 (Figures 46, 47 and 48) suitably mounted on a shaft 209 which is supported on its left end by side plate 76, near the center by plate 161 and at its right end by plate 162. There are eight sector gears 179 at the left end of the shaft, the teeth of which are constantly in mesh with the accumulator gears associated with the eight register dials at the left end of the sixteen dial register. The other eight sector gears 180, which are similar to 179 except in that they have a greater number of teeth, are each in mesh with one of the eight accumulator gears at the right end of the sixteen-dial register shaft and with one of the accumulator gears of the eight-dial register directly below.

The shaft 209 is rocked through a fixed angle and back to its initial position once for each individual addition or subtraction which is to be registered in the dials. The sector gears 179 and 180 are so fastened to this shaft that they can be rocked back and forth with the shaft through the same angle or any fraction of that angle. The fixed angle referred to is divided into nine equal parts corresponding to the digits from 1 to 9 inclusive. When the number 1 is to be added the sector gear is rocked through one of these divisional angles or through one-ninth of its maximum angle, when the number 2 is to be added (or subtracted) the sector gear is rocked through two divisional angles, or two-ninths of its maximum angle, etc. until when the number 9 is added the sector gear is allowed to rock through its full angle.

The electromagnetic stop mechanism which has been described provides the nine pins for stopping each of the sector gears at any one of these nine positions, and another pin which functions to release the sector gear from its initial position or to hold it there when the shaft 209 is rocked but no addition or subtraction is to be performed in that ordinal position of the register. The arm 210 of each sector gear is provided with semi-circular stop points 211 and 212 at which points the arm of the sector gear strikes the various stop pins.

The sector gears are uniformly spaced on shaft 209 relative to which they can be freely turned. Adjacent to each sector gear is a spiral spring 213 which is fastened by its inner end to lug 214 projecting from shaft 209 and by its outer end to pin 215 which is fastened to the side of the sector gear. Adjacent to the spiral springs are spacers 216 and adjacent to the sector gears are spacers 217 both of which are secured to the shaft 209. Between the spacers 216 and 217 and also secured to the shaft are washers 218 provided with an arm extension 219 through which the sector gear return rod 220 extends. The sector gears are provided with a slot 221 through which the rod 220 also extends. As seen from the left end of shaft 209 the spiral springs 213 tend to turn the sector gears counter-clockwise with respect to the shaft, thereby holding the lower end of slot 221 against the sector gear return rod 220.

The normal position of the actuating mechanism is such that the stop point 212 on each sector gear arm is slightly above the release pin 183 (see Fig. 3). As the shaft 209 is rocked the sector gears are pulled around with it by the action of spiral springs 213 until one of the stop points 211, 212 strikes a stop pin. Thereafter the shaft 209 continues to turn with respect to those sector gears which are stopped and the rod 220, rocking with the shaft, moves counter-clockwise along the slot 221. If the sector gear is held by the pin 183 at its initial position then the rod 220 swings to the other end of the slot 221. When the shaft 209 is returning to its initial position the rod 220 travels clockwise along the slot 221 until it strikes the end whereupon it causes the sector gear to rock back to its initial position with the shaft. The spiral spring 213 and the rod 220 thus provide a flexible connection between the shaft and the sector gears.

The means for rocking the shaft 209 consists of lever 222, Figure 24, which is fixed to the shaft and connected at its other end by pin 223 to pitman 224 which is fastened by pin 225 to the actuator crank 226. The actuator crank is fixed to turn with shaft 227 which is journaled in support plate 162 and is connected to the driving motor by means of suitable gearing which will be described under the heading "General control devices and mechanism."

Accumulating mechanism

As has been previously explained, the machine is provided with two registers one of which contains sixteen numeral dials and the other eight numeral dials. The sixteen-dial register is mounted on a shaft 228 (see Figures 33, 34, 50 and 51) which is supported at its left end by side plate 76, between its seventh and eighth dial from the left end by frame plate 161, and near its right end by support plate 162. The eight dial register is mounted on a shaft 229 which is supported at its left end by plate 98 and at its right end by plate 162. In mesh with each of the eight sector gears 180 is an accumulator gear 230 secured to a bushing which is free to turn on register shaft 228 and a similar accumulator gear 231 secured to a bushing which is free to turn on register shaft 229. The face of each accumulator gear is sufficiently wide so that they can be shifted a slight distance axially with their shafts and still remain in mesh with the sector gears 180. Each of the accumulator gears 230 and 231 is provided on the side adjacent to the register dial with two diametrically opposite holes 232 and 232' (see Figures 19 to 23) which extend nearly through to the other side of the gear. The holes 232 and 232' have oval shaped counterbores or slots 233 and 233' into which the similarly shaped flanges 234 of pin 235 fit. Each pin 235 is provided with a tooth 236 which projects through a hole in the cover plate 237 that holds the pins in position against the pressure of expansion springs 238, Fig. 50, which bear against the flange portion 234 of pin 235. A cover 237 is held in place by suitable screws 239.

Each accumulator gear is secured to a bushing 240 (see Figs. 50, 51, 19, 21 and 22) through which the register shaft 228 (or 229) extends. The bushing with the washer 241 and the accumulator gear fixed to it is free to turn on the shaft. The washers 241, associated with the sixteen dial register on shaft 228, have attached to them the ends of two leaf springs 242 and 242'. These two leaf springs have fastened to their free ends teeth 243 and 243', each of which projects through one of two diametrically opposite square holes on the washer 241. These teeth 243 are similar to the teeth 236 which protrude from the side of the accumulator gear. The washers 241 of the eight-dial register are not provided with these leaf springs and teeth.

Between the accumulator gear 231 and the washer 241 and free to turn on the bushing 240 is a disc 244 (Fig. 21) which is provided with ten equally spaced square holes 245 and which has the numeral dial 246 fastened to its outer periphery. The numeral dials are each provided with a slot 247 (Figs. 50 and 51) on the outer surface, into which the dial guide 248 fits for the purpose of holding the dials in the proper alignment laterally with respect to the apertures 79 through which they may be viewed. Each of these dial guides 248 is fastened to bar 248' which is secured at its ends to side plate 76 and support plate 162. Associated with each register dial is a cup-shaped piece 249 which is fastened to or may be made integral with a bushing 250 which is fixed to the register shaft. A plunger 251 and an expansion spring 252 are fitted in each of the holes 253 which run diametrically through the register shaft and the bushing 250 in the manner illustrated. The rounded end of the plunger 251 extends through a hole in the cup-shaped piece 249 and co-acts with any of the ten equally spaced grooves 254 on the inner surface of the register dial, thereby functioning to centralize any number on the outer surface of the dial directly opposite the aperture through which it may be viewed. The plunger cooperating with the grooves also serves a purpose in connection with the resetting of the dials to zero as will be explained later.

If the shaft 228 is shifted axially to the right then the accumulator gears 230 and bushings 240 move to the right with it since they are located between bushings 250 which are secured to the shaft. This motion of gears 230 to the right brings the ratchet teeth 236 in mesh with holes 245 of disc 244 so that the numeral dials 246 will be turned in the direction of increasing numbers when the sector gears and accumulator gears are rocked. If the shaft 228 is shifted axially to the left then the ratchet teeth 243 will mesh with the holes 245 of disc 244 since they are mounted on disc 241 which is secured to and moves with bushing 240. If now the sector gears and accumulator gears 230 are rocked then the numeral dials 246 will be turned in the direction of decreasing numbers since the backs of the teeth 243 slope in the opposite direction to the backs of the teeth 236. The eight-dial register is actuated from the sector gears only when the multiplier is set up in that register in a multiplication problem, and for that reason the leaf springs 242 with ratchet teeth 243 are omitted from its assembly. In order to move the shaft 229 to the right for this operation the left end of the shaft is provided with a slot 255 (see Figures 43 to 45) in which a pin 256 is held by a short lever 257 which is pivotally fastened to bracket 258. The pin 256 extends through the lever 257 and its other end fits into a slot 259 formed in a sliding cam member 260. This sliding cam member has another slot 261 with the supporting and guiding pins 262 passing through it. These pins and also the bracket 258 are fastened to strip 263 which in turn is supported by plate 98. When the cam member 260 is moved by lever 264 which is fastened to it by pin 265, the slot 259 causes the pin 256 to transmit an axial motion to the shaft 229.

The register shaft 228 is shifted axially by a similar mechanism in which the pin 266, Figures 9 and 52 is held in the slot 267 of the shaft and is guided by the slot 268 in sliding cam member 269 which receives motion from link 270 in a way that will be described under the heading "General control devices and mechanism."

The register dials must be of the lightest construction consistent with the required strength so that the forces due to inertia will be reduced to a minimum. Each numeral dial is constrained to move in a step by step movement by a latch piece 271, Figures 23, 24 and 51 fastened to leaf spring 272 which keeps it in engagement with the semi-circular teeth 273 which are fastened to the side of each numeral dial. This prevents the inertia of the dial from carrying it past the proper position. Means are provided to remove the latch pieces from engagement with the numeral dial so as to allow the dial to turn freely when it is being reset to zero. Integral with each latch piece 271 is a finger 274 which fits into a grooved impression 275 on the outer surface of the cup-shaped piece 249. The finger does not fit tight against the impression thereby permitting the pieces 249 to freely move when the register shaft is being shifted axially. However, when the register shaft is turned the finger 274 is cammed up by the sides of the impression thereby lifting the latch piece 271 from engagement with the teeth 273 to enable the dial to move freely with the shaft. The end of finger 274 slides along the surface of the piece 249 until the shaft has made one complete revolution, when it again drops into the impression. The means for turning the shaft when it is desired to reset the dials to zero will be explained under the heading "Dial clearing mechanism." The numeral dials and spring pressed latches may be designed in other ways which would possibly be more practical.

*Direct counting mechanism*

When problems in addition and subtraction are being solved the eight-dial register is inactive. In performing a problem in multiplication, the multiplier is first entered in this register by the actuating mechanism in the same manner as numbers are added to the sixteen-dial register in addition. The multiplicand is then repeatedly added into the sixteen-dial register as determined by the figures of the multiplier. To control these additions of the multiplicand the figures of the multiplier must be reduced to zero successively in the respective ordinal positions. In a somewhat similar manner, the number of repeated subtractions of divisor from dividend in successive ordinal positions are accumulated in the eight-dial register to give the quotient. The mechanism which performs this direct counting is about to be described.

On a shaft 276, Figures 33 and 34 which is suitably supported in a position adjacent to and parallel with the eight-dial register, are eight axially aligned single-toothed gears 277. These single-toothed gears are integral with hubs 278 which are splined to the shaft 276 so that the gears may be shifted axially. Fixed to the shaft are nine sleeves 279 so positioned that they act as an anchorage for one end of each of the expansion springs 280 which exert a pressure on the splined hubs 278. The single-toothed gear is separated from the next sleeve by the forked end of lever 281. The expansion springs thus maintain the single-toothed gears 277 in their normal position such that when the shaft is turned they will cause no actuation of the numeral dials.

If the lower end of any lever 281 which is fulcrumed by pin 282 in strip 283, be deflected to the right then the forked upper end of the same lever will cause the corresponding gear 277 to be shifted to the left so that it will be in the same vertical plane as the semi-circular teeth 273 on the adjacent dial of the eight-dial register. If the shaft 276 is turned when any gear is in this position then the tooth 284 of that gear will engage with the teeth 273 on the side of the register dial thereby causing the dial to turn one-tenth of a revolution for each revolution of the shaft 276. The spur gear 285 keyed to shaft 276 is connected through gear 589 and shaft 544 to the gear train which drives the actuating mechanism.

When additions are being made to the sixteen-dial register the single toothed gear which happens to be in operating position will turn its associated dial in the direction of decreasing numbers, whereas when subtractions are being made the dial will be turned in the direction of increasing numbers. The cyclical position of the teeth 284 when the machine is stopped depends on the direction in which the driving gears were turning as will be clear from the description of the stopping mechanism.

In performing a multiplication problem the figures of the multiplier are reduced to zero by beginning with the lowest denominational order, which appears in the dial at the right, and then proceeding successively to higher orders until the multiplier is wiped out of the dials. To accomplish this it is evident that the lower ends of the levers 281 must be deflected to the right successively, beginning with the one farthest to the right and proceeding to the left. In performing division the number of repeated subtractions of divisor from dividend in successive denominational positions are registered successively in the dials, beginning with the dial farthest to the left and proceeding to the right. To accomplish this the lower ends of the levers 281 must be deflected to the right in the reverse order to that necessary in multiplication.

Conveniently disposed near the lower ends of levers 281 is a cam shaft 286 on which are secured the eight cams 287—1, 287—2, 287—3, 287—4, 287—5, 287—6, 287—7, 287—8 and also the eight cams 288—1, 288—2, 288—3, 288—4, 288—5, 288—6, 288—7, 288—8. The cams 287 which operate in division to cause the desired deflection of levers 281 are arranged spirally about the cam shaft 286 in a counter-clockwise order as seen from the left end of the shaft (Fig. 33), beginning with cam 287—1 and ending with cam 287—8 at the opposite end. Normally the cam 287—1 is in an inoperative position but if the cam shaft is turned one-sixteenth of a turn clockwise, as seen from left end, then the beveled leading edge 289 of the cam wipes past the finger 290 on the lever 281 causing it to move its associated single-toothed gear into operating position. The cam retains the lever in position until the cam shaft is automatically turned another sixteenth of a turn to an idle position by the control mechanism. At the proper time the control mechanism again turns the cam shaft one-sixteenth of a revolution in the same direction so that the cam 287—2 comes into its operating position. This continues until each of the eight cams 287 have successively been in operating position and the cam shaft has made one complete revolution. The division problem will then be complete and the quotient appears in the eight-dial register. The cam shaft is turned to successive operating positions by means of ratchet gearing which will be described under the heading "General control devices and mechanism."

The cams 288 which operate in multiplication to cause the desired deflection of levers 281 are arranged spirally about the cam shaft 286 in a clockwise order as seen from the right end of the shaft, beginning with the cam 288—1 and ending with cam 288—8 at the left end of the shaft. It was explained in the previous paragraph how the turning of the cam shaft brought the cams 287 successively into operation. In order that the cams 288 may similarly be brought to operating position by turning the shaft, it is first necessary to move the shaft axially a slight distance to the right. This is accomplished when the multiplication result key 88 is depressed, the lower end of which is connected by pin 291 (see Figs. 24 and 39) to the bell crank 292 to which is connected the pitman 293 by means of pin 294. Thus, when the result key 88 is depressed the pitman 293 causes the sliding cam member 295, Figures 15 and 24 to shift toward the rear of the machine so that its cam slot 296 moves the pin 297 which is also held in the slot 298 at the right end of the cam shaft by the short lever 299. The pin 297 in this manner moves the cam shaft sufficiently far to the right so that the cam 288—1 strikes the finger 300 of its associated lever 281 (see Fig. 15) and by means of that lever the corresponding single-toothed gear is moved to operating position. In this position of the cam shaft only the cams 288 can actuate the levers 281 when the cam shaft is turned, while the cams 287 are sufficiently far to the right so that they cannot touch the fingers 299. The cam shaft is held in this position until the multiplication problem is completed when the result key 88 is automatically released from its depressed position.

In multiplication the cam shaft is turned one-eighth of a revolution each time by means of suitable ratchet gearing which will later be described. After the cam 228—1 has been in operating position long enough so that the figure of the multiplier in its associated register dial will have been reduced to zero, then the cam shaft is automatically turned one-eighth of a revolution so that the cam 228—2 is brought to operating position. This process continues until each of the eight cams 288 have successively been in operating position and the cam shaft has made one complete revolution. The multiplication problem will then be complete and the product appears in the sixteen-dial register.

The cam shaft is supported near its left end by bracket 301 which is secured to the base plate and at its right end by plate 302. To assure that the cam shaft will not turn beyond the proper position after actuation by means of the ratchet gearing, a latch lever 303, Figure 26, is pivotally mounted on shaft 143 and held by spring 304 so that the pin 305 which is secured to the latch lever engages the semi-circular teeth 306 of a suitable gear 307 which is secured to the left end of the cam shaft. The pin 305 is long enough so that it will remain in engagement with the teeth when the cam shaft is moved to the right for multiplication. The control devices which are mounted on the cam shaft will be described later.

*Carrying mechanism*

When a number appears in any dial of the sixteen-dial register and another number is to be added to it such that the sum of the two numbers is greater than ten, then means must be provided to cause the addition of one (1) to the dial of the next higher denominational order. Similarly, when a number appears in any one of the aforesaid dials and a greater number is to be subtracted from it, then means must be provided for subtracting one (1) from the dial of the next higher denominational order. The device by which this is accomplished is known as the carrying mechanism.

The principle of the mechanism which performs each individual carry-over in the present machine is old in the art of calculating machines, but the way in which these are combined into a complete unit is entirely new. The nature of the selector switch being such that in division it causes the seven dials at the left end of the sixteen-dial register to act as though they were taken as a group and placed to the right of the other nine dials. In other words, in performing division, the dividend is first entered from the eight ordinal columns of the keyboard into the eight numeral dials at the right end of the 16-dial register. The divisor which is next set up on the keyboard is repeatedly subtracted from the dividend in its highest orders until the remainder of the dividend in those orders is smaller than the divisor. The selector switch then turns to the next position so as to electrically connect each order of the keyboard to the next lower order of the accumulating mechanism from the order to which it was just connected. There being no lower orders of the accumulating mechanism farther to the right, but since the selector switch is cylindrical, it serves to electrically connect the units order of the keyboard to the accumulating mechanism associated with the numeral dial at the left end of the 16-dial register. For each successive operating position in division the electrical connection between the orders of the keyboard and the accumulating mechanism is shifted one order to the right except that the connection between that order of the keyboard which happens to be connected to the units order of the accumulating mechanism is always shifted to the order of the accumulating mechanism at the left side of the machine. Thus it becomes clear how these seven dials at the left end of the 16-dial register operate in division as if they were taken as a group and actually built into the machine at the right side of the other nine dials of that register. Therefore, the carrying mechanism must be of such construction that in division it will perform the carry-overs correspondingly, whereas in addition, subtraction and multiplication the carry-overs proceed in the usual manner beginning at the right end of the register and finishing at the left end. At this point it might be well to explain that if means are provided for turning the selector switch at the start of a division problem to the same position which it last occupies when multiplication is being performed, then the individual carry-overs can always proceed from the right end of the register to the left, and the carrying mechanism can be of the usual type which is employed in reversible key-set machines. In this position of the selector switch the dividend will be registered in the eight dials from the second to the ninth inclusive from the left end of the register. The divisor is then subtracted from the dividend in successive ordinal positions until the selector switch is returned to its normal position and the division problem is completed.

On a shaft 308, Figure 33, which is located just above the sixteen-dial register and is parallel to the register shaft 228, are pivotally mounted the sixteen carrying cam levers 309 one of which is associated with each register dial. These carrying cam levers are normally held in such position that when a dial is turning from 9 to 0 or from 0 to 9, the pin 310 which is secured to the side of the register dial strikes the cam edge 311 of the lever and pushes it outwardly from the dial. Secured to the shaft 308, Figures 24, 33 and 34, are the spring holders 312 which have a bent-over end 313 protruding through a hole 314 in the carrying cam lever thereby serving to limit the pivotal movement of the lever. The springs 315 serve to hold the carrying cam lever at either limit of their pivotal motion.

On the carrying mechanism shaft 316 are pivotally mounted groups of disc sectors 317, 318, 319 and 320 (see Figures 55 to 60) which are maintained in their proper axial alignment by separating-sleeves 321 secured to the shaft. The rod 322 passes through a slot 323 in each of the disc sectors 317 and a similar rod 324 passes through similar slots 325 in the disc sectors 318. The disc sectors 319 are held together by a rod 326 which passes through a hole in each of them and the disc sectors 320 are similarly held together by rod 327. Near the center of the carrying mechanism the end of the rod 326 is securely fastened to the end of rod 324 by a link 328, Figure 43, and the rod 327 is similarly fastened to the rod 322 by link 329. Between the various disc sectors 317 and 319 are the carrying pieces 330 which in conjunction with the carrying cam levers 309 perform the necessary carryovers when numbers are being subtracted from the register dials. Between the various disc sectors 318 and 320 are the carrying pieces 331 which in a similar manner perform the carryovers when numbers are being added to the register dials. Fig. 27 shows one of the carrying pieces 330 in operation. The dial at the right has just turned from 0 to 9 and caused its carrying cam lever 309 to be pushed outward by the pin 310. The carrying mechanism is turning in a counter-clockwise direction as seen from the right end, and the subtraction carrying piece 330 is being shifted to the left by the cam edge 332 (Figs. 27, 33 and 34) of a lever 309 which has been caused to pivot on its shaft 308 by the action of the pin 310 of its associated register dial, as has been described, thereby to position the cam edge 332. In this position of the carrying piece 330 the finger 333 engages the semi-circular teeth on the side of the numeral dial and causes the dial to be turned one-tenth of a revolution as the carrying mechanism turns. The carrying piece 330 is pushed back to its normal position by the expansion spring 334 when it has passed the cam edge 332. As the carrying mechanism continues to turn, the edge 330—1 of piece 330 strikes the end 335 (see also Figs. 24 and 33) of the carrying cam lever and pushes it toward the dial in readiness for another actuation by the pin 310. The carrying pieces 331 perform the carry-overs in a similar manner when additions are being made on the dials, except that their edges 331—1 (see Figs. 57 and 60) are cut deeper than the edges 330—1, or in other words the edges 331—1 are closer to the center of shaft 316 so that these edges cannot strike the edge 335 of carrying cam lever 309. Since the rotation of the carrying mechanism with shaft 316 is now in the opposite direction it is evident that if edges 331—1 struck the cam edges 335 of levers 309 they would push said levers 309 out of operating position, that is, before the carry-overs could be performed by edges 332 causing the pieces 331 to shift laterally in the same manner as pieces 330 were moved. These edges 331—1 being cut deeper make it possible for the carryovers to first take place, and subsequently as shaft 316 continues to turn, the edges 330—1 of pieces 330 strike the cam edges 335 of carrying cam levers 309 to move these levers out of operating position.

The carrying pieces are arranged spirally about the shaft 316 in such a manner that the carrying operation starts in the lowest denominational order of the register at the right end and proceeds to the left. As has been explained, the lowest denominational position in division appears in the seventh dial from the left end of the register so that for a division problem the carrying operation must begin at this dial and proceed to the left, then continue from the right end of the register to the ninth dial from that end. The cam member 336, Figures 16 to 18, splined to the shaft 316 at its right end serves as the means by which the carrying pieces 330 and 331 can be arranged to operate in the proper succession for the division problem. The forked ends of lever 83, Figure 14, which is fulcrumed on pin 337 are provided with pins 338 and 338' which fit into the slot 339 of the cam member 336. By means of the lever 83 the operator can shift the cam member 336 axially and the expansion spring 340 serves to hold it in either of its shifted positions. This spring is fastened to the lower fork of lever 83 (Figs. 14 and 54) and at its other end to a U shaped piece 341 which can swing about its support pins 342 and 342' within the limits of the stop brackets 343. When lever 83 is shifted sideways to the right, for example, the cam member 336 is shifted to the left by pins 338 and 338' as described and the lower fork of said lever moves toward piece 341, which during the previous shifting swung to the left against stop bracket 343', and the expansion spring 340 is compressed. A little before lever 83 reaches the limit of its travel the spring 340 has been moved so that it suddenly expands and pushes piece 341 to the right against stop bracket 343, the other end of said spring exerting a pressure on the lower fork of lever 83 thereby serving to hold cam member 336 in position at the left where it was just shifted. The principle of this shifting device is known as the "load and fire" principle and is the same as is commonly used in electrical snap switches.

For addition, subtraction and multiplication the cam member 336 must be shifted to the right as shown in the illustrations. For division the cam member must be moved axially to the left so that its two slots 344 and 345, which engage the flat-headed ends 346 and 347 of the rods 322 and 324 will guide these rods so that they will be turned in opposite directions about the shaft 316 to the positions indicated by the slot ends 348 and 349 respectively. These slots 344 and 345 are so shaped as to form cams which cause rods 322 and 324 to be turned, as just explained, when cam member 336 is shifted to the left on its shaft 316. Secured to rod 322 along its length are a series of pieces 350, Fig. 56, which are pivotally mounted on shaft 316. These pieces 350 serve to brace the rod so that it will not bend when pressure to turn it about shaft 316 is applied at the right end by cam member 336. Rod 324 is similarly braced by pieces 350' which are pivotally mounted on shaft 316. These rods 322 and 324 move to the opposite ends of the slots 323 and 325 respectively and turn the disc sectors 317 and 318 about the shaft 316 until their sides come up against the stop rod 351 which is secured in position with respect to the shaft by the pieces 352. Since the rods 322 and 324 are fastened to the rods 327 and 326 respectively, therefore, the disc sectors 320 must move about the shaft in unison with the disc sectors 317. Similarly the disc sectors 319 must turn with the disc sectors 318. It is clear how this arrangement changes the order in which the various carrying pieces will come into operation as the mechanism is revolved. The carrying pieces near the center and at the ends of the mechanism must be of different construction than the pieces 330 and 331. Normally the piece 353 is connected to the piece 354 by a suitable hook-and-eye joint 355 and the piece 356 is similarly connected to piece

357 as is illustrated in Figs. 57 and 60. The carrying pieces 358 and 359 at the right end of the mechanism are provided with extensions 360 and 361 respectively in the ends of which are rectangular holes 362. The pieces 363 and 364 at the left end have similar extensions the ends of which are bent over and pointed so as to form a suitable hook 365 to engage the hole 362. When the rearrangement of the mechanism is effected by moving the cam member 336 to the left as described, the joints 355 are opened up and the hooks 365 engage the holes 362 thereby enabling the carry-over to occur from the dial at the left end of the register to the dial at the right end and no carry-over to occur near the center where the joints have been opened.

Dial clearing mechanism

Each time that a new problem is begun it is necessary that the register dials be cleared of the figures remaining from the previous problem, that is, each dial must be reset to its zero position. The clearing of the numeral dials of either register is accomplished by the rotation of the register shaft which is provided with means for turning the dials to the zero position. As previously described, each numeral dial is provided on its inner surface with ten equally spaced grooves 254, (see Figs. 50 and 51) and cooperating therewith is the rounded end of plunger 251 which is seated in a hole running diametrically through the register shaft and the bushing 250. The spring 252 serves to push the end of the plunger against the inner surface of the dial thereby holding it in engagement with one of the grooves 254 when any number on the surface of the dial is in its centralized position with respect to the aperture in the casing. When calculations are not being performed the register shafts are so positioned axially that neither of the side ratchet teeth 243 or 236 are in engagement with the register dials. In this position the shaft may be turned in order to cause the clearing of the dials. The latch piece 271, which is held by the spring 272 (see also Fig. 23) in engagement with the teeth 273 on the side of the dial, tends to hold the dial in position as the register shaft begins to turn. Consequently the plunger 251 slips out of engagement with its groove. As the shaft continues to turn, the cup-shaped piece 249 which is secured thereto, pushes the finger 274 outwardly thereby lifting the latch pieces 271 clear of the teeth 273. The spring pressed plunger 251 then engages with the next groove 254 and causes the dial to turn with the shaft.

On each end and near the center of the sixteen-dial register shaft 228 is secured a disc 366, Figures 24 and 43, having a notch therein in which the end of lever 367 is held by the action of tension spring 368. These levers which are formed on the side of rail 369, Figure 34, are pivotally mounted on the shaft 308. When the register shaft 228 is turned for the dial clearing operation, the ends of levers 367 are simultaneously cammed outwardly from the shaft by their associated notches thereby causing the rail 369 to swing a slight distance relative to the pivot shaft 308. The side of this rail is bent over so as to form a right angle thereby making it more rigid. This bent over portion has clearance slots for the spring holders 312 and the carrying cam levers 309. As the rail 369 is swung rearward when the shaft 228 is being turned, it comes in contact with the edges of the carrying cam levers and serves to hold them in their normal position so that the cam edge 311 stops the pin 310 when the register dial reaches its zero position. After the register shaft has made one complete revolution the ends of levers 367 are pulled into the notches of discs 366 by the springs 368, thereby swinging the rail 369 away from the carrying cam levers so that they are free to be pushed into operating position by the pins 310 when the dials are turned by the actuating mechanism.

The eight-dial register is similarly cleared by turning the register shaft 229 through one revolution but the means for stopping the register dial at zero position is different. The dials of this register are provided with a pin 370, Figures 33, 39 and 40, which is similar to pin 310 but differently located. A hook lever 371 fulcrumed near its center by pin 372 is held by tension spring 373 so that its hooked end is in the path of the pin 370. This hooked lever serves to stop the dial at its zero position only when it is turning in a counter-clockwise direction as seen from the left end of the register shaft, this being the direction in which the register shafts are turned in the dial clearing operation.

A spur gear 374, Figures 9 and 14, is secured to the register shaft 228 just to the right of the frame plate 162, and a similar gear 375 is secured to the right end of the register shaft 229. The gear 374 is in mesh with another similar gear 376 secured to shaft 377 and the gear 375 is in mesh with a gear 378 secured to the shaft 379. Associated with the shaft 377 is a clutch 380, Figures 52, 31 and 32 and another clutch 381 of the same construction is associated with the shaft 379. These clutches are similar to two others used in connection with the control devices, one of which is illustrated in Figures 31 and 32. Each of these four clutches consists of a driving gear 382 which is in mesh with other gears driven from the electric motor, the housing 383, and a turning key 384 which is located in a semi-circular slot 385 in the shaft upon which the clutch is mounted. The gear 382 is normally free to turn with respect to the shaft and the housing, and it is provided with a shoulder 386 over which the housing extends. The turning key 384 is a rod which is seated in said semi-circular slot 385 and is cut away on the portion under gear 382 so that its outer surface conforms to the peripheral surface of the shaft upon which it is mounted. In other words it completely fills slot 385 at the position where gear 382 turns. By turning the said key 384 in its semi-circular seat, it can be caused to engage suitable semi-circular key-ways in gear 382, and for that purpose it is provided with a lever 387 extending through a slot in the housing which limits the angle through which the key can be turned. The circular end 388 of the turning key which fits into the keyway in the housing prevents the housing from turning relative to the shaft. A tension spring 389 anchored to the housing exerts a pull upon the lever 387 thereby tending to turn the key in its seat so that it will engage one of the two or more semi-circular key-ways 390 when they are turned to the proper position. The key is prevented from turning by means of a suitable clutch control lever which holds the end of the turning key lever 387, the clutch associated with the sixteen-dial register being held from engagement by the lever 391 and the clutch of the eight-dial register being held from engagement by the lever 392. When the clutch is thus held from engagement, the action of the spring 389 has a tendency to turn the shaft upon which the clutch is mounted. To counteract this tendency the eight-dial register shaft is provided with a disc 393, Fig. 14, having a notch in which the end of spring-pressed latch lever 394 is disposed. In the case of the sixteen-dial register the motion is prevented by the notched discs 366 and the levers 367.

The clutch control levers 391 and 392 are pivoted to a stub shaft 395 secured to the frame plate 162 and side plate 77 and are connected by sliding joints with the stems of keys 92 and 93 respectively (see Figs. 14 and 2). The stems of keys 92 and 93 extend through holes in the top plate 396 and at their lower ends are guided by bracket member 397. Expansion springs 398 serve to hold these keys in their normal non-depressed position so that the clutch control levers 391 and 392 remain in engagement with the turning key levers of their respective clutches. Secured to each of the key stems 92 and 93 and insulated therefrom with dielectric material are electrical contact pieces 399 which serve to join electrically the two spring contact brushes 400 when either key is depressed. These contacts are in the circuit of the driving motor. Thus, when it is desired to reset the dials of either register to zero, the corresponding key is depressed, whereupon the motor starts to drive the gear train which turns the clutch gear 382 and the clutch control lever allows the turning key of its associated clutch to engage and cause the rotation of the register shaft. When the key is released the clutch control lever will strike the end of the turning key lever which projects from the housing thereby disengaging the clutch and stopping the register shaft in its initial position. Suitable mechanism which will be described later is provided to clear the sixteen-dial register automatically in multiplication. A clutch of a different type than that which has been described could be substituted if desired.

*General control devices and mechanism*

The calculating machine is driven by an electric motor 401 through an epicyclic gear train by means of which a reversal of rotation and a reduction of speed is obtained. Secured to the reduced end of the motor shaft 402 is a gear 403, Figures 12, 14 and 9, which is in mesh with two similar planetary gears 404 and 405 which are supported in positions diametrically opposite from each other by pins 406 and 406' extending from the support member 407 that is free to turn on the stud shaft 408 secured to the side plate 77. The planetary gears 404, 405 are in mesh with the internal gear 409 which is supported by the four-armed web member 410 that is free to turn on a reduced diameter of the member 407. This member 407 is of such construction that the web member 410 can be easily assembled upon it. Secured to the side of the planetary gears 404 and 405 and also mounted on pins 406 and 406' are gears 411 and 411' which are in mesh with another gear 412 that is free to turn on the motor shaft 402. If means are provided to hold the gear 412 stationary and allow the internal gear 409 to revolve freely when the motor is turning, then it is evident that the planetary gears 404, 405 and their support member 407 will be turned in a direction opposite to that in which the motor shaft 402 is turning. If instead the internal gear 409 is held stationary and the gear 412 allowed to turn freely then the planetary gears and their support member are driven in the same direction in which the motor shaft turns. The ratio of the gears of this epicyclic train is such that the speed of the motor is reduced to that at which the actuating mechanism is to operate. The gear 413 which is secured to the member 407 drives the train of similar gears 414, 415, 416, 417, 418, 419, 420, 421, 422, 423, 424 and 424' (see Figs. 9, 10, 14 and 54).

Means are provided to stop either the gear 412 or the internal gear 409 and hold it stationary, thereby causing the motor to drive the actuating and carrying mechanisms in either direction. The hooked end of the claw lever 425, Figures 9, 13 and 14, can be raised so that it will come into the path of the points 426 of the web member 410 and serve to hold the internal gear stationary. The means for raising claw lever 425 will later be described. A similar claw lever 427 can be raised so that it will engage the four pointed stopping piece 428 which is secured to the side of gear 412 and serve to hold that gear stationary. Each of these claw levers consists of two parts which are slidably fastened to each other by pins 429 and 430. The spring 431 which is fastened to the two parts of the claw levers serves to cushion the impact when the claw lever stops its associated gear. Each claw lever is anchored to the base plate by means of bracket 432 and is held in proper lateral position by guide pieces 433.

The gear 423, Figures 9 and 54, is secured to the stub shaft 434, that is supported by bracket 435 and side plate 77, and adjacent to it is the intermittent gear 436 which is also secured to stub shaft 434. This intermittent gear is in mesh with another intermittent gear 437 which is secured to and drives the carrying mechanism shaft, and also with a similar intermittent gear 438 which drives the shaft 227 to which the actuator crank 226 is secured. The purpose of this intermittent gearing is to permit a greater number of carrying elements to be arranged on the periphery of the carrying mechanism or to allow them to be spaced farther apart radially thereby making the carrying mechanism more compact for a machine of a given capacity. When the actuating mechanism is making either additions or subtractions the carrying mechanism is held stationary and for this reason the carrying elements can be arranged almost completely around the carrying mechanism. The gear 424 which is also secured to the stub shaft 434 is in mesh with gear 424' which turns the stub shaft 439 to which the stop crank 440 is secured.

Pivotally fastened to the left ends of pins 441 and 442 which extend through the support plate 162 are levers 443 and 444 respectively (see Fig. 24). These levers are pivoted at their lower ends by pins 445 and 446 to plate 447 so that the pins 441, 442, 445 and 446 form a parallelogram with one fixed side. In a manner to be later described the depression of certain of the control keys will cause the plate 447 to swing on the pivot links 443 and 444 toward the rear of the machine against the action of the spring 448. The plate 447 is provided with a slot 449 which engages a pin 450 fixed to a piece 451 which is slidably supported by the guide brackets 452 and 453. By means of the control keys the plate 447 can be swung to such a position that its slot 449 pushes pin 450 to its lowest position, and by means of certain control mechanisms, the plate 447 can be swung farther to the rear so that the slot 449 will lift the pin 450 back to its normal position.

On the right side of support plate 162 and pivotally mounted on the right ends of pins 441 and 442 are levers 454 and 455 (see Figure 14). These levers are pivoted at their lower ends by pins 456 and 457 to plate 458 which functions similarly to plate 447 and is provided with a slot 459 so disposed that one end of it is in engagement with pin 460. The pin 460 extends through a suitable opening in support plate 162 to its left side where it is secured to piece 461, Figure 24, which is slidably supported by the guide brackets 452 and 453 in the same manner as is the piece 451. By means of certain control keys the plate 458 can be swung rearward on its pivot levers 454 and 455 against the action of spring 462 so that its slot 459 pushes the pin 460 to its lowest position, which occurs when the pivot levers 454 and 455 are perpendicular to a line through the centers of pins 441 and 442. By means of certain control mechanisms which will be described, the plate 458 can be swung farther to the rear so that its slot 459 will lift pin 460 back to its normal position.

Pivoted to the pins 450 and 460 are links 463 and 464 respectively which are pivotally connected to each other and to the end of lever 465 by pin 466. The pin 466 is slidable in slot 467 of the lever 465 which is secured to the stub shaft 468. When the pin 450 is pushed downwardly by the action of plate 447 the lever 465 is swung through a small angle toward the rear of the machine thereby rocking the stub shaft 468 correspondingly. Similarly if the pin 460 is pushed down, the stub shaft 468 is rocked in the oposite direction. The construction shown in Figure 24, which is composed of sliding pieces 451, 461, links 463 and 464, lever 465 and their associated pins is such that either of the pins 450, 460 cannot be pushed down when the other is in its lowest position.

Secured to the stub shaft 468 is the lever 469, Figure 9, which is connected by a sliding joint with one arm of the bell-crank 470 which is pivoted on the shaft 147. The other arm of this bell-crank is pivoted to the end of pitman 471, Figures 13 and 14, which is loosely connected by pin 472 to the sliding cam member 473 in such a way that this joint will not bind when the end of pitman 471 is raised due to the slight curvature of the arc through which the bell-crank turns. The cam member 473 is provided with a slot 474 through which extend the guide pins 475 that are secured to the base plate, and with two lugs 476 and 477 each of which a has beveled edge 478. If the cam member is moved toward the rear of the machine the beveled edge of lug 476 will slide under the end of the claw lever 425 and thereby lift it into engagement with the stopping points 426 of the web member 410.

Also secured to the stub shaft 468 is the lever 479 which is pivoted at its end to the link 270 which moves the sliding cam that causes the register shaft 228 to shift axially. Fastened to the link 270 by a sliding joint is the lever 480 which is fulcrumed on the stub shaft 481. The other end of this lever is provided with a roll 482 which engages the cam edge 483 of the stopping cushion lever 484, Figure 25, which serves to stop the main actuator crank and the carrying mechanism in the proper cyclical position. This stopping cushion lever is comprised of pieces 485 and 486 which are pivoted to the stub shaft 487 and held in fixed position relative to each other by pins 488 and 488'. The pin 488 also serves as a pivot for a roll to be later described. The stopping piece 489 is slidably connected to the pieces 485, 486 by the three pins 490—1, 490—2, 490—3 and the tension spring 491 tends to pull it radially away from the stub shaft 487. This spring connection acts as a cushion when the motion of the actuating and carrying mechanisms are suddenly stopped.

Pivoted to another stub shaft 492, Fig. 9, is a hammer-like lever 493 which is pivotally joined to pitman 494 that connects to the crank pin 495 of the stopping crank 440 secured to the stub shaft 439 on which the gear 424' is mounted. When the machine is not operating the bent-over flange 496 of the hammer-like lever 493 rests on top of the stopping piece 489. When the stub shaft 468 is rocked in either direction in the manner described, motion is transmitted to the lever 480 so that the roll 482 cooperating with the cam edge 483 causes the stopping cushion lever to swing rearward against the action of spring 497 so that the stopping piece 489 is out of the path of the hammer-like lever. A roll 498 of insulating material closes the electrical contacts 499 in the driving motor circuit when the stopping cushion lever releases the hammer-like lever. The various mechanisms which have been described are so timed that upon starting the machine the motor is first started by the closing of contacts 499, then the stopping mechanism disengages, and finally the claw mechanism associated with the epicyclic gear train operates to cause the motor to drive the machine.

In Figures 9 and 11 the intermittent gears which drive the actuating mechanism and the carrying mechanism are shown in the position which they assume when stopped after performing additions. If now another addition is to be performed, the gear 436 will be turned in a counter-clockwise direction as seen from the right side. For the first third of a revolution of gear 436 the gear 438 will be turned one-half a revolution in a clockwise direction while the gear 437 remains stationary. During the next one-third revolution of gear 436 the gear 438 continues to turn for another half revolution while the gear 437 is similarly turned through one-half revolution. During the last third of a revolution of gear 436, the gear 438 remains stationary while the gear 437 completes its revolution. Starting from the same position, if a subtraction is being performed the gear 436 which now turns in a clockwise direction (as seen from the right side) will turn the gear 437 one-half revolution and hold gear 438 stationary during its first one-third revolution. During the second-third of a revolution of gear 436, the gear 437 completes one turn and gear 438 is turned through its first half revolution. During the last third of a turn the gear 437 is held stationary and the gear 438 completes one turn. However, after a subtractive actuation follows a previous additive actuation the gears do not stop in this position but continue to turn for another one-third revolution of gear 436. This is due to the nature of the stopping mechanism since the stopping crank 440 can turn counterclockwise (Fig. 9) through 120 degrees before the flange 496 of the hammer-like lever is stopped by the stopping cushion lever. At the end of an additive actuation the gears 436—438 and their drive are always stopped in the position shown in Figs. 9, 11 and 24 by the stopping mechanism. At the end of a subtractive actuation these gears 436—438 and their drive are always stopped in the position which they assume after the gear 436 has turned one-third revolution in a clockwise direction from the position shown in Figs. 9, 11 and 24. When like actuations follow each other the gear 436 always makes one revolution for each actuation whether it is additive or subtractive. However, when unlike actuations follow each other, the gear 436 makes one and one-third revolutions before being stopped by the stopping mechanism consisting of crank 440, pitman 494, hammer-like lever 493, cushion piece 489, etc., which have been described and are clearly illustrated in Fig. 9. This last one-third revolution of gear 436 in a clockwise direction at the end of a subtractive actuation has caused the gear 437 and its associated carrying mechanism to make one-half of a revolution in a counter-clockwise direction as seen in Figs. 9, 11 and 24. During this half revolution the carry-over of the tens is performed in subtraction by the pieces 330 of the carrying mechanism. After performing the carry-over, each individual carrying piece 330 strikes the end 335 of the carrying cam lever 309 to throw it out of operating position with the carrying mechanism, as has been described with reference to Figure 27 in the detailed description of the carrying mechanism. Since after a subtractive actuation the gear 437 has stopped at a position one-half revolution from that shown in Fig. 11, then upon the next actuation, whether it is additive or subtractive, the gear 437 and the carrying mechanism on the same shaft are first turned by one-half revolution to the position shown in Figs. 11 and 24. This turning of the carrying mechanism cannot cause improper results since the carrying cam levers 309 have been thrown out of operative position. The gear 438 drives the shaft 227 to which the actuator crank 226 is secured (see Fig. 24). Since the drive of the actuating sector gears 179—180 is the same for addition or subtraction, from crank 226, it is not necessary to reverse the rotation of gear 438 for that purpose. However, since the drive of the carrying mechanism (gear 437) must be reversed, it is necessary to drive the actuating mechanism from the same reversible gearing because the actuators and carrying mechanism must work in unison. Also this reversible intermittent drive of the actuators is necessary in the machine described because it provides a means of holding the actuators stationary during the last 120 degrees of rotation of the stopping crank 440 (Fig. 9) prior to stopping the machine. The stopping device which is about to be described is adapted to act as a cushion, thereby to absorb the shock incident to stopping the machine. After coming to a dead stop the crank 440 may rebound slightly. During such rebounding action the actuating sector gears 179—180 are held perfectly still by means of the gearing just illustrated. The intermittent gearing which has been described serves to hold the carrying mechanism stationary while the actuating mechanism is turning the register dials in either direction and performs the carry-overs immediately after the actuating mechanism has performed its function. The various mechanisms are timed so that when the machine is being stopped the claw mechanism first releases to disengage the motor from the machine then the lever 480 permits the stopping cushion lever to be pulled against arc-edge 500 of the hammer-like lever by spring 497. When the crank 440 lifts the flanged portion 496 above the stopping piece 489 the stopping cushion lever is pulled farther by spring 497 so that it opens the motor circuit contacts 499 and stops the machine when the bent-over flange 496 comes down to strike the stopping piece.

Secured to the motor shaft 402, Figs. 14 and 10, and adjacent to the epicyclic gearing is the gear 501 which drives the gear train that turns the gears 376, 382 associated with the dial clearing mechanism, and also transmits the power to turn the shaft 147 to which the clutch member 146 is secured. This train of gearing consists of the gears numbered from 502 to 521, consecutively, the gear 520 being mounted with gear 519 on the same shaft 492, as shown in Figs. 9 and 54. With the exception of gears 507, 508, 515 and 516, the gears of this train are free to turn upon their respective shafts. The gears 503 and 504 are fastened together by means of a suitable bushing 522, and the following pairs of gears are fastened together by pins so that they are essentially double gears: 505 and 506, 507 and 508, 509 and 510, 511 and 512, 513 and 514, 517 and 518, and 519 and 520. The gear 515 is secured to the shaft 147 and, as previously described, it continues to revolve the clutch member 146 as long as the motor turns. The gear 516 rotates at the same speed as gears 507 and 508, since they are all secured to the same stub shaft, and it transmits power through gears 517, 518, 519 and 520 to the gear 521 (see Fig. 9) which drives the gears 376, 382 of the dial clearing mechanism.

The control keys 84 to 90, Figures 35, 39 and 40, inclusive extend through suitable openings in the top plate 396 and through similar openings in the guide plate 523 which lies in a plane parallel to the plane of the top plate. The top plate is supported by plates 121, 162 and 77, whereas the guide plate is supported by plate 524 at its left end and at its right end is provided with a bent over portion 525 that is secured to the base plate 75. Expansion springs 526 which are connected to the key stems serve to normally hold the keys in their non-depressed position. The key stems are provided with abutments 527 which serve to stop them in their proper position when released from the depressed position.

Lugs 528 are cut into the edge of the control keys and cooperating with these lugs of each of the two columns of control keys is a locking rail 529 which is pivotally supported at its ends by pins 530, 531 secured to the bent-over edges of the guide plate 523. These two locking rails which are held against key stems by tension springs 532 function in the same manner as the locking rails 102 of the main keyboard to hold the keys in their depressed position until they are automatically or manually released by causing the rail 529 to swing clear of the lugs 528 on the key stems. Secured to the abutments 527 of each of the control keys excepting the "repeat" key 86 is the electrical contact piece 533 which is electrically insulated from the key stem. When the key is depressed this contact piece completes the circuit between the two similar spring contact brushes 534 which are supported by an insulating block 535 on the lower side of the top plate 396. The closing of these contacts connects the power supply to the key contacts of the main keyboard through the circuits which will be described as a part of the wiring diagram.

The stem of the key 84 below the guide plate is offset so as to allow sufficient clearance for the cams 287, 288 as they turn with the cam shaft, and it is connected by a sliding joint to the lever 536, Figure 40, secured to the shaft 537 which is supported by plate 524 and the bent-over end 525 of the guide plate. Secured to this shaft 537 is the lever 538, Figures 36 and 24, which cooperates with a slot 539 of the plate 447. When the key 84 is depressed this lever 538 causes the plate 447 to swing upon its pivot levers 443, 444 so as to depress the pin 450. In a similar manner the lower end of the key stem 85, Figure 40, is connected by a sliding joint to lever 540 which is secured to the stub shaft 541. A lever 542 secured to the stub shaft cooperates with the slot 543 of plate 458, Figs. 36 and 14, to cause it to swing upon its pivot levers 454, 455 when the key 85 is depressed. The addition key 84 since it acts upon plate 447, causes any number which is set up on the main keyboard to be added to the sixteen-dial register and similarly the subtraction key 85 acting upon plate 458 causes such numbers to be subtracted from the sixteen-dial register. In order to release the key 84 or 85 and also the keys of the main keyboard at the proper time so that only one subtraction will be performed a suitable keyboard clearing mechanism is provided.

Mounted on the stub shaft 544, Figs. 14, 52 and 53, to which are secured the gears 418 and 419, and on each side of the gear 419 are cams 545. These cams are free to turn with respect to the stub shaft 544 within the limits determined by the pins 546 and 547 which extend through the gear and project on each side so as to engage the cams 545. In addition the gear 419 turns in a clockwise direction as seen from the right side so that the pin 546 engages the edge of each cam 545 and turns it with the gear, whereas in subtraction the gear turns in the opposite direction and pin 547 turns the cams with the gear. The lost motion of the cams is provided so that they will come into operating position at the proper time for either direction of rotation. The cam 545 on the right side of gear 419 normally serves to swing the lever 548 forward about its pivot pin 549 a slight distance so that its upper end will deflect the bell-crank 550, Fig. 1a, to which is pivotally connected the keyboard release bar 112. The deflection of the bell-crank causes the release bar to swing the locking rails 529 and 102 away from their associated key stems thereby releasing any control keys or keys of the main keyboard which happen to be depressed.

When it is desired to add or subtract an item more than once then the depressed keys of the main keyboard must not be released automatically. The "repeat" key 86 is provided to be depressed in order to prevent automatic clearing of the keyboard. This key is of the same construction above the guide plate as the other control keys except that it has no electrical contacts to close. The lower end of the key stem 86 extends through a slot in the slide piece 551, Figs. 36 and 39, which is supported by guide brackets 552 and 553. This slide piece is provided with an arm extension 554 which is connected by a sliding joint to a bell-crank type latch 555 (Fig. 36) which is pivotally fastened to the base plate. This bell-crank type latch has a notched end 556 which holds the slide 557 to which the lever 548 is pivotally fastened, from being pulled forward by the tension spring 558. Secured to the key stem 86 is an arm 559, Figs. 39 and 36, which is connected by a sliding joint to a lever 560 extending from the stub shaft 561 which is supported by plates 302 and 162. Fastened to the other end of the stub shaft is the lever 562 which is connected by a sliding joint to the slide 563 on which the lever 564 is pivoted. When the key 86 is depressed the lower end of its stem pushes the slide 551 toward the front of the machine thereby tripping the bell-crank type latch to allow spring 558 to pull the slide 557 so that the lever 548 cannot be actuated by the cam 545. Simultaneously the lever 562 pushes the slide 563 so that the lever 564 can be deflected by its associated cam 545 on the left side of gear 419. The key 86 is then locked in its depressed position by the locking rail 529. In this position the lever 548 cannot operate to release the control keys and the keys of the main keyboard. Instead the upper end of the lever 564 will move the bell-crank 565 so that the release bar 566 (Fig. 40) which is connected to it will swing the locking rail 529 which holds either the key 84 or 85. When the proper number of additions or subtractions of the item have been made, the "repeat" key 86 and the keys of the main keyboard must be released manually by depressing the "clear" key 91. Among other functions which this key 91 performs and which will be later described, its bent-over cam edge 567 pushes the finger 568 of the release bar 112 so that this release bar is shifted to the left far enough to swing the locking rails 529 and 102 clear of their associated key stems in order to release any keys which are depressed. The rising of the "repeat" key 86 removes the lever 564 from operating position.

Connected to the slide 557 by a sliding joint is the lever 569, Figs. 14 and 53, which is secured at its upper end to the shaft 570, Fig. 41. Secured to this shaft is the lever 571 the end of which is provided with pin 572 extending through slot 573 in an extension from the stem of the "clear" key 91. When the "repeat" key was depressed, the motion of slide 557 caused this lever 571 to move the pin 572 to the upper end of the slot 573. Depressing the "clear" key 91 then serves to move the slide 557 back against the tension of spring 558 far enough so that the spring 574 will cause the bell-crank type latch 555 to engage the slide 557 and hold it in operating position.

The multiplication key 87 is depressed after the multiplier has been set up on the keyboard. Connected to the lower end of its stem by a sliding joint is the lever 575 which is secured to the stub shaft 576. Near the right end of this stub shaft which is supported by plate 162 is secured the lever 577, Figs. 24 and 36, which serves to swing the plate 447 on its pivot levers 443 and 444 when the key 87 is depressed. Also fastened to the lower end of key stem 87 by a sliding joint is the lever 578 which is secured to shaft 579 and the lever 580 which is secured to stub shaft 581. Secured to the left end of shaft 579 is the lever 582, Fig. 37, which is connected by pitman 264 to the sliding cam member 269. The depressing of key 87 thus serves to cause the accumulator gear ratchets of the eight-dial register to engage their associated dials in the manner which has been described. The multiplier is added into the sixteen-dial register since the key 87 actuates the plate 447 in the same manner as the addition key 84, to cause the sliding cam member 269 to shift the register shaft 228 to the right. The multiplier is also added into the eight-dial register because the sliding cam member 268 causes the register shaft 229 to shift to the right. It is not desirable to have the multiplier figures appear in the sixteen-dial register since the product is to be accumulated in it by the repeated additions of the multiplicand, so therefore means are provided to clear this register as the key 87 is released. Secured to the right end of stub shaft 581 is lever 583, Figs. 40 and 14, the end of which is bent over to form the shelf 584. When the key 87 is depressed, this lever swings so that the shelf 584 is lifted above the point of the spring-pressed latch pawl 585. The release of key 87 causes this shelf 584 cooperating with the latch pawl 585 to actuate the key 92 in the same manner as if it were depressed manually.

At this point in a multiplication problem the multiplier appears in the eight-dial register and the machine automatically comes to a stop. The multiplicand is next set up on the keyboard and the result key 88 is depressed. Besides the contacts 534 which serve to connect the power supply to the main keyboard, this key is provided with a normally closed set of contacts 586, Fig. 39, which are similar to the contacts 534 and are supported by the insulating block 587 secured to the guide plate 523. These contacts 586 are in the circuit of the driving motor 401 and serve to conduct current to the motor when any of the other control keys 84, 85, 87, 89 or 90 are depressed so that their contacts 534 are closed, provided, of course, that the key 88 is in its normal non-depressed position. The circuits will be completely described under the heading "Wiring diagram."

The key stem 88 is connected by a sliding joint to the bell-crank 292, Figs. 39 and 36, which is fulcrumed on the shaft 576 and which serves to shift the cam shaft 286 to the right in the manner which has been described. The upper point of this bell-crank 292 (see Fig. 24) also actuates the plate 447 in the same manner as does the lever 577 because it is pivoted on the same shaft 576 to which the lever 577 is secured. Both lever 577 and bell-crank 292 thus pivot about the same center and receive an equivalent motion from key 87 through lever 575 and from key 88 respectively. The upper ends of said bell-crank and lever contact with plate 447 at points immediately adjacent to each other. The actuating mechanism now begins to repeatedly add the multiplicand into the sixteen-dial register because of the action of plate 447. The lower end of key stem 88 is provided with the cam edge 588 which moves the slide 551 in the same way as does the key 86 so that the keyboard release bar 112 cannot operate while the key 88 is depressed.

The gear 285 which is secured to the right end of shaft 276 is in mesh with a similar gear 589 (see Figs. 34 and 52) that is secured to the stub shaft 544 which turns with the gears 418 and 419 that are keyed to it. Thus the shaft 276 on which the single-toothed gears 277 are mounted is turned in unison with the actuating and carrying mechanisms. The cam 288—I which was brought into operating position by the shifting of the cam shaft 286 has caused its single-toothed gear to subtract one figure from the corresponding dial of the eight-dial register for each addition of the multiplicand to the sixteen-dial register. When zero "0" appears on the dial the pin 370, Fig. 33, has come into contact with the rounded end of the lever 590 which is fulcrumed on the pin 372 adjacent to lever 371, and pushed it outwardly from the dial so that the piece of dielectric material 591 which is secured to the lower end of the lever serves to close the electrical contacts 592. Each of the eight dials are provided with one of these levers 590 and contacts 592 one side of each of these contacts being connected through the coils 593 (Fig. 38) of the multiplication control electromagnet 594 to the power supply. The other side of each contact 592 is connected to one of the stud contacts 595, Figs. 41 and 34, of an electrical interlocking switch which is mounted upon the cam shaft.

These eight stud contacts are arranged radially on, but insulated from, a ring bracket member 596 which is secured to the base plate. A spring brush contact 597 is secured to the side of a slip ring 598 which is mounted on the cam shaft but electrically insulated therefrom. Normally the spring brush 597 is not in contact with the studs 595 but when the cam shaft is shifted to the right by depressing the key 88 this brush makes contact with that stud leading to the contacts 592 associated with the register dial of the lowest denominational order. A circuit from the brush 599 which is continuously in contact with the slip ring 598 leads through the spring contacts 600, Fig. 54, which are held closed by the member 341 when the cam 336 is in proper position for multiplication, to the power supply. Hence, the coils 593 of the multiplication control electromagnet 594, Fig. 38, are energized when the dial of the lowest denominational order of the eight-dial register is turned to zero position after the cam shaft has been shifted by the depression of key 88, provided that the carrying mechanism is held in the proper arrangement by the cam member 336. The contacts 601, Figs. 34 and 39, which are adjacent to the contacts 592 of the lowest denominational order of the register are closed when a figure other than zero appears in its associated register dial. When zero appears, however, they are held open by the lever 590 which serves to close the contacts 592. These contacts 601 when closed serve to connect the electric power supply to the contacts 499, Fig. 9, which are in the circuit of the driving motor 401. Thus if the lowest denominational figure of the multiplier is zero then the contacts 601 being open will not permit the driving motor to start when the depression of control key 88 releases the stopping mechanism. Instead the coils 593 of the multiplication control electromagnet 594 will be energized in the manner described.

At this point it must be explained that when the plate 447, Fig. 24, is swung on its pivot links by the depression of the control key, the lever 602 which is connected by a sliding joint to the link 443 is swung with it. This lever 602 is secured to shaft 603 on the left end of which the armature 604, Figs. 35 and 38, of the multiplication control electromagnet 594 is securely mounted. Normally the armature rests on the stop ring 605 but when the plate 447 is swung to operating position, the lever 602 turns shaft 603 so that the armature is swung nearer to the electromagnet 594. When the coils 593 of the electromagnet are energized in the manner described the core 606 becomes magnetized and attracts the armature 604 to it, thereby causing the shaft 603 to turn so that the lever 602 will cause the plate 447 to swing rearward to its inoperative position. The actuating and carrying mechanisms are then stopped by the stopping cushion lever.

Secured to the side of the armature 604 is a bracket 607 to which is fastened a piece of dielectric material 608. When the armature is attracted by the magnetized core 606 this piece of dielectric material strikes and pushes together the contacts 609 which are in the circuit of the electromagnet coil 610, Fig. 14. This coil is then energized and its magnetized core 611 which is fastened to the frame plate 162 attracts the armature 612 which is pivoted on a pin 613. A roll 614 of electrical insulating material is attached to the upper end of the armature so that upon attraction of the armature it serves to close the contact 615 which starts the driving motor 401.

The plate 447 being held in inoperative position by lever 602 does not allow the claw mechanism to engage the epicyclic gear train so that the motor cannot turn the actuating and carrying mechanisms. It merely turns the gear train consisting of the gears 501 to 521 inclusive. The gears 519 and 520, Figs. 9 and 54, are joined by pins 616 and are normally free to turn upon the shaft 492 upon which the clutch 617 is mounted. The armature 612 is connected by link 618 to the lever 619 that is secured to the stub shaft 481 so that the attraction of armature 612 causes this stub shaft to rock. Also secured to this stub shaft is the hooked lever 620 which is held against the casing of clutch 617 by means of the tension spring 621 which also holds the armature 612 away from the core 611 when the coil 610 is not energized. When the armature is attracted the hooked end of lever 620 releases the lever 387 of clutch 617 so as to allow the turning key of the clutch to engage the semi-circular key-ways of gear 519, as has been previously described, and thereby turn the shaft 492. A latch lever 622 pivoted to stub shaft 481 is held by spring 623 in engagement with a notch in disc 624 which is secured to stub shaft 492 and prevents the shaft from being turned by the spring 389 of the clutch 617. Secured to the left end of stub shaft 492, Figs. 24 and 54, is the crank 625 which is connected by pitman 626 to the lever 627 that is secured to the right end of shaft 143. When the clutch 617 engages and turns the stub shaft 492, the crank 625 rocks the lever 627 and shaft 143 thereby rocking the levers 628 and 142, Figs. 33 and 37, which are secured to shaft 143. The lever 142 operates the ratchet gearing which turns the selector switch to the next operating position in the manner which has been described. The lever 628 is connected by a sliding joint to a lever 629 which is fulcrumed on the cam shaft 286 and is provided on its other end with a spring pressed pawl 630 that engages the teeth of ratchet gear 631 secured to the cam shaft. The rocking of shaft 143 causes this ratchet gearing to turn the cam shaft one-eighth of a revolution so that the next multiplying cam 288—2 comes into operating position.

The contact point of brush 597, Fig. 34, is wider than the space between adjacent contact studs 595 so that it touches the next stud before leaving the other. The reason for this is that if the figure of the multiplier which appears in the next higher denominational order of the eight-dial register is zero then the circuit through the coils 593 of the multiplying control electromagnet is not opened because it receives current through the contacts 592 associated with the dial of said higher order. The armature 604 remains in its attracted position and prevents the motor from driving the actuating and carrying mechanisms while the electromagnet coil 610 which is still energized holds the hooked lever 620 so that the clutch 617 may make another revolution, thereby causing the selector switch and cam shaft to be turned to the next successive operating position. If, however, the figure of the multiplier which appears in the second register dial from the right is other than zero, then the contacts 592, Fig. 33, associated with that dial being open cause the current through the multiplying control electromagnet coils to be interrupted when the contact brush 597 turns to the second contact stud 595. The armature 604 then releases and allows the claw mechanism to engage so that the motor will drive the actuating and carrying mechanisms. The releasing of the armature opens contacts 609 to de-energize the electromagnet coil 610 and thereby disengage the clutch 617. Mounted on the cam shaft is a cylindrical switch consisting of an electric conducting ring 632, Fig. 34, which is cut away to form a gap on one side and is secured to a short cylinder 633 of dielectric material, the gap between the ends of the ring being bridged with a part of this cylinder of dielectric material. In contact with this switch are two spring brushes 634 between which contact is to be made by the conducting ring 632 at the proper time. When the cam shaft was shifted to the right by the depression of control key 88 the gap in the conducting ring moved underneath the contact points of the brushes 634 and remains there until the cam shaft is turned to the second operating position in multiplication. In this second position and all subsequent positions until the cam shaft has made a complete revolution the brushes 634 are in contact with the conducting ring 632. This cylindrical switch serves to conect the power supply to the main motor circuit contacts 499 so that their closing will start the motor.

In the second operating position of the selector switch and cam shaft the actuating mechanism again repeatedly adds the multiplicand to the sixteen dial register until the figure of the multiplier in the second dial from the right has been reduced to zero. The closing of the contacts 592 associated with that dial then energizes the multiplying control electromagnet thereby to prevent further additions by the actuating mechanism, and the closing of contacts 609 again energizes electromagnet coil 610 so that clutch 617 engages and causes the selector switch and cam shaft to be turned to the next sucessive operating position. The repeated additions of the multiplicand in successive positions are continued in this manner until all of the figures of the multiplier which appeared in the eight-dial register have been reduced to zero. When the cam 288—7 has finished operation the cam shaft and selector switch are turned to the last operating position in the usual manner. On the side of disc 156, Fig. 37, which is secured to shaft 117 and turns with the selector switch, is secured a lug 635 provided with beveled ends 636 and 637. The beveled end 636 strikes and pushes outward the roll 638 which is fastened to the slidable member 639, Fig. 38, that is held by tension spring 640, so that the roll 638 is in contact with the disc 156. Guide pin 641 extends through a slot in member 639 and allows it to be moved only toward the right. To the right end of member 639 is pivotally connected the latch lever 642 which is fulcrumed on pin 643. The lug 635 acting upon roll 638 thus causes the hooked end 644 of latch lever 642 to release the arm 645 so that it can be pulled rearward by the spring 646. The arm 645 is an extension from one of two similar levers 647 and 648, Fig. 35, which are fulcrumed on pins 649 and 650 respectively and are joined together by rivets 651. The levers 647 and 648 are provided with hooks 652 at their forward ends for holding and preventing the electromagnet armature from being released when its coils are de-energized. The mechanisms are so timed that if a number other than zero appears in the last dial to the left in which case the switch 592 of that dial is open, then the coils 593 de-energize and release the armature 604 before the hooked end 652 of lever 647 falls into engaging position. When this highest denominational figure of the multiplier is reduced to zero then the coils 593 are energized by the closing of contacts 592 and consequently the armature 604 is attracted. The hook 652 then engages the top bar 653 of the armature and holds it in the attracted position.

The electromagnet coil 610 is energized as usual when the contacts 609 are closed, and the clutch 617 engages to turn the cam shaft and the selector switch. The cam shaft is now in its initial position having been turned exactly one revolution, but the selector switch has been turned through only one-half revolution. Secured to shaft 118 on the left side of support plate 121 is a disc 654 provided with a cam lug 655, Figs. 35 and 42, on its outer edge. When the selector switch has been turned one-half a revolution this cam lug strikes an arm of the bell crank 656 which is pivoted on pin 657 and pushes it downward. The other arm of bell-crank 656 is almost vertical and is pivotally connected to the result key release bar 658, Figs. 35 and 41, which is slidably supported by bracket 659 fastened to the edge of guide plate 523. The release bar is provided with a finger 660, similar to the fingers 114, which engages the end of the result key locking rail 529 and pulls it outward from the key stems. In this manner the result key 88 is released when the multiplication problem is completed, and its associated contacts 534 open to de-energize the electromagnets of the electromagnetic stop mechanism and also the electromagnet coil 610 which releases its armature to stop the clutch 617 from further turning the cam shaft and selector switch. When the result key 88 is released the motion of bellcrank 292 slides the cam 295 so that the cam shaft is shifted back to its normal position at the left. This motion of the cam shaft removes the spring brush 597 away from the stud contacts 595 thereby opening the circuit through the electromagnet coils 593.

In multiplication the selector switch is turned so that the clutch member 145 (see Figs. 35, 42, 28, 29 and 30) which is splined to shaft 118 turns in a clockwise direction as seen from the right end of that shaft. The pin 149 which engages slot 148 is normally in its initial position indicated by point 151 and as the clutch member is turned the part of the slot near the clutch teeth remains in engagement with the pin. When the selector switch is completing one-half of a revolution the part of the slot which is in engagement with pin 149 is so formed that the point 152 moves to a position underneath the end of the pin. The slot 148 is also deeper at this point so as to facilitate the motion of clutch member 145 longitudinally on the shaft 118. In this manner after completing one-half a revolution the clutch member is moved so that its teeth will engage with the teeth of clutch member 146 which revolves with the shaft 147 when the motor is turning. The clutch member 145 is now turned in a counter-clockwise direction as seen from the right end of shaft 118 and slot 148a engages with pin 149. When the selector switch reaches its initial position the clutch members 145 and 146 are separated as a result of the shape of slot 148a.

When the multiplication problem is completed and the key 88 rises the various mechanisms and devices including the driving motor, are automatically stopped. The shaft 147 which revolves only when the motor does, may not have had time to turn the selector switch back to its initial position before it stops. The product now appears in the sixteen-dial register and the eight-dial register is cleared. The multiplicand is still set up on the main key-board. Before another problem is begun the "clear" key 91, Fig. 41, must be depressed to release the keyboard and to reset the automatic key release mechanism. The selector switch must be turned to its initial position and the sixteen-dial register must be cleared. The clearing of the register is accomplished by depressing the key 92 as has been described. The depression of the clear key 91 causes the operation of the key release bar 112 and of the lever 571 which accomplishes the resetting of the automatic key release mechanism in the manner which has already been described. The stem of key 91 is provided with means for closing electrical contacts 661 which are similar to the contacts 400 and are also in the driving motor circuit. The key stem extends through an extended portion of the guide plate 523 and the expansion spring 662 serves to hold it in the non-depressed position. Secured to the lower end of the key stem is piece 663 having a notch 664 which can be engaged by a short locking rail 665. This locking rail is articulately connected by link 666, Fig. 42, to the bell-crank 667 which is fulcrumed by pin 668 secured to plate 121. A horizontal arm of the bell-crank is provided with a roll 669 extending through a suitable opening 670 in plate 121 and resting on the edge of disc 654 Fig. 35. When the selector switch is not in its initial position the tension spring 671 holds the locking rail in an engageable position so that roll 669 rests on any part of the edge of disc 654 excepting cam lug 655. If the key 91 is depressed the motor starts when the contacts 661 are closed and the locking rail holds the key in depressed position until the selector switch has been turned to initial position so that the cam lug 655 lifts roll 669 to cause the locking rail 665 to release the key.

In engagement with a slot 672 in piece 663 of key 91 is pin 673 which extends from a lever 674 that is secured to a stub shaft 675. Also secured to this shaft but farther to the left is an arm 676 Fig. 38, having a bent-over end 677. If the arm 645 has been released from engagement with the hooked end of latch lever 642 then it is held against the end of arm 676, as is the case after a multiplication or division problem is completed. When "clear" key 91 is depressed the slot 672 causes the lever 674 to rock the stub shaft 675 so that the arm 676 resets the arm 645 into engagement with latch lever 642 thereby causing the hooks 652 to release their respective armatures. The release of armature 604 permits the plate 447 to be pulled forward by the action of spring 448. When the plate 447 passes its midway position the actuating mechanism turns through one cycle of operation but no addition is made since the keys of the main keyboard are not depressed. When the "clear" key 91 rises, and if the sixteen-dial register has been cleared then the machine is in readiness for another problem.

In multiplication the figures of the multiplier and multiplicand are set up in the usual manner at the right side of the keyboard. In division, however, the figures of the dividend and divisor must be started from the left hand side of the keyboard so that the repeated subtractions of divisor from dividend will start in the same position as if the problem was done with pencil and paper. After the dividend has first been set up on the keyboard the division key 89 is depressed.

The lower end of the key stem 89 is connected by a sliding joint to lever 678, Fig. 40, which is secured to shaft 679. Also secured to this shaft is the arm 680, Fig. 24, which actuates the plate 447 in the usual manner when the key is depressed, and the arm 681 which engages the end of a bar 682. This bar can be swung with link 683 to which it is pivotally connected and which extends through a slot in guide plate 523 to the bracket 684. The other end of this bar 682 is connected by a suitable sliding joint to a bell-crank 685, Fig. 39, fulcrumed on the cam shaft. Mounted on this bell-crank is the spring-pressed pawl 686, which is in engaging position with ratchet gear shield 687. Secured to the cam shaft adjacent to this shield is a sixteen toothed ratchet gear 688 and extending through it is the spring-pushed pin 689 the other end of which is supported by cam 288—l (see also Fig. 34). The rounded end of this pin engages one of sixteen equally spaced impressions 690 in the side of the rachet gear shield 687 thereby holding the shield firmly in position with respect to the ratchet gear. Fulcrumed on the cam shaft between bell-crank 685 and the ratchet gear shield is lever 691 carrying spring pressed pawl 692 that is wide enough to engage both the ratchet gear and the shield. The end of this lever is articulately connected by link 693, Figs. 24 and 54, to crank arm 694 secured to actuator shaft 209. Each time the actuator shaft is rocked the lever 691 swings through the angle indicated in Fig. 39.

When division key 89 is depressed the arm 681 pushes bar 682 against the tension of spring 683' thereby rocking bell-crank 685 so that pawl 686 slips backward over one of the long teeth of the ratchet gear shield as shown by the dashed position of the pawl. Simultaneously the lever 680 swings plate 447 rearward and thereby causes the actuating mechanism to add the dividend into the sixteen-dial register and then the keyboard and key 89 are automatically released. The release of division key 89 stops the machine and allows the bar 682 to return so that pawl 686 engages a long tooth of the ratchet gear shield 687 and turns it through a sixteenth of a turn while the cam shaft remains stationary. The divisor is now set up on the keyboard with the highest denominational figure appearing in the column at the left, and the division result key 90 is then depressed. The lower end of key stem 90 is provided with a cam edge 695, Fig. 39, which moves the slide 551 in the same manner as do the keys 86 and 88 and thereby prevents the keyboard release bar 112 from operating while the key 90 is in depressed position. Attached to the key stem 90 by a sliding joint, and fulcrumed on the stub shaft 679, is lever 696. This lever is provided with an extension 697 that connects to arm 698 Figs. 14 and 35, the top end of which then serves to swing the plate 458 to operating position so that it will cause the motor to turn the actuating and carrying mechanisms in the proper direction for subtraction.

When the subtractions of divisor from dividend take place the rocking of the actuator shaft 209 causes the lever 691 (Fig. 39) fulcrumed on the cam shaft to be rocked once for each individual subtraction. During the first subtraction the lever 691 swings down and its pawl 692 engages one of the long teeth of ratchet gear shield 687 and turns it through another sixteenth of a revolution upon its return swing. During the second subtraction this pawl engages the smaller tooth of the ratchet shield and also a tooth of the ratchet gear 688 and turns the cam shaft and ratchet shield through a sixteenth of a turn on its return stroke, thereby bringing the cam 287—l, Fig. 33, into operating position with the finger 290 of its associated lever 281. Each successive revolution of the gears which drive the actuating mechanism causes the corresponding single toothed gear 277 to turn the dial at the left end of the eight-dial register in the direction of increasing numbers. In the case of the first two subtractions, as mentioned in the second and third sentences of this paragraph, there was no actuation of this dial by its corresponding single toothed gear 277. In the following description it will be made clear that after the divisor has been subtracted from the dividend the proper number of times, the single toothed gear 277 still has time to make two revolutions, and therefore two actuations of this dial, before its associated cam 287—l moves out of operating position. These two final actuations of the dial make up for the first two that were missed and so cause the correct figure of the quotient to appear upon it. The figures of the divisor are subtracted from the same number of figures in the highest denominational orders of the dividend until the figures appearing in these denominational orders are smaller than the divisor. Once more the divisor is subtracted and this subtraction of a larger number from a smaller one causes the figure 9 to appear in the ninth dial from the right end of the sixteen-dial register after the carry-overs have taken place. The appearance of this 9 indicates that one too many subtractions have been made. The pin 318 on this ninth register dial from the right is provided with a rounded end. When the dial is turned from 0 to 9 the end of this pin strikes the cam piece 699, Figs. 43 and 49, and pushes it outward. This cam piece is supported by pin 700 secured to the end of lever 701 that is fulcrumed on pin 702. This lever is separated from spring contact member 703 by a piece of dielectric material 704 secured to the lever, and the motion of cam piece 699 outward from the dial causes the spring contact member 703 to touch a similar spring contact 705. These contacts 703, 705 are in series with contacts 706, Figs. 14 and 54, which are held closed by member 341 when the carrying mechanism cam 336 is in proper position for division, and are also in series with the coils 707, Figs. 35 and 42, of the division control electromagnet 708. The closing of contacts 703, 705 in division, connects the power supply to the coils 707 and the magnetized core attracts the armature 709 which is similar to armature 604. This armature 709 is secured to the left end of shaft 710 on the right end of which is secured the lever 711, Fig. 14. This lever is connected by a slidable joint to link 454 so that when plate 458 is swung into operating position by depressing key 90 the lever 711 will turn the shaft 710 so as to bring armature 709 in closer proximity with the core of electromagnet 708. From this position the armature can be attracted by the energizing of coils 707, and in so doing it turns the shaft 710 so that lever 711 swings plate 458 rearward out of operating position.

Secured to the shaft 710 is an arm 712, Fig. 40, the top end of which is in engaging position with a slot in bar 682. When shaft 710 rocks as a result of the depression of key 90 this arm 712 does not move bar 682, due to the length of the slot which it engages, but when the arm is swung farther by the attraction of armature 709 then the bar 682 is swung rearward in the same manner as when key 89 was depressed. Pivotally fastened by pin 713 to arm 712 is pitman 714 which is connected by a suitable sliding joint (see also Fig. 34) to a bell-crank 715 fulcrumed on the cam shaft. This bell-crank carries the spring pressed pawl 716 which is normally held out of engagement with the teeth of ratchet gear 717 by means of shield 718. This shield is held in position against the side of ratchet gear 717 by bushing 719 and it is kept in proper radial position by means of shaft 143 which extends through it. The shield is a free fit on both shafts so that it will not hinder the rotation of the cam shaft and so that shaft 143 will not prevent it from being moved longitudinally with the cam shaft, as in multiplication. When the armature 709 is attracted for the first time in division the pawl 716 acts on ratchet gear 717 to turn the cam shaft through a sixteenth of a revolution so that cam 287—1 leaves its operating position. This operation, however, is not instantaneous. First the division control electromagnet 708 becomes energized by the closing of contacts 703, 705 after the operation of the carrying mechanism has taken place to register the figure 9 in the register dial associated with said contacts 703, 705. As has been explained with reference to gears 436, 437 and 438 associated with the actuating and carrying mechanisms, the operation of the carrying mechanism takes place during the last phase of a subtractive cycle. Also, the very last carry-over which can take place in division is between the eighth and ninth dials from the right end of the sixteenth dial register and it is when the carrying mechanism moves this ninth dial from 0 to 9 that the contacts 703, 705 are closed to energize electromagnet 708. The electromagnet 708 may be considered to be energized at the instant that said contacts close, but nevertheless the magnetization of the electromagnet core is not instantaneous. It is assumed that this magnetization of the core of electromagnet 708 and therefore the attraction of the armature is sufficiently slow so that before cam 287—1 has moved out of operation it will have caused another figure to be added to its associated dial. The armature attraction is furthermore slowed up by the resistance to be overcome in turning the cam mechanism and the power necessary to move other control devices, for example, the stopping mechanism which has been described. Furthermore, it was too late in the cycle for the stopping mechanism to function even if the armature attraction followed instantaneously upon the closure of contacts 703, 705 since crank 440 (Fig. 9) is turning counter-clockwise and at that instant would be in a position one-third revolution counter-clockwise from the position shown in Fig. 9. The upper end of the stopping cushion lever would be slightly to the rear and above flange 496 which at the instant is descending. Any instantaneous tripping of the stopping mechanism would therefore not be effective until one more cycle of crank 440 has taken place so that the stopping cushion lever can fall under the flange 496. During a subtractive cycle the single-toothed gear 277 (Fig. 33) turns counter-clockwise and at the end of such cycle it is in a position one-third revolution counter-clockwise from that shown in Fig. 33. Therefore, during the first one-third of a cycle following the overdraft cycle the tooth 284 actuates its associated dial before the attraction of armature 709 can take place to move cam 287—1 out of operating position.

The quotient now has been increased by two units to make it correct.

When plate 458 was swung rearward out of operating position it caused the motor to disengage and set the stop mechanism in the usual manner. Also the link 270 (see Fig. 9) moves cam member 269 to shift the register shaft 228 to such neutral position that the actuating mechanism cannot actuate the dials. After the contacts 703, 705 (Figs. 43 and 49) closed to indicate that one too many subtractions were made it was too late for the stopping mechanism to stop the actuating and carrying mechanisms so that they are turned through another cycle without performing a subtraction before they are brought to a stop. At this point the correct number of subtractions appears in the dial at the left end of the eight-dial register although one too many subtractions were performed. When armature 709 is attracted the contacts 720, Fig. 35, are closed by insulated bracket 721 secured to the side of the armature. These contacts are in the circuit of the driving motor and cause the motor to turn as long as they are closed and the key 90 is in depressed position. Since the claw mechanism is not in engagement the motor only drives the gear train which is connected to gear 501.

Secured to the right side of armature 709 is a spring pressed pawl 722 and a protruding arm 723 (see Fig. 42) which extends through a suitable slot 724 in frame plate 121. When the armature closes the point of pawl 722 strikes pin 725 protruding from arm 726 that is secured to stub shaft 727 and swings it a slight distance rearward until the pin 725 slips back over the point of pawl 722. The rocking of stub shaft 727 causes the arm 728, Fig. 41, to release the turning key lever 387 of clutch 729. Secured to shaft 147 is a spur gear 730 which is in mesh with pinion 731 that turns the clutch. The engagement of clutch 729 turns stub shaft 732 upon which the double face cam 733 is secured. The slot 734, Fig. 42, on the left side of the cam engages pin 735 protruding from lever 736 that is fulcrumed on stub shaft 737. The turning of cam 733 causes the point of lever 736 to move so as to hold arm 723 thereby preventing the untimely release of armature 709. Simultaneously, the cam slot 738 that engages pin 739 protruding from arm 740, Fig. 41, swings this arm downward and consequently rocks shaft 741 to which arm 740 is secured. To the left end of shaft 741, Figs. 37 and 43, is secured the lever 742 that is connected by pitman 743 to lever 135. On the right end of shaft 741, Fig. 24, is arm 744 provided with pin 745 resting on the back edge of link 443. The downward motion of arm 740 thus causes lever 135 to move the pawl 134 back over one of the teeth of ratchet gear 133, and simultaneously to swing link 443 rearward so that plate 447 moves to operating position. The cam slot 738 is so shaped that as cam 733 turns, the plate 447 is held in operating position long enough to permit the divisor to be added once into the sixteen-dial register so that the correct remainder will appear. Cam slot 738 then lifts arm 740 back to its initial position thereby releasing plate 447 to stop the machine and turning the selector switch by means of ratchet gear 133 through a sixteenth of a revolution to the next successive operating position. The adding of the divisor back into the dividend caused the ninth dial from the right side to be turned from 9 back to 0 so that contacts 703, 705 open to de-energize coils 707 of the division control electromagnet. The cam slot 734 then lifts lever 736 to release the armature so that plate 458 moves back into operating position and causes the actuating mechanism to repeatedly subtract the divisor from the dividend in the next lower denominational position. The tip of pawl 722 snaps past pin 725 and the contacts 720 are opened when the armature releases. When the clutch 729 has made one revolution the arm 728 which is held against the clutch casing by spring 740 stops turning key lever 387 to disengage the clutch. A latch lever 747 held in engagement with a notch in the edge of cam 733 by spring 748 holds the cam firmly in its normal position.

The release of the armature also retracts arm 712 so that spring 683' may pull the bar 682 thereby causing pawl 686 to engage a long tooth of the ratchet gear shield and turn it through a sixteenth of a revolution. The subtractions of divisor from dividend now continue in the same manner as before until one too many subtractions have been made. The machine then stops, adds the divisor back once, stops again and turns the selector switch to the next operating position. The cam shaft is turned to successive operating positions in precisely the same manner as has been described. When the selector switch is being turned from the seventh to the eighth and last operating position, the beveled end 637 of lug 635, Fig. 37, secured to disc 156 pushes roll 638 so that latch 642 releases arm 645 in the same way as when multiplication was being performed. After the proper number of subtractions of divisor from dividend have taken place in the eighth operating position the armature 709 is attracted and the hook 652 engages its upper end to prevent it from being released automatically. The cam 733 then operates in the usual manner to add the divisor once so that the final true remainder appears in the sixteen-dial register. The selector switch then turns so that the cam lug 655 on the edge of disc 654, Fig. 35 and 42, actuates the bell-crank 656 to release the result key 90. The release of key 90 breaks the circuit which supplies power to the motor through the contacts 499. The clutch members 145 and 146 also come into engagement at this time.

The quotient now appears in the eight-dial register and the remainder in the sixteen-dial register. The cam shaft has made one complete revolution so that it is back to its initial position. Before another problem can be performed both register dials must be reset to zero by depressing keys 92 and 93, and the "clear" key 91 must be depressed. Most of the functions that are performed by key 91 when it is depressed have already been described in detail, they being (1) the release of the keys of the main keyboard (2) the resetting of the automatic key release mechanism (3) the switching of the power supply to the driving motor and keeping the motor running until it has turned the selector switch to its initial position, and (4) the release of the control electromagnet armature. The armature 709 is released from engagement with its detaining hook 652 in the same way as the armature 604. Lug 749 which is part of piece 663, Fig. 41, secured to the lower end of key stem 91 acts upon the shelf 750 at the end of arm 751 and swings the lower end of this arm rearward from the key stem. This arm rocks the stub shaft 737 to which it is secured so that a similar arm 752, Fig. 39, extending from the right end of the same shaft strikes an extended portion 753 of pawl 686 and lifts the pawl out of engagement with the ratchet gear shield 687. Tension spring 754 attached to arm 752 serves to hold it in its normal inoperable position. Thus, when the armature 709 releases allowing bar 682 to retract, the pawl 686 slips over the long tooth of the ratchet gear shield instead of engaging it as usual.

A stop piece 755, Figs. 34 and 39, is secured to base plate 75 in a position near the ratchet gear shield 687. In the normal position of the cam shaft this stop piece does not engage the shield but when the cam shaft is shifted to the right for multiplication the ratchet gear shield is moved so that a suitable notch 756 on the back of each long tooth of the shield engages the top edge 755' of stop piece 755. This stop serves to keep the shield in position while the cam shaft is being turned in multiplication so that pawl 682 cannot engage ratchet gear 688 to turn the cam shaft.

Associated with the cam member 336 (see Figs. 14, 52, and 54) of the carrying mechanism are the contacts 600' and 706' which function similarly to the contacts 600 and 706 respectively. These contacts serve as electrical interlocks to prevent the operation of the various mechanisms unless the carrying mechanism is in proper position. When closed, they connect one side of the power supply to the control key contacts which are connected by circuits to the various mechanisms, as will be made clear under the following heading.

Wiring diagram

Figure 61B:
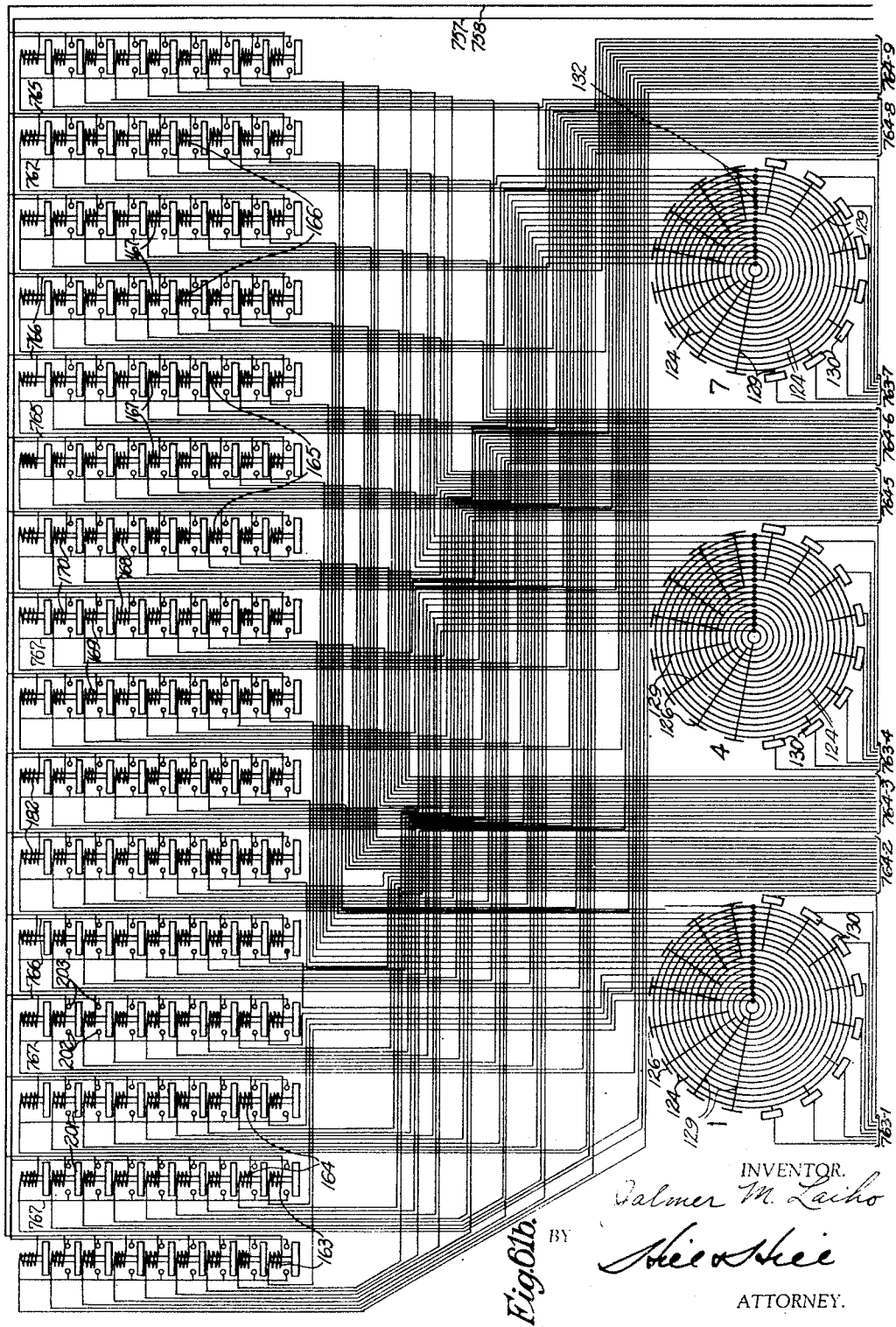

As the wiring diagram illustrated in Figures 61a and 61b has been referred to in connection with the previous description, it will already be quite well understood at this point. However, with a complete description of the circuits which connect the various electrical devices, the functioning of the machine will be made more clear.

The power supply which can be either single phase alternating current or direct current, after entering the casing of the machine connects to switch 82. This switch can be closed and opened manually by the operator and when closed it connects the power to circuits 757 and 758. In performing addition the keys of the keyboard which correspond to the number to be added into the register are depressed, thereby closing their associated contacts 110. Current does not flow through these contacts until after the addition control key 84 has been depressed to close its associated contacts 534 provided that the cam member 336 associated with the carrying mechanism is so positioned that contacts 600' are closed. Current then flows along the following path:— circuit 757, circuit 759, contacts 600', circuit 760, contacts 534 of key 84, circuit 761, through any of the circuits 762—1, 762—2, 762—3, 762—4, 762—5, 762—6, 762—7, 762—8 to the contacts 110 of the keys which are depressed, through these contacts 110, through those circuits 763—1, 763—2, 763—3, 763—4, 763—5, 763—6, 763—7, 763—8, 763—9 which are connected to the contacts 110 of the depressed keys, brushes 130, segments 126 of the selector switch (underneath said brushes), wires 129 to rings 124 of the selector switch, brushes 132, through circuits 764—1, 764—2, 764—3, 764—4, 764—5, 764—6, 764—7, 764—8, 764—9, coils of relays 163, 164, 165, 166, 167, 168, 169, 170 or electromagnet 182, circuit 765, to circuit 758. The coils of the proper relays are thus energized by current flowing through them. In performing addition or subtraction the selector switch is held in the position illustrated so that the depression of a key in the column of the keyboard farthest to the right will energize the corresponding relay or electromagnet associated with the denominational order of the register farthest to the right. Similarly the depression of a key in any other ordinal column of the key-board energizes a relay or electromagnet associated with the corresponding denominational order of the register from the right side. A number one (1) key energizes a relay 163, a number two (2) key energizes a relay 164, etc. etc. and the number eight (8) key energizes relay 170, and the number nine (9) key energizes the actuator releasing electromagnet 182. The closing of the armatures of relays 163, 164, 165, 166, 167, 168, 169 or 170 of any ordinal group joins the contacts 202, 203 of that relay allowing current to flow from circuit 757 through one of the circuits 766 (Fig. 61b), contact 203 to contact 202, circuit 767, through coil 182 of the electromagnet, circuit 765 and to circuit 758, thereby energizing the actuator releasing electromagnet of the same ordinal group. When the key 84 was depressed it actuated mechanical means whereby the main motor contacts 499 were closed. Current to operate the motor then flows along the following path: (see Fig. 61a)—from circuit 757, through circuit 759, contacts 600', circuit 760, contacts 534 of key 84, circuit 761, circuit 768, normally closed contacts 586 of key 88, circuit 769, contacts 499, circuit 770, through the motor 401 and to the terminal of switch 82 to which the circuit 758 is connected. When either key 92 or 93 is depressed to clear the register dials the driving motor is started by current flowing from circuit 757 through circuit 771, contacts 400, circuit 772, circuit 770, through the motor 401 and to the terminal of switch 82. Also when "clear" key 91 is in depressed position current flows from circuit 757 through contacts 661, circuit 770, through motor 401 to the terminal of switch 82. When a number is to be subtracted from the register dials the control key 85 is depressed instead of key 84 and the circuits are completed exactly the same as in addition except that current now flows through the contacts 534 of key 85 instead of through the contacts 534 of key 84.

In performing multiplication, after the multiplier has been set up on the keyboard the depression of control key 87 closes its contacts 534. The current then flows through exactly the same circuits as if the key 84 had been depressed, excepting that it passes through the contacts 534 of key 87 rather than of key 84. The sixteen-dial register is then cleared by depressing key 92. After the multiplicand is set up on the keyboard the multiplication result key 88 is depressed so that its contacts 534 close, and the contacts 586 open. Thereupon current flows from circuit 757 through circuit 759, contacts 600', circuit 760, contacts 534 of key 88, circuit 768, circuit 761 and then through the key contacts of the main keyboard, through the selector switch and the relays to the circuit 758 in the same manner as if addition was being performed. If the lowest denominational figure of the multiplier is other than zero then the contacts 601 were already closed when key 88 was depressed and current to operate the driving motor flows from circuit 757 through contacts 601, contacts 499, circuit 770, through motor 401 to the terminal of switch 82. If instead the lowest figure of the multiplier is zero then contacts 601 are open and the motor does not start. When the lowest figure of the multiplier has been reduced to zero, or if it is initially at zero then current flows from circuit 758 through circuit 773, contacts 600, circuit 774, brush 599, slip-ring 598, brush 597, circuit 775, contacts 592—1, circuit 776, coils 593 of the multiplication control electromagnet and through circuit 777 to circuit 757. The coils 593 thus being energized attract their armature to close the contacts 609 and to mechanically stop the machine and open motor contact 499. The motor, however, was stopped when contacts 601 opened. Current then flows from circuit 757 through circuit 759, contacts 600', circuit 760, contacts 534 of key 88, circuit 768, circuit 761, circuit 778, contacts 609, circuit 779, electromagnet coil 610 and to the circuit 758. The coil 610 being energized, attracts its armature to engage the clutch which has been described and closes the contacts 615 so that current flows from circuit 757 through contacts 615, circuit 770, through motor 401 to the terminal of switch 82. The motor 401 turns the cam shaft to the next operating position so that brush 597 contacts the stud 595 that is joined to contacts 592—2, and it also turns the selector switch to the next operating position so that the circuits from the contacts 110 of each ordinal column of the keyboard are now connected to the corresponding relay or electromagnet associated with the next higher denominational position of the register. Diagrammatically, as illustrated in Figures 61a and 61b, the selector switch is turned one-sixteenth of a revolution in a clockwise direction. The brushes 130 then make contact with the next adjacent segments 126, and the course of the currents from the key-contacts of the keyboard can be easily traced in the diagram. If the figure of the multiplier appearing in the second register dial from the right is zero then the current through coils 593 and 610 is not interrupted because as has been explained, brush 597 touches the next contact stud 595 before leaving the previous contact, and the motor turns the cam shaft and selector switch to the next successive operating position. However, if this second figure of the multiplier is not zero then contacts 592—2 are open and current no longer flows through coils 593, the armature of which releases and opens contacts 609 to de-energize coil 610. The release of the armature of coil 610 disengages the clutch that turns the cam shaft, and also opens contacts 615 which temporarily supplied power to the driving motor. The repeated additions of the multiplicand now continue in the second operating position and the figure of the multiplier in the second dial from the right is reduced by one for each addition until it is reduced to zero. The brushes 634 now make contact with ring 632 so that current to the motor is supplied from circuit 757, circuit 780, contacts 634 and ring 632, contacts 499 and circuit 770. The contacts 592—2 then close to energize coils 593 so that the attraction of the armature closes contacts 609 to energize electromagnet coil 610, which then attracts its armature and causes the motor to again turn the selector switch and cam shaft to the next successive operating position. The operation then proceeds similarly until the cam shaft has operated in each of its eight positions and has been turned through one complete revolution. When the multiplication result key 88 is released in the manner which has been described, its contacts 534 open and the contacts 586 close. The cam shaft also shifts axially to the left so as to remove brush 597 out of contact with studs 595 and de-energize coils 593. The opening of contacts 534 of this key opens the circuit which supplies electric current through the keyboard contacts and selector switch to the relays and electromagnets of the actuator stopping mechanism. The coil 610 also is de-energized since the contacts 534 are in its circuit. The depression of "clear" key 91 starts the motor by supplying current to it from circuit 757 through contacts 661 and circuit 770. The motor then turns the selector switch to its initial position in the manner which has been described.

When it is desired to perform division problems the cam 336 should be so moved by means of lever 83 that the contacts 706 and 706' are held closed instead of contacts 600 and 600'. The dividend is then set up on the keyboard so that the highest denominational figure is in the left-most ordinal column. The division key 89 is next depressed thereby allowing current to flow from circuit 757 through circuit 759, contacts 706', circuit 781, contacts 534 of key 89, circuit 761 and through the keyboard contacts 110, through the selector switch and the relay and electromagnet coils to circuit 758. If the circuits leading from the keyboard contacts through the selector switch to the relays and electromagnets be traced, it will be noted that the electromagnetic actuator stop mechanism will cause the highest denominational figure of the dividend to appear in the eighth dial from the right, and all other figures in their corresponding position to the right of it. The depression of key 89 also closes contacts 499 in the manner which has been specified so that the motor is started by current flowing from circuit 757 through circuit 759, contacts 706', circuit 781, contacts 534 of key 89, part of circuit 761, circuit 768, contacts 586 of key 88, circuit 769, contacts 499, circuit 770, motor 401 and to the terminal of switch 82. The dividend is thus added into the sixteen-dial register in the same manner as if the addition control key 84 had been depressed instead of key 89. The key 89 is then automatically released simultaneously with the main keyboard so that motor 401 is stopped and the coils of the relays and electromagnets are de-energized.

The divisor is now set up on the keyboard so that its highest denominational figure is in the left-most ordinal column. The division result key 90 is next depressed, closing its contacts 534 so that current flows from circuit 757 through circuit 759, contacts 706', circuit 781, contacts 534 of key 90, circuit 768, circuit 761, through the contacts of the main keyboard, through the selector switch and the relays and electromagnets to circuit 758. Tracing the circuits on the diagram shows that the figure of the divisor in the left-most ordinal column of the keyboard will energize the relay or electromagnet of the same digit value that is associated with the register dial in which the highest denominational figure of the dividend appears, and the other figures of the divisor will energize relays and electromagnets in their corresponding positions to the right of it. Power to operate the driving motor 401 is supplied from circuit 757, through circuit 759, contacts 706' circuit 781, contacts 534 of key 90, circuit 768, normally closed contacts 586, circuit 769, contacts 499 and circuit 770. As has been previously described the depression of key 90 causes the motor to drive the actuating and carrying mechanisms in the proper direction so that the figures of the divisor are repeatedly subtracted from the dividend. When one too many subtractions have been made the contacts 705 close, as has been described, and current flows from circuit 757, through electromagnet coils 707, circuit 782, contacts 706, contacts 705 and circuit 783 to circuit 758 thus energizing the division control electromagnet coils 707 so that they will attract their armature. The attraction or this armature closes contacts 720 to supply power to the driving motor by completing a circuit from circuit 757, through circuit 759, contacts 706' circuit 781, contacts 534 of key 90, circuit 768, circuit 761, circuit 778, contacts 720, circuit 770 and motor 401 to the terminal of switch 82. The divisor is then added back into the register by the cam mechanism that was described and the contacts 705 open to de-energize coils 707. After the cam 733 has caused the selector switch to be turned one-sixteenth of a revolution to its second operating position in division, the armature of the division control electromagnet is released so that the repeated subtractions of divisor from dividend may be continued in the second operating position. Diagrammatically, as shown in Figures 61a and 61b the selector switch is turned in a counter-clockwise direction to successive operating positions in division. By tracing the circuits the relays and electromagnets which will be energized by figures set up on the keyboard can be determined for each operating position of the selector switch. The turning of the cam shaft to successive operating positions in division is done entirely mechanically so it is not referred to here. The figures of the divisor are subtracted from the remainder of the dividend in each of the successive operating positions in exactly the same way as in the first operating position just described. When the division problem is completed the division result key 90 is automatically released and the opening of its contacts 534 opens the circuit through which current flows to the relays and electromagnets and to the driving motor. The machine then stops and the quotient appears in the eight-dial register, the remainder in the sixteen-dial register and the divisor is still depressed on the keyboard. The register dials are reset to zero in the manner described by the depression of keys 92 and 93. The depression of "clear" key 91 besides performing other functions already described, supplies power to the motor through contacts 661 while the selector switch is being turned back to its normal or initial position.

*Alternative form*

So that the nature of the invention may be better understood an alternative form is illustrated in Figures 62 to 66 inclusive. The construction of the actuating mechanism, carrying mechanism and register dials of this design are somewhat similar to those described in U. S. Patent Number 1,220,545, issued to Edgar E. Phinney on on March 27, 1917, except that the register dials are not mounted in a shiftable carriage. The actuating mechanism consists of gears 783 and 784 Figs. 65 and 62, splined to the actuator shaft 785. The gears 783 have five teeth 786 of equal length and gears 784 have four teeth 787 of varying length. On a shaft 788 slightly above the actuator shaft 785 are mounted the ten-toothed sprocket gears 789 which are free to turn on the shaft. In mesh with these sprocket gears are similar ten-toothed sprocket gears 790 mounted on the sixteen-dial register shaft 791. Secured by pins 792 (Fig. 64) to the sides of sprocket gears 790 are the numeral dials 793 of the register.

Normally, if the actuator shaft 785 is turned, the teeth 786 and 787 of gears 783 and 784 respectively, do not mesh with the teeth of sprocket gears 789 since they revolve in vertical planes just to the sides of the planes of gears 789 (see Fig. 65). However, if gears 783 and 784 are shifted axially on the actuator shaft, any desired number of teeth from one to nine can be brought into the plane of any gear 789 so that when the actuator shaft is turned, this gear 789 as well as gear 790 and numeral dial 793 will be turned through a fraction of a revolution depending upon the number of teeth which actuate gear 789.

Nine solenoid type electromagnets 794, 795, 796, . . . 802 are provided as means for causing the gears 783 and 784 to be shifted axially to such positions that any number of teeth from one to nine can be made to mesh with gear 789 when the actuator shaft is turned. Secured to the plunger 803 of each solenoid is a piece 804 which extends upward through a guide plate 805. Expansion springs 806 acting upon pieces 804 serve to normally hold the plungers 803 in their unattracted positions. Fingers 807 and 808 projecting downward from the upper ends of pieces 804 are in engagement with the upper edges of two rails 809, 810 which are pivotally supported at each end by pins extending through frame plate 811 and back frame plate 812. The end of each rail 809 and 810 is provided with two fingers 813 forming a fork which is held against the side of gears 783 and 784 respectively. The inside edges of fingers 807 and 808 are shaped so as to cause the desired deflection of rails 809 and 810 when any of the electromagnets 794 to 802 are energized to attract their armatures. The solenoid 794 upon being energized causes only the rail 810 to be deflected slightly so that the longest tooth of gear 784 alone comes into operating position. Between the gears 783 and 784 is an expansion spring 814 which normally serves to hold them apart so that none of the teeth of either gear will actuate the sprocket gear 789 if the actuator shaft is revolved. The spring 814 is compressed when the gears are shifted on the actuator shaft so that their teeth are brought into operating position. When solenoid 795 is energized it causes gear 784 to shift so that its two longest teeth will engage gear 789 if the actuator shaft is revolved. Similarly the solenoid 796 can bring the three longest teeth of gear 784 into operation and solenoid 797 will shift it far enough so that all four teeth can engage gear 789. Solenoid 798 causes no motion of rail 810 but deflects rail 809 and therefore gear 783 so that all of its five teeth of equal length can engage gear 789 when the actuator shaft is revolved. Solenoid 799 moves both rails 809 and 810 so that the five teeth of gear 783 and the longest tooth of gear 784 comes into operation. Similarly, when solenoid 800 is energized the five teeth of gear 783 and two longest teeth of gear 784 come into operation, and solenoid 801 moves eight teeth into operating position. Solenoid 802 shifts both gears 783 and 784 so that all nine teeth may actuate the gear 789.

Associated with each dial of the register is a set of these nine solenoids, and the solenoids of alternate groups are staggered as shown in Figure 63 so that they will occupy less space. The wiring connections for the machine of this type are the same as that shown in Figures 61a and 61b, except that the circuits 766 and 767 and contacts 202, 203 are omitted. All nine of these solenoid-type electromagnets have been illustrated to show the similarity in the two designs but it is quite evident that only the five solenoids 794, . . . 798 are necessary. These five solenoids, of course, would be located in the positions occupied by solenoids 798, . . . 802, in Figure 62, and they will actuate the rails 809 and 810 in the same manner as described. For example, when the number six is to be added to or subtracted from a register dial the solenoids 798 and 794 (5+1) are energized and produce the same result as was performed by solenoid 799. When the number seven is to be added or subtracted the electromagnets 798 and 795 (5+2) are energized and produce the same result as was performed by solenoid 800. Similarly, for number eight the solenoids 798 and 796 (5+3) operate, and for number nine the solenoids 798 and 797 (5+4) operate. The keys of each column of the keyboard of the digits valued from 6 to 9 inclusive must have two separate sets of contacts. One set of these contacts of each of these four keys must be connected in parallel with the contacts 110 of the number 5 key of the same column. The other set of contacts of the number 6 key are connected in parallel with the contacts 110 of the number 1 key. Similarly the second set of contacts of the number 7, 8 and 9 keys will be in parallel with the contacts 110 of the number 2, 3 and 4 keys respectively. Thus, the depression of the number 6 key will be equivalent to depressing both the number 5 and number 1 keys, and the depression of the number 7, 8 or 9 keys will be equivalent to depressing the numbers 5 and 2, 5 and 3, or 5 and 4 keys, respectively. From this it is obvious that only the five sections of the selector switch corresponding to the digits from 1 to 5 inclusive are necessary with this design. The construction of the pieces 804 projecting upward from the solenoid plungers 803 is also simplified, it being only necessary to have one finger 807 or 808 since a solenoid actuates only one of the two rails 809, 810.

The accumulating or sixteen-dial register consists of sprocket gears 790 and register dials 793 secured to them, the combination being mounted on shaft 791. In engagement with sprocket gears 790 are similar sprocket gears 815 rotatably mounted and axially aligned on a fixed shaft 816. Slightly below shaft 816 is a shaft 817 on which is mounted the eight-dial register which is of the same construction as the sixteen-dial register and consists of gears 790' and dials 793'. Directly below the eight-dial register shaft 817 is the direct counting mechanism, the cam shaft, and the multiplication control contacts which are of the same construction as those that have been described at length in this specification.

Between two teeth of sprocket gears 789 and extending the full length of the actuating mechanism is a coil spring 818, (see Figs. 62 and 66), which serves to prevent these gears and therefore the register dials from being carried by their inertia after they are no longer turned by the teeth of gears 783 and 784. This spring also helps somewhat in centralizing the numbers on the register dials before their viewing apertures in the casing, but more accurate centralization of these numbers is accomplished by spring pressed plungers 819 Fig. 64, the rounded ends of which engage one of the ten impressions 820 on the side of sprocket gears 790 and 790'. Means must be provided for swinging register shaft 791 so as to unmesh all sprocket gears 789 and 790 when it is desired to reset this register to zero.

When the shaft 791 (Fig. 62) is turned in the resetting operation the pin 821 which projects from the tooth of sprocket gear 790 strikes a lug 822 so that the register dial is stopped in zero position.

The eight dial register can be reset to zero by turning the register shaft 817 while it is in the position illustrated in Figure 62. The dials are stopped in zero position when pin 823 projecting from a tooth of sprocket gear 790' strikes the end of the lever 824. Means must also be provided for lifting the register shaft 817 so that all of the gears 790' will engage with the gears 815 to enable the multiplier to be added into the eight dial register in multiplication.

The carrying mechanism which is mounted on shaft 825 is of the same construction as that illustrated in Figures 55 to 60 inclusive except that the individual carrying pieces are of a slightly different shape. The type of carrying mechanism which is described in U. S. Patent Number 1,220,545 issued to Edgar E. Phinney on March 27, 1917, can be employed if means are provided for starting the selector switch and turning it to successive operating positions in division in the reverse order that is followed for multiplication. As before mentioned, this type of carrying mechanism can also be employed with the previously described design. When a dial of the sixteen-dial register is turning from 0 to 9 and from 9 to 0 then a pin 826, Fig. 62, projecting from a tooth of sprocket gear 790 strikes the cam lug 827 of the carrying cam piece 828, causing it to pivot on the shaft 829 so that its bent-over cam edge 830 swings into operating position with respect to the carrying pieces 831 of the carrying mechanism. When the carrying mechanism revolves, the pieces 831 are cammed over by the edges 830 (see Figs. 65 and 66) so that the end 832 of the carrying piece acts as a gear tooth and turns the gear 789 of the next higher denominational position by one-tenth of a revolution thereby adding or subtracting one number from its associated register dial. After the carrying process has taken place, the carrying cam piece 828 is pivoted on its shaft in precisely the same manner as in the previously described design so that cam lug 827 may again be acted upon by pin 826. Spring 833 serves to hold the piece 828 firmly in either of its pivoted positions.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

I claim:

1. In a calculating machine, a set of digit keys arranged in denominational columns, individual electric switches controlled by each key, partial electric circuits including said key switches, a multi-denominational register for displaying values, a multi-denominational register actuator, electric means for setting stops representing the digits of a number and which stops determine the possible motion of the elements of the register actuator, individual electric circuits for each stop-setting means associated with each denominational order of the register actuator, selective means for connecting the partial electric circuits including the key switches of each ordinal column of keys to the electric circuits of the actuator stop-setting means so that the values set up on the keys can be set successively into any denominational orders of the actuator stop-setting means when the said partial circuits are completely closed, calculation control keys operative in performing an arithmetical calculation, contact switches for said control keys whereby the said partial circuits may be completely closed, and means for automatically driving the register actuator whereby to set up the results of calculations in said register.

2. In a calculating machine, a keyboard, individual switches controlled by each key, electric circuits including said key controlled switches, a multi-denominational accumulator actuator, a plurality of primary accumulator elements permanently aligned with respect to the actuator, electromagnetic digit-setting means associated with each denominational order of the actuator, electric circuits including said electromagnetic digit-setting means, selective means for connecting the electric circuits including the key switches to the electric circuits including the electromagnetic digit-setting means, a plurality of secondary accumulator elements also permanently aligned with respect to the actuator, a multiplication control key and devices controlled thereby operative to cause a value set up on the keyboard to be electrically entered into the electromagnetic digit-setting means and to cause the accumulator actuator to register this value into said secondary accumulator elements, means for individually actuating any element of said secondary accumulator elements, a multiplication result control key and devices controlled thereby operative to cause a second value set up on the keyboard to be electrically entered into successive denominational positions of the electromagnetic digit-setting means and to cause the accumulator actuator to repeatedly add this value into the primary accumulator elements in each denominational position while the individual actuating means successively reduces to zero the digital values previously registered in the said secondary accumulator elements as the corresponding number of repeated additions are made into the corresponding denominational positions of said primary accumulator elements.

3. In a calculating machine, a keyboard consisting of a plurality of parallel ordinal columns of keys numbered from 1 to 9 inclusive, individual electric contact switches controlled by each key, electric circuits including said contact switches, a multi-denominational accumulator actuator, a primary register comprising a plurality of accumulator elements each being capable of actuation by a single order of the actuator, electromagnetic setting means for setting a digit value in each denominational element of the actuator, electric circuits including said electromagnetic setting means, selective means for switching the electric circuits including the contact switches of each ordinal column of keys to the electric circuits including the electromagnetic setting means in any group of respective denominational positions of the accumulator actuator, a secondary register comprising a plurality of accumulator elements each being capable of actuation by a single order of the actuator, a multiplication control key manually operable and devices controlled thereby to enter a value set up on the keyboard into the electromagnetic setting means and to cause the accumulator actuator to enter this value into the secondary register, means for individually actuating any accumulator element of said secondary register, a multiplication result control key manually operable and devices controlled thereby to enter a second value set up on the keyboard into successive denominational positions of said electromagnetic setting means and means to cause the accumulator actuator to repeatedly add this value into the primary register in each denominational position while the individual actuating means successively reduces to zero the digital values previously registered in the elements of said secondary register as the corresponding number of repeated additions are made into the corresponding denominational elements of said primary register.

4. In a calculating machine, a keyboard, a plurality of parallel ordinal columns of electric contact switches corresponding to the digits from 1 to 9 inclusive and each being operable from the keyboard, electric circuits including said contact switches, a multi-denominational accumulator actuator, a primary register having reversibly operable accumulator wheels each being capable of actuation by a single order of the actuator, a secondary register having similar accumulator wheels, electric setting means for setting a digit value in each denominational element of the actuator, electric circuits including said electric setting means, selective means for connecting the electric circuits including the ordinal columns of contact switches to the electric circuits including any group of respective denominational orders of the electric setting means, a multiplication control key manually operable and devices controlled thereby to enter a value set up on the keyboard into the electric setting means and to cause the accumulator actuator to enter this value into the secondary register, means for individually actuating the accumulator wheels of the secondary register, a multiplication result control key manually operable and devices controlled thereby to enter a second value set up on the keyboard into successive denominational positions of the electric setting means and to cause the accumulator actuator to repeatedly add this value into the primary register in each denominational position while each digit of the value previously entered into the secondary register is reduced to zero successively in each denominational accumulator wheel by the said individual accumulator wheel actuating means as the corresponding number of repeated additions are made into the corresponding denominational positions of said primary register.

5. In a calculating machine, a bank of keys, electric circuits for said keys whereby the actuation of the keys will partially close corresponding circuits, a primary register, a secondary register, a multi-denominational register actuator, permanently aligned with said registers, electric means for setting digit values in the various denominational orders of the register actuator, electric circuits for said digit-setting means, selective means for connecting said partially closed key circuits to the electric circuits of the digit-setting means, a multiplication control key, electric contacts for said multiplication control key whereby the actuation of the said control key will complete the said partially closed key circuits to cause the electric digit-setting means to enter any value set up on the bank of keys into the register actuator, means associated with said multiplication control key to cause the register actuator to enter this value into the secondary register, means for individually actuating the denominational orders of the secondary register, a multiplication result control key, electric contacts for said multiplication result control key whereby the actuation of the said control key will complete the said partially closed key circuits to cause the electric digit-setting means to enter another value set up on the bank of keys into the register actuator, control means associated with said multiplication result control key to cause the register actuator to repeatedly add this value into the primary register in successive denominational positions while each digit of the value previously entered into the secondary register is reduced to zero successively in each denominational order by the said individual order actuating means as the corresponding number of repeated additions are made into the corresponding denominational positions of said primary register.

6. In a calculating machine, a bank of registering members, a register actuator, a second bank of registering members, and means for individually actuating the members of said second bank of registering members to indicate the number of cycles of operation performed by the said register actuator, said individual actuating means consisting of single-toothed wheels each associated with one member of the second bank of registering members and each being turned to make one revolution for each cyclical operation of said register actuator and each being capable of deflection into actuating position with its associated member, and means for individually deflecting each of said single toothed wheels.

7. In a calculating machine, a plurality of columns of nine keys corresponding to the digits from 1 to 9 inclusive, electrical contact switches associated with said keys, electric circuits including said contact switches, a multi-denominational register for displaying values, a plurality of actuating elements each associated with one denominational order of said register, an electromagnetic digit-setting means associated with each of the actuating elements, electric circuits including said electromagnetic digit-setting means, selective means for individually connecting the electrical circuits leading from the key contact switches corresponding to each digit of an ordinal column of keys to the circuits leading to like digital positions in any one of the several orders of said electromagnetic digit-setting means, a subtraction control key operative to completely close the circuits that are partially closed by the depressed digit keys thereby to enter the value set up on the digit keys into the actuating elements and to cause the actuating elements to function whereby this value will be subtracted from the multi-denominational register.

8. In a calculating machine, a keyboard, circuits including said keyboard, a primary register having reversibly operable numeral wheels for displaying values, a secondary register having similar numeral wheels, an actuataing mechanism associated with said registers, electromagnetic setting means for setting values into the actuating mechanism, electric circuits including said electromagnetic setting means, selective means for connecting the electric circuits from all denominational orders of the keyboard to any of the circuits leading to the electromagnetic setting means in their corresponding denominational positions, a multiplication control key and devices controlled thereby operative to cause a value set up on the keyboard to be electrically transferred into said electromagnetic setting means and to cause the actuating mechanism to enter such value into said secondary register, a direct-counting mechanism for individually actuating the numeral wheels of said secondary register, a multiplication result control key and devices controlled thereby operative to cause another value set up on the keyboard to be electrically transferred to successive denominational positions of the electromagnetic setting means and to cause the actuating mechanism to repeatedly add this value into the primary register in each denominational position while the said direct-counting mechanism reduces the digital values appearing in the secondary register to zero successively in each denominational position as the requisite number of repeated additions are made into the corresponding denominational positions of said primary register.

9. In a calculating machine, a keyboard, circuits including said keyboard, a primary register having reversibly operable numeral wheels for displaying values, a secondary register having similar numeral wheels, an actuating mechanism associated with said registers, electromagnetic setting means for setting values into the actuating mechanism, electric circuits including said electromagnetic setting means, selective means for connecting the electric circuits from all denominational orders of the keyboard to any of the circuits leading to the electromagnetic setting means in their corresponding denominational positions, a division control key and devices controlled thereby operative to cause a value set up on the keyboard to be electrically transferred into said electromagnetic setting means and to cause the actuating mechanism to enter such value into said primary register, a direct-counting mechanism for individually actuating the numeral wheels of said secondary register, a division result control key and devices controlled thereby operative to cause another value set up on the keyboard to be electrically transferred to successive denominational positions of the electromagnetic setting means, and to cause the actuating mechanism to repeatedly subtract this value from the value previously entered into the primary register in each denominational position until the remainder in such denominational position is less than the value being subtracted, while the said direct-counting mechanism registers the digital number of such subtractions performed on each denominational position into the secondary register.

10. In a calculating machine, a keyboard, individual switches controlled by each key, electric circuits including said key controlled switches, a multi-denominational accumulator actuator, a plurality of primary accumulator elements permanently aligned with respect to the actuator, electromagnetic digit-setting means associated with each denominational order of the actuator, electric circuits including said electromagnetic digit-setting means, selective means for connecting the electric circuits including the key switches to the electric circuits including the electromagnetic digit-setting means, a plurality of secondary accumulator elements also permanently aligned with respect to the actuator, a division control key and devices controlled thereby operative to cause a value set up on the keyboard to be electrically entered into the electromagnetic digit-setting means and to cause the accumulator actuator to register this value into said primary accumulator elements, means for individually actuating any element of said secondary accumulator elements, a division result control key and devices controlled thereby operative to cause a second value set up on the keyboard to be electrically entered into successive denominational positions of the electromagnetic digit-setting means and to cause the accumulator actuator to repeatedly subtract this value from the value previously regitsered into the primary accumulator elements in each denominational position until the remainder is less than the value being subtracted, while the individual actuating means registers the digital number of such subtractions in each denominational element of said secondary accumulator elements.

11. In a calculating machine, a keyboard consisting of a plurality of parallel ordinal columns of keys numbered from 1 to 9 inclusive, individual electric contact switches controlled by each key, electric circuits including said contact switches, a multi-denominational accumulator actuator, a primary register comprising a plurality of accumulator elements each being capable of actuation by a single order of the actuator, electromagnetic setting means for setting a digit value in each denominational element of the actuator, electric circuits including said electromagnetic setting means, selective means for switching the electric circuits including the contact switches of each ordinal column of keys to the electric circuits including the electromagnetic setting means in any group of respective denominational positions of the accumulator actuator, a secondary register comprising a plurality of accumulator elements each being capable of actuation by a single order of the actuator, a division control key and devices controlled thereby operative to enter a value set up on the keyboard into the electromagnetic setting means and to cause the accumulator actuator to enter this value into the primary register, means for individually actuating any accumulator element of the secondary register, a division result control key and devices controlled thereby operative to enter a second value set up on the keyboard into successive denominational positions of said electromagnetic setting means and means to cause the accumulator actuator to repeatedly subtract this value from the value previously entered into the primary register in each denominational position until the remainder is less than the value being subtracted, while the individual actuating means registers the digital number of such subtractions in each corresponding denominational element of said secondary register.

12. In a calculating machine, a keyboard, a plurality of parallel ordinal colums of electric contact switches corresponding to the digits from 1 to 9 inclusive and each switch being operable from the keyboard, electric circuits including said contact switches, a multi-denominational accumulator actuator, a primary register having reversibly operable accumulator wheels each being capable of actuation by a single order of the actuator, a secondary register having similar accumulator wheels, electric setting means for setting a digit value in each denominational element of the actuator, electric circuits including said electric setting means, selective means for connecting the electric circuits including the ordinal columns of contact switches to the electric circuits including any group of respective denominational orders of the electric setting means, a division control key manually operable and devices controlled thereby to enter a value set up on the keyboard into the electric setting means and to cause the accumulator actuator to enter this value into the primary register, means for individually actuating the accumulator wheels of the secondary register, a division result control key manually operable and devices controlled thereby to enter a second value set up on the keyboard into successive denominational positions of the said electric setting means and to cause the accumulator actuator to repeatedly subtract this value from the value previously entered into the primary register until the remainder successively in each denominational position is less than the value being subtracted, while the individual accumulator wheel actuating means causes the digital number of such subtractions performed to be registered in each corresponding denominational wheel of said secondary register.

13. In a calculating machine, a bank of keys, electric circuits for said keys whereby the actuation of the keys will partially close corresponding circuits, a primary register, a secondary register, a multi-denominational register actuator, permanently aligned with said registers, electric means for setting digit values in the various denominational orders of the register actuator, electric circuits for said digit-setting means, selective means for connecting said partially closed key circuits to the electric circuits of the digit-setting means, a division control key, electric contacts for said division control key whereby the actuation of the said control key will complete the said partially closed key circuits to cause the electric digit-setting means to enter any value set up on the bank of keys into the register actuator, means associated with said division control key to cause the register actuator to enter this value into the primary register, means for individually actuating the demominational orders of the secondary register, a division result control key, electric contacts for said division result control key whereby the actuation of the said control key will complete the said partially closed key circuits to cause the electric digit-setting means to enter another value set up on the bank of keys into the register actuator, control means associated with said division result control key to cause the register actuator to repeatedly subtract this value from the value previously entered into the primary register in successive denominational positions until the remainder is less than the value being subtracted, while the individual order actuating means causes the digital number of such subtractions performed to be registered in each corresponding denominational order of said secondary register.

14. In a calculating machine, a bank of keys arranged in columns representing the digits of a number, individual electric switches controlled by each key, partial electric circuits including said key switches, a multi-denominational register for accumulating values, a multi-denominational register actuator, electrical means for setting a digit value in each denominational order of the register actuator, electric circuits including said digit-setting means, selective means acting to connect the said key switch circuits of each ordinal column of keys to the electric circuits including said digit-setting means in such a manner that a digit value set up in a column of keys can be set successively into adjacent denominational orders of the register actuator, a division control key, a division result control key, electric switches for said control keys for completely closing the partial key switch circuits, a second multi-denominational register, means cooperating with said second register for counting the effective number of additions or subtractions performed by the register actuator, means associated with the division control key for controlling the operation of the register actuator to enter a value set up on the bank of keys into the first multi-denominational register, and means associated with the division result control key for controlling the operation of the register actuator to repeatedly subtract another value subsequently set up on the bank of keys from the value entered in the first multi-denominational register in successive denominational orders thereof until the remainder in each denominational order is reduced to a value less than the value being subtracted, while the means for counting the effective number of subtractions registers the digital number of such subtractions in the said second register.

15. In a calculating machine, a bank of key switches arranged in columns representing the digits of a number, partial electric circuits including said key switches, a multi-denominational register, a multi-denominational register actuator, electric means for setting a digit value in each denominational order of the register actuator, partial electric circuits including said digit-setting means, selective means for connecting said partial key switch circuits to the partial circuits including said digit-setting means and operative to enter values set up on the bank of key switches into any denominational orders of the register actuator, a second multi-denominational register, means cooperating with said second register for counting the effective number of cycles of operation of said register actuator, means for automatically controlling the operation of the said register actuator to enter the first factor of a calculation problem which is set up on the bank of key switches into one of said registers, and another means for automatically controlling the operation of the said register actuator and the operation of the said selective circuit-connecting means and the operation of the said means for counting the effective number of cyclical operations of said register actuator to perform repeated cyclical actuations with another factor of the calculation problem which is set up on the bank of key switches subsequent to the said first factor whereby to set up the result of the calculation problem into the other of said registers.

JALMER M. LAIHO.